(12) United States Patent
Iwata et al.

(10) Patent No.: US 7,069,056 B2
(45) Date of Patent: Jun. 27, 2006

(54) MOBILE INFORMATION TERMINAL EQUIPMENT AND PORTABLE ELECTRONIC APPARATUS

(75) Inventors: Yuji Iwata, Tokyo (JP); Hideki Sato, Tokyo (JP); Hiroshi Saito, Tokyo (JP); Kazumi Matsuura, Tokyo (JP); Kazuhisa Shinoda, Tokyo (JP); Minoru Owada, Tokyo (JP); Yasuyuki Mochizuki, Tokyo (JP); Michio Orita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 583 days.

(21) Appl. No.: 10/237,629

(22) Filed: Sep. 10, 2002

(65) Prior Publication Data

US 2003/0008679 A1    Jan. 9, 2003

Related U.S. Application Data

(62) Division of application No. 09/263,957, filed on Mar. 8, 1999.

(30) Foreign Application Priority Data

Apr. 26, 1996  (JP)  .................................... 8-106999
May 23, 1996  (JP)  .................................... 8-128538
Nov. 15, 1996  (JP)  .................................... 8-304872

(51) Int. Cl.
*H04B 1/38*    (2006.01)

(52) U.S. Cl. ................ 455/566; 455/556.1; 455/550.1; 455/575.1

(58) Field of Classification Search ................ 455/566, 455/556.1, 556.2, 557, 550.1, 575.1, 575.2, 455/90.1, 575.9; 345/173, 169; 379/433.04, 379/433.06

See application file for complete search history.

(56) References Cited

U.S. PATENT DOCUMENTS

| | | | |
|---|---|---|---|
| 5,151,946 A | | 9/1992 | Martensson |
| 5,237,499 A | | 8/1993 | Garback |
| 5,337,346 A | | 8/1994 | Uchikura |
| 5,396,264 A | | 3/1995 | Lopatukhin et al. |
| 5,414,444 A | | 5/1995 | Britz |
| 5,450,619 A | | 9/1995 | Maeda |
| 5,465,401 A | | 11/1995 | Thompson |
| 5,570,413 A | * | 10/1996 | Ahlberg et al. .......... 455/550.1 |

(Continued)

FOREIGN PATENT DOCUMENTS

EP    0 472 361 A    2/1992

(Continued)

*Primary Examiner*—Lana Le
(74) *Attorney, Agent, or Firm*—Birch, Stewart, Kolasch & Birch, LLP

(57) ABSTRACT

The objective of the present invention is to have a desired screen displayed with shortened waiting time in using functions for the electronic note, etc., while engaging in telephone talk. Another prime objective of the present invention is to achieve an easy-to-use mobile information terminal equipment which also functions as an electronic note, word processor, personal computer, and so on. In transitting from telephone mode (cover closed status) to information terminal mode (cover opened status), the screen to be displayed is determined to be either a historical information, talk log information, or user setting screen. This enables the user to obtain the desired screen with fewer number of operations and with less waiting time.

20 Claims, 53 Drawing Sheets

U.S. PATENT DOCUMENTS

| | | |
|---|---|---|
| 5,584,054 A | 12/1996 | Tyneski et al. |
| 5,603,100 A | 2/1997 | Yasuda |
| 5,642,102 A | 6/1997 | Panther et al. |
| 5,646,649 A | 7/1997 | Iwata et al. |
| 5,657,370 A | 8/1997 | Tsugane et al. |
| 5,669,069 A | 9/1997 | Rautila |
| 5,710,576 A | 1/1998 | Nishiyama et al. |
| 5,715,524 A * | 2/1998 | Jambhekar et al. ......... 455/566 |
| 5,719,936 A | 2/1998 | Hillenmayer |
| 5,745,579 A | 4/1998 | Newman |
| 5,797,089 A | 8/1998 | Nguyen |
| 5,956,656 A | 9/1999 | Yamazaki |
| 6,009,338 A * | 12/1999 | Iwata et al. .............. 455/575.9 |
| 6,047,196 A | 4/2000 | Makela et al. |
| 6,112,099 A | 8/2000 | Ketola |
| 6,128,475 A | 10/2000 | Wicks et al. |
| 6,141,540 A | 10/2000 | Richards et al. |
| 6,535,749 B1 * | 3/2003 | Iwata et al. .............. 455/556.2 |
| 6,807,276 B1 * | 10/2004 | Hirayama et al. ..... 379/433.06 |
| 6,856,820 B1 * | 2/2005 | Kolls ...................... 455/575.1 |
| 2003/0153354 A1 * | 8/2003 | Cupps et al. .............. 455/90.1 |
| 2004/0171381 A1 * | 9/2004 | Inselberg ................ 455/556.2 |
| 2004/0203554 A1 * | 10/2004 | Simon ........................ 455/557 |

FOREIGN PATENT DOCUMENTS

| | | |
|---|---|---|
| EP | 0 534 478 A | 3/1993 |
| EP | 0 535 903 A | 4/1993 |
| EP | 0 651 545 A | 5/1995 |
| FR | 2 722 632 A | 1/1996 |
| GB | 2 287 561 A | 9/1995 |
| GB | 2 297 661 A | 8/1996 |
| JP | 63155858 | 6/1988 |
| JP | 01 243646 A | 12/1989 |
| JP | 485895 A | 3/1992 |
| JP | 467381 | 6/1992 |
| JP | 5211464 A | 8/1993 |
| JP | 5-244241 | 9/1993 |
| JP | 6284067 | 10/1994 |
| JP | 07 095279 A | 4/1995 |
| JP | 07 162916 A | 6/1995 |
| JP | 0 678 987 A | 10/1995 |
| JP | 8-63437 A | 3/1996 |
| JP | 8-65375 | 3/1996 |
| JP | 8-79830 | 3/1996 |

* cited by examiner

Fig.6

| A | 松井 一郎(MATSUI ICHIRO) | | YA |
|---|---|---|---|
| KA | 松浦 次郎(MATSUURA JIRO) | | RA |
| SA | 松江 三郎(MATSUE SABURO) | | WA |
| TA | 松川 五郎(MATSUKAWA GORO) | □ | A |
| NA | 松岡 四郎(MATSUOKA SHIRO) | | B |
| HA | 松島 六郎(MATSUSIMA ROKURO) | | C |
| | 松村 七郎(MATSUMURA SHICHIRO) | | D |
| MA | 松本 八郎(MATSUMOTO HACHIRO) | | |
| | 松山 九郎(MATSUYAMA KURO) | | |

□DETAILS □TALK LOG □MEMO □SCHEDULE ■ADDRESS □TELEPHONE BOOK

Fig.7

| | |
|---|---|
| A | YA |
| KA | RA |
| SA | WA |
| TA | A |
| NA | B |
| HA | C |
| MA | D |

NAME: 松浦 次郎(MATSUURA JIRO)
HOME ADDRESS:〒247, KAMAKURA MANSION 100
　　　　　　　　KAMAKURA1-1-1 KAMAKURA-CITY
*HOME PHONE:(0467)11-2222*
HOME FAX:(0467)99-8888
COMPANY NAME:TOKYO DENKI CO.LTD.
DEPT. POSITION: DEVELOPMENT DEPT.
　　　　　　　　DEVELOPMENT SECTION MANAGER
OFFICE ADDRESS: 〒100, TOKYO 9-9-9 TOKYO-WARD TOKYO
OFFICE PHONE: (03)3333-4444
OFFICE FAX:(03)7777-6666

☐NAME ☐TALK LOG ☐MEMO ☐SCHEDULE ■ADDRESS ☐TELEPHONE
LIST                                                    BOOK

Fig.11

| | | | |
|---|---|---|---|
| 10 | ☐ 1995.2.16 9:12 | (0467)12-3456 | WATANABE CONSTRUCTION [ME.] [ADD.] |
| 11 | ■ 1995.2.16 10.34 | (03)6543-1234 | YAMADA FLORIST |
| 12 | ● 1995.2.16 12:56 | (0467)99-3456 | SHIMIZU ELECTRIC [ME.] [SCH.] |
| 13 | ○ *1995.2.16 15:21* | *(0467)12-3456* | *KIMURA WATCH* [ME.]/[SCH.]/[ADD.] |
| 14 | ▲ 1995.2.16 17:43 | LD12345.melco | WATANABE ICHIRO |
| 25 | △ 1995.2.16 20.05 | SD12345.melco | WATANABE HANAKO [ADD.] |

ADDRESS BOOK

SCHEDULE

MEMO

TALK LOG

☐ DETAILS    ■ TALK LOG  ☐ MEMO  ☐ SCHEDULE  ☐ ADDRESS  ☐ TELEPHONE BOOK

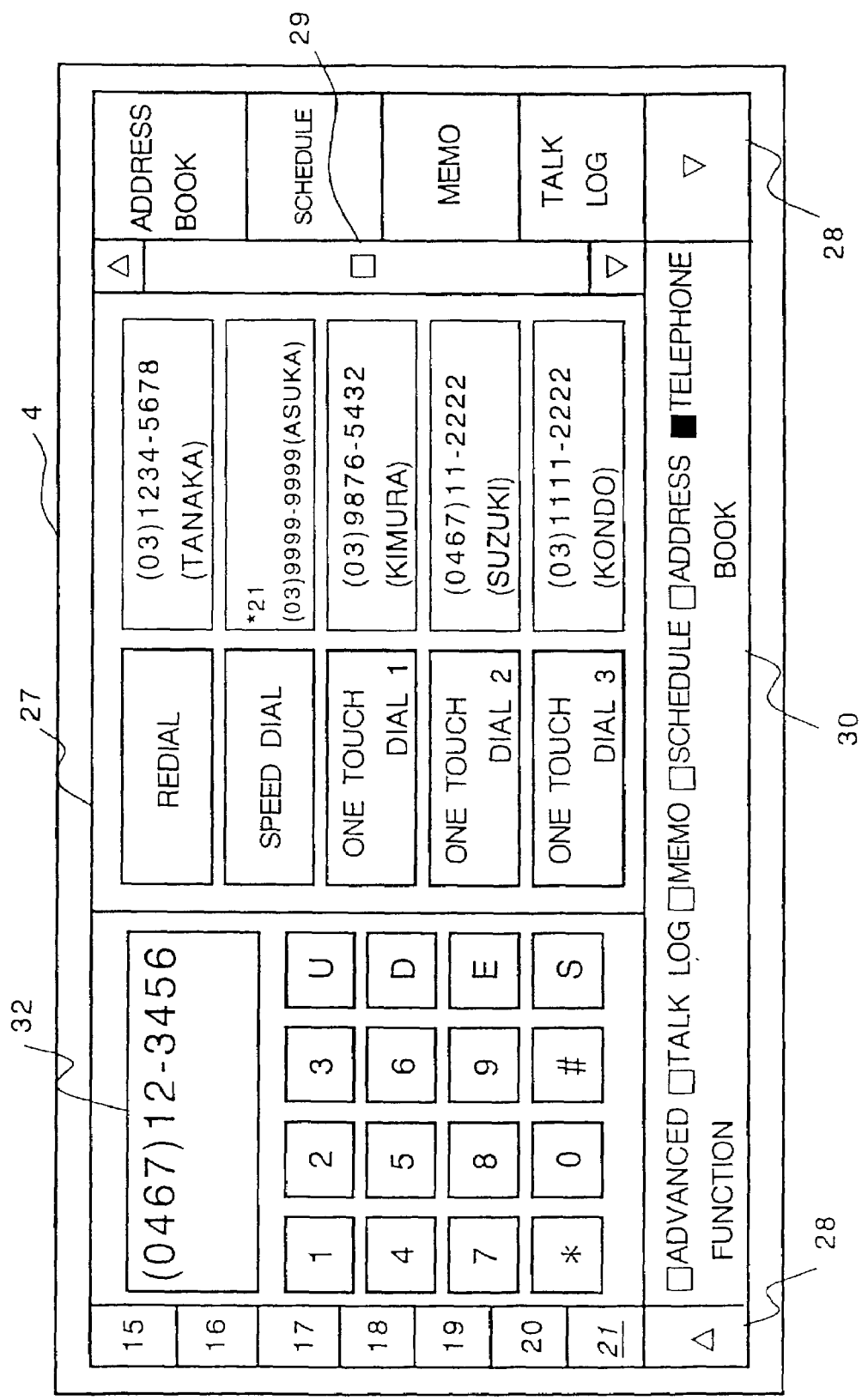

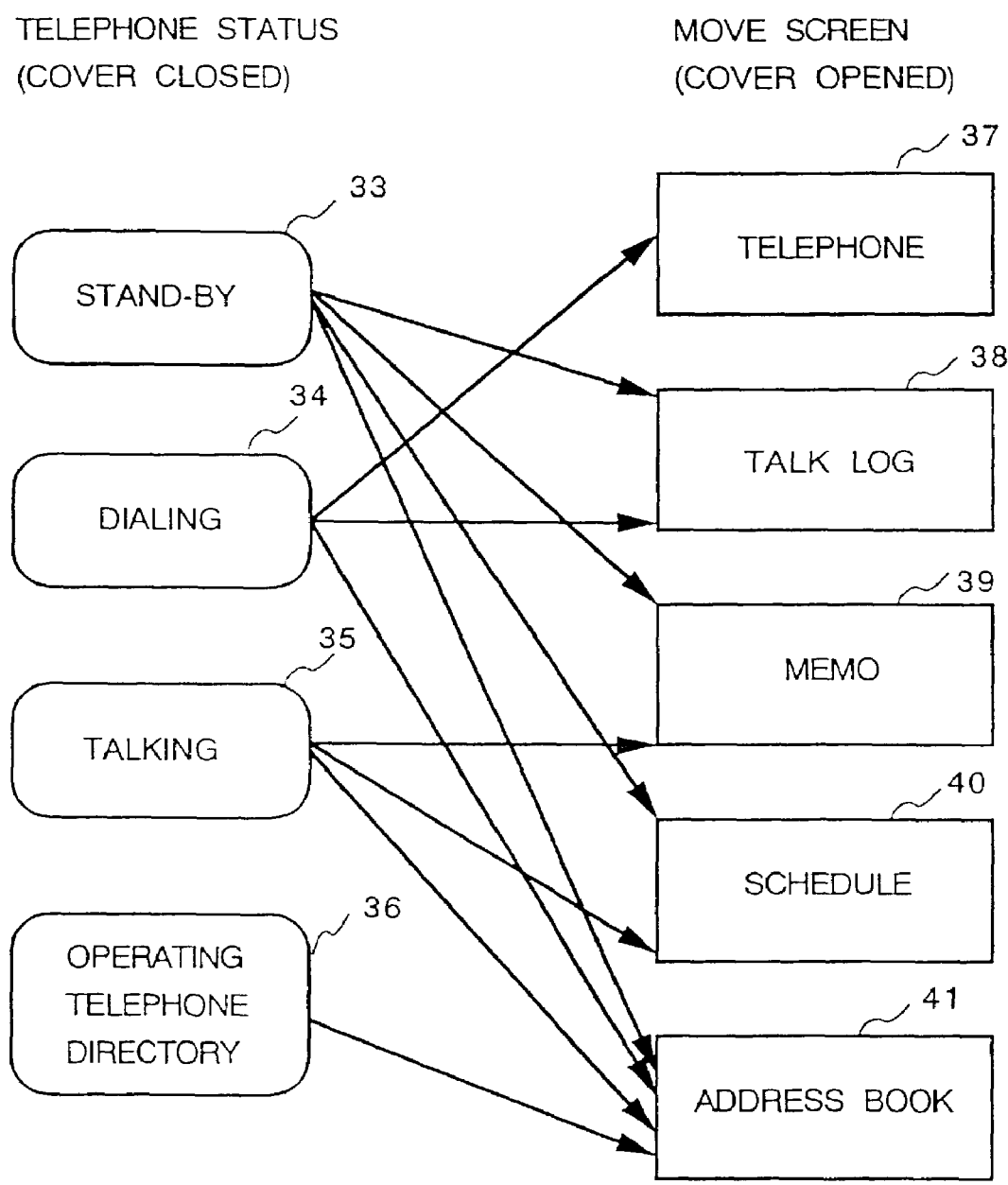

Fig.14

| TELEPHONE STATUS (COVER CLOSED) 43 | MOVE CONDITION 44 | MOVE SCREEN (COVER OPENED) 45 |
|---|---|---|
| STAND BY 33 | USER SETTING | USER SET SCREEN |
| STAND BY 33 | HISTORY SETTING | HISTORY SET SCREEN |
| STAND BY 33 | NO SETTING | ADDRESS BOOK 41 SCREEN |
| DIALING 34 | USER SETTING | USER SET SCREEN |
| DIALING 34 | NO USER SETTING | TELEPHONE 37 SCREEN |
| TALKING 35 | USER SETTING | USER SET SCREEN |
| TALKING 35 | CORRESPONDING TALK LOG 38 | TALK LOG 38 SET SCREEN |
| TALKING 35 | HISTORY SETTING | HISTORY SET SCREEN |
| TALKING 35 | NO SETTING | MEMO 39 SCREEN |
| OPERATING TELEPHONE DIRECTORY 36 | USER SETTING | USER SET SCREEN |
| OPERATING TELEPHONE DIRECTORY 36 | NO USER SETTING | ADDRESS BOOK 41 SCREEN |

| TELEPHONE STATUS (COVER CLOSED) 47 | MOVE SCREEN (COVER OPENED) 48 |
|---|---|
| STAND BY 33 | — |
| DIALING 34 | TALK LOFG 38 |
| TALKING 35 | — |
| OPERATING TELEPHONE DIRECTORY 36 | TALK LOFG 38 |

| HISTORY NO. | TELEPHONE STATUS (COVER CLOSED) | TRANSITION DIRECTION | SCREEN (COVER OPENED) |
|---|---|---|---|
| 9 | STAND BY 33 | ↑ | — |
| 8 | STAND BY 33 | ↓ | SCHEDULE 40 |
| 7 | OPERATING TELEPHONE DIRECTORY 36 | ↑ | TALK LOG 38 |
| 6 | STAND BY 33 | ↓ | ADDRESS BOOK 41 |
| 5 | STAND BY 33 | ↑ | SCHEDULE 40 |
| 4 | DIALING 34 | ↓ | TELEPHONE 37 |
| 3 | STAND BY 33 | ↑ | MEMO 39 |
| 2 | TALKING 35 | ↓ | TALK LOG 38 |
| 1 | STAND BY 33 | ↑ | MEMO 39 |

Fig.17

| TYPE | TALK TIME & DATE | PHONE NO. | OPPOSITE PARTY | ADDRESS 1 | TYPE 1 | ADDRESS 2 | TYPE 2 | ADDRESS 3 | TYPE 3 |
|---|---|---|---|---|---|---|---|---|---|
| □ | 1995.2.16/9:12 | (0467)12-3456 | WATANABE CONSTRUCTION CO. LTD. | 30100 | [ME.] | | | | |
| ■ | 1995.2.16/10:34 | (03)6543-1234 | YAMADA FLORIST | — | — | 10010 | [ADD.] | — | — |
| ● | 1995.2.16/12:56 | (0467)99-3456 | SHIMIZU ELECTRIC | 30200 | [ME.] | 20200 | [SCH.] | — | — |
| ○ | 1995.2.16/15:21 | (0467)12-3456 | KIMURA WATCH | 10200 | [ADD.] | 20440 | [SCH.] | 30300 | [ME.] |
| ▲ | 1996.2.16/17:43 | LD12345. melco | WATANABE ICHIRO | — | — | — | — | — | — |
| △ | 1996.2.16/20:05 | SD12345. melco | WATANABE HANAKO | 10230 | [ADD.] | — | — | — | — |
| | | | | | | | | | |

Fig.28

| A | | | | | | | | YA |
| KA | | | | | | | | RA |
| SA | | | | | | | | WA |
| TA | | | | | | | | A |
| NA | | | | | | | | B |
| HA | | | | | | | | C |
| MA | | | | | | | | D |

NAME: 松浦 次郎(MATSUURA JIRO)
HOME ADDRESS:〒247, KAMAKURA MANSION 100
　　　　　　　　KAMAKURA1-1-1 KAMAKURA-CITY
*HOME PHONE:(0467)11-2222*
HOME FAX:(0467)99-8888
COMPANY NAME:TOKYO DENKI CO.LTD.
DEPT. POSITION:DEVELOPMENT DEPT.
　　　　　　　　DEVELOPMENT SECTION MANAGER
OFFICE ADDRESS: 〒100, TOKYO 9-9-9 TOKYO-WARD TOKYO
OFFICE PHONE: (03)3333-4444
OFFICE FAX:(03)7777-6666

☐NAME ☐TALK LOG ☐MEMO ☐SCHEDULE ■ADDRESS ☐TELEPHONE
LIST                                                    BOOK

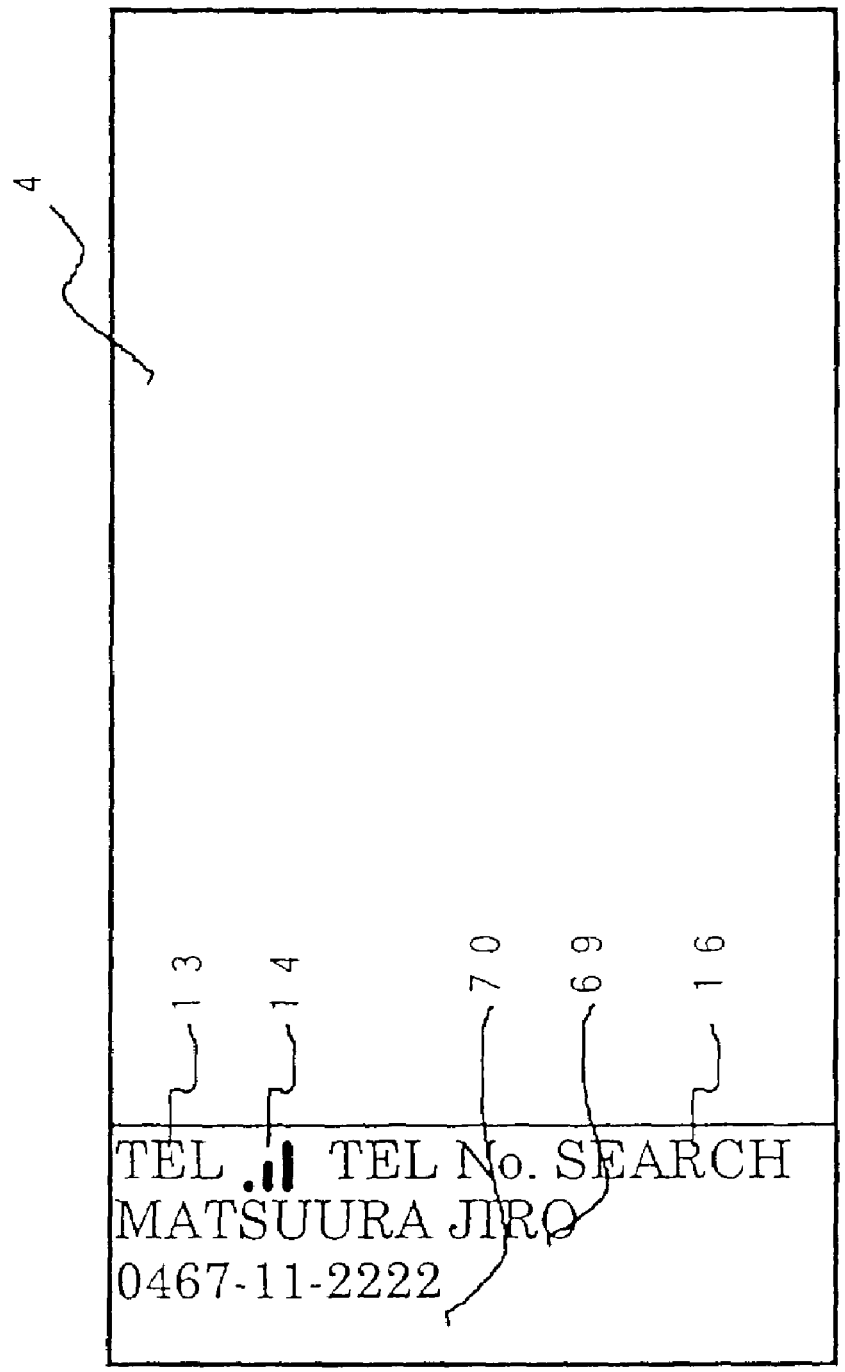

Fig.30

| NAME[0] / DEPT. POSITION | HOME ADDRESS / OFFICE ADDRESS | HOME PHONE[*] / OFFICE PHONE | HOME FAX / OFFICE FAX | COMPANY NAME / FORE AND BACK POINTERS |
|---|---|---|---|---|
| 71 | 72 | 73 | 74 | 75 |
| 76 | 77 | 78 | 79 | 80 |
| 松井 一郎 (MATSUI ICHIRO) | | | | |
| | | | | |
| 松浦 次郎 (MATSUURA JIRO) | 〒247, KAMAKURA MANSION 100 KAMAKURA1-1-1 KAMAKURA-CITY | (0467)11-2222 | (0467)99-8888 | TOKYO ELECTRIC CO.LTD. |
| MANAGER DEVELOPMENT DEPT. DEVELOPMENT SECTION | 〒100, TOKYO 9-9-9 TOKYO-WARD TOKYO | (03)3333-4444 | (03)7777-6666 | 10600 11200 |
| 松江 三郎 (MATSUE SABURO) | | | | |
| | | | | |
| 松岡 四郎 (MATSUOKA SHIRO) | | | | |
| | | | | |
| 松川 五郎 (MATSUKAWA GORO) | | | | |
| | | | | |
| 松島 六郎 (MATSUSIMA ROKURO) | | | | |
| | | | | |
| 松村 七郎 (MATSUMURA SHICHIRO) | | | | |
| | | | | |
| 松本 八郎 (MATSUMOTO HACHIRO) | | | | |
| | | | | |
| 松山 九郎 (MATSUYAMA KURO) | | | | |
| | | | | |
| | | | | |

Fig.31

1995 YEAR 11MONTH 20DATE (MONTH)

1995 YEAR 11 MONTH 20DATE (MONTH)

MOBILE INFORMATION TERMINAL EQUIPMENT AND PORTABLE ELECTRONIC APPARATUS

This application is a divisional of co-pending application Ser. No. 09/263,957, filed on Mar. 8, 1999, the entire contents of which are hereby incorporated by reference and for which priority is claimed under 35 U.S.C. § 120; and this application claims priority of Application Nos. 8-106999, 8-128538, and 8-304872 filed in Japan on Apr. 26, 1996, May 23, 1996, and Nov. 15, 1996 respectively under 35 U.S.C. § 119.

BACKGROUND OF THE INVENTION

The present invention relates to a mobile information terminal equipment, more particularly, to a mobile radio wave communication equipment, such as a mobile telephone, furnished with functions including electronic note, data communication, word processor, personal computer, and so on.

Moreover, the present invention relates to the communication control and user interface of a terminal for which the mobile radio wave communication equipment such as a mobile telephone and personal information management functions are combined.

Furthermore, the present invention relates to the structure of a cover for protecting an input display unit for the portable electronic apparatus such as a mobile information terminal equipment.

BACKGROUND OF THE RELATED ART

As a conventional mobile information terminal equipment furnished with functions of a mobile telephone plus an electronic note, there is a mobile information terminal equipment disclosed in the official gazette of Japanese Unexamined Patent Publication No. HEI 5-211464 of Japan Patent Application. The outline of the Patent Publication No. HEI 5-211464 is given below.

FIG. 58 and FIG. 59 show the appearance of the conventional mobile information terminal equipment.

In FIG. 58, a body 1 of a mobile information terminal equipment, an antenna 2, a speaker 3, a liquid crystal display 4, a microphone 5, a telephone keyboard 6, and a cover 7 are illustrated.

FIG. 59 gives another front view with cover 7 opened, showing an electronic note keyboard 8 and a cover switch 9.

Telephone keyboard 6 for dialing keys is placed on the top of cover 7 installed on a mobile information terminal equipment body 1. Electronic note Keyboard 8 for character data input keys is installed from the back of cover 7 to the area covered by cover 7. A telephone mode and an electronic note mode are switched based on the output from a cover switch 9, which detects the opened/closed status of cover 7. When the cover is closed, the telephone mode is set, enabling the user to use the equipment as a regular mobile telephone. Meanwhile, the electronic note mode is set as the cover is opened, thus allowing the user to use it as an ordinary electronic note.

FIG. 60 shows the memory configuration for storing electronic note data of the mobile information terminal equipment. The memory is the Random Access Memory (RAM) and incorporated in mobile information terminal equipment body 1 (not shown in FIG. 58 and FIG. 59).

A telephone directory data memory 10, a schedule data memory 11, and a memorandum data memory 12 are illustrated in FIG. 60.

Telephone directory data memory 10 stores a name and a telephone number input from electronic note keyboard 8 as a pair. Schedule data memory 11 stores the activities input from electronic note keyboard 8 and the planned time and date for starting and ending each activity as a triad. Memorandum data memory 12 stores data input from electronic note keyboard 8 collectively.

FIG. 61, FIG. 62, and FIG. 63 show examples of screens displayed on liquid crystal display 4. Character strings are displayed on three lines on the screen. Line 1 shows a selected function, a mode name, and status information, and etc. Line 2 and line 3 show data input from telephone keyboard 6 or electronic note keyboard 8, and data read from the RAM, (not shown).

In telephone mode, e.g., when the cover is closed, a "TEL" 13 indicating telephone mode and a mark 14 for receiving sensitivity appear on line 1. A dialed data "0367895421" 15 input by pressing the numeric keys on telephone keyboard 6 is displayed on line 3 (FIG. 61).

When the cover is opened, e.g., in electronic note mode, and in telephone directory data search mode, "TEL.NO. SEARCH" 16 is displayed on line 1. On line 2, a retrieved data, a name "YAMADA TARO" 17 is displayed and on line 3, its telephone number "03-6789-5421" 18 is displayed, respectively (FIG. 62). Displayed data is retrieved from telephone directory data memory 10 shown in FIG. 60 of the RAM (not shown) incorporated in mobile information terminal equipment body 1. When the cover is opened, data can be easily retrieved, input, modified, deleted, etc. using electronic note keyboard 8 which has alphabetic keys, kana keys, and so forth.

When the cover is closed in the status shown in FIG. 62, telephone mode starts and "TEL" 13 and mark 14 for receiving sensitively are added to the display at line 1 (FIG. 63). Pressing the S (SEND) key at this status enables the user to actually dial the displayed telephone number, because it is in telephone mode.

In this way, the mobile information terminal equipment disclosed in the official gazette Japanese Unexamined Patent Publication No. HEI 05-211464 is a mobile telephone set having an electronic note function for facilitating the input of character data by installing the operation keys for electronic note on both the rear sides of the opening/closing part attached to the main cabinet and on the body surface covered with the opening/closing part.

Another example of the conventional mobile information terminal equipment is disclosed in Japanese Unexamined Patent Publication No. HEI 06-284067 of Japan Patent Application. The mobile information terminal equipment is a mobile telephone with functions for a word processor or a personal computer.

FIG. 64 and FIG. 65 are the front views showing the appearance of the conventional mobile information terminal equipment.

FIG. 64 is the front view showing cover 7 in the closed status while FIG. 65 shows the front view of cover 7 in the opened status.

In FIG. 65, a hinge 19 is shown. For the conventional mobile information terminal equipment, cover 7 and mobile information terminal equipment body 1 are overlapped in parallel with the plane in the front view. Mobile information terminal equipment body 1 is coupled with cover 7 by hinge 19, which can hold the cover at a necessary position from the closed status to the opened status.

When the mobile information terminal equipment is used as a mobile telephone, as shown in FIG. 64, mobile information terminal equipment body 1 is overlapped with cover 7, and used with cover 7 in the closed status. The power source key P on telephone keyboard 6 is pressed. When there is a call-in, pressing down the send key S on telephone keyboard 6 enables a telephone talk. Furthermore, pressing down the one-touch key D on telephone keyboard 6 makes corresponding dial signals to be automatically transmitted, thus allowing a call-out. When a talk ends, the ending talk key E on telephone keyboard 6 is pressed.

To dial manually for a call-out, after the power source key P is pressed, cover 7 is opened. Then, a send key (not shown) of electronic note keyboard 8 is pressed, and the dial number is input from dial keys (not shown) of electronic note keyboard 8. After that, cover 7 is closed, and talking is enabled when the equipment is entered to a talk mode.

When using as a word processor or a personal computer, after the power source key P on telephone keyboard 6 is pressed with the cover in the closed status, cover 7 is opened, and with cover 7 in the opened status, designated keys (not shown) of electronic note keyboard 8 are operated to activate the application. Operating the input mode selection keys (not shown) of electronic note keyboard 8 to select either a kana or roman character input mode renders it possible to function as a word processor or to input necessary data into a personal computer. Moreover, input characters can be displayed on liquid crystal display 4 so that the input data can be confirmed.

FIG. 66 is a flowchart showing the execution of a processor (not shown) incorporated in mobile information terminal equipment body 1. The program shown in this flowchart is stored in the ROM incorporated in mobile information terminal equipment body 1.

The processor periodically detects whether or not an input has been made (S1). When an input is detected, it is analyzed (S2), and at the judgement step S3, so as to detect whether or not the input is related to the telephone function, to the application, or to the read/write of the data of the Integrated Circuit (IC) card.

If the input is related to the telephone function, information is exchanged (S4) with a control circuit (not shown) (for example, information such as the send key is operated, or end-talk key is operated, etc., is transmitted, and when call-in information is received, corresponding necessary information is displayed, and so on).

If the input is related to the application, the corresponding application is activated, and the control is handed over to the application (S5). As the application software, a word processor software, communication software, database, table calculation software are pre-loaded or loaded from the IC card and stored in the RAM (not shown) incorporated in mobile information terminal equipment body 1.

If the input is related to the data read/write of the IC card, data transmission is implemented between the RAM (not shown) incorporated in mobile information terminal equipment body 1 and the IC card (S5).

For the mobile information terminal equipment disclosed in the Japanese Unexamined Patent Publication No. Hei 06-284067, the cabinet of the mobile radio telephone set is separated into two pieces on its surface parallel to the front surface, and on the facing surfaces, a display unit and keys for inputting characters are provided. Thus it provides a structure which does not damage the portability even when a large-size display and many keys are installed. The two pieces separated on the surface parallel to the front surface of the cabinet of the telephone set are coupled with a hinge, which permits the pieces to hold still whichever position necessary from the closed to the opened status. When the two pieces are in the closed, overlapped status, dial operation or telephone talk is enabled by using the operation panel on which the one-touch dial key, end-talk switch, power source switch, etc., are provided. For using as a word processor or a personal computer, and not as a mobile telephone set, the two pieces are kept in the opened status, and the character data can be input by dint of a large-size display and many keys provided for the character input.

Meanwhile, for the structure of protective cover of the input display unit of the electronic apparatus, as disclosed in Japanese Unexamined Patent Publication No. Hei 04-85895 of the Japan Patent Application, a shaft is set on part of the protective cover, and the shape of the guide groove is modified with the shaft as the base, and a rotating or sliding structure is provided.

The Japanese Unexamined Utility Model Publication No. Hei 04-67381 of the Japan Utility Model Application discloses a lap-top electronic apparatus which has a groove in the protective cover to cover the display by sliding the cover.

However, above two structures expose the input display unit when they are used, and they simply protect the input display unit with the cover when they are not used. They serve only for the purpose of protecting the input display unit, but they do not serve to improving the protection of the key panel, steadiness, or operability.

For example, FIG. 67 shows a model of an electronic apparatus with a protective cover.

In the figure, an electronic apparatus body 101, a protective cover 102, an input display unit 103, a guide groove 104, a shaft 105, an operation button 106, and a pen 107 are illustrated.

The operation is explained next.

The electronic apparatus body 101 inputs data by pressing input display unit 103 with pen 107, and displays necessary information on input display unit 103. Besides, it has operation buttons such as switches. In order to protect input display unit 103, it has protective cover 102 having a shaft 105 which engages guide groove 104. The protective cover 102 is closed when the electronic apparatus is not in use. The protective cover is opened with the hinge structure when the electronic apparatus is to be used. Although not shown in the figure, changing the shape of guide groove 104 realizes different types of installing of the protective cover 102.

PROBLEMS TO BE SOLVED BY THE INVENTION

Because the conventional mobile information terminal equipment is configured as aforementioned, the disclosure in the Japanese Unexamined Patent Publication No. Hei 05-211464 renders it possible to increase the number of keys while retaining portability to a certain degree, facilitating the input operation and featuring additional functions to the electronic note. However, it is not able to enlarge the screen of the liquid crystal display, posing some problems in seeing the display screen. Furthermore, all functions and data of the electronic note are retrieved in sequential order, which inhibits the user from retrieving and obtaining the desired data instantaneously.

In addition, although the disclosure in the Japanese Unexamined Patent Publication NO. HEI 06-284067 made the screen of the liquid crystal display larger and the number of keys increased, it was not handy for using it with its cover opened (as a word processor or a personal computer) by holding with one hand, thus posing the problem of portability. On top of that, it was not easy to dial manually because the cover must be opened and closed.

Furthermore, both of the conventional equipments had the same problem. The conventional equipment does not work as a telephone while the cover is opened, and if the cover is opened during telephone talk, a desired screen would not appear. Besides, although functions for the computer and electronic note of inputting characters, etc., are realized with maintaining the portability of a mobile telephone to a certain extent, the keys for telephone operation and the keys for character input operation must be provided separately. This required the increase in the number of physical keys in case of adding or extending the information processing functions other than the telephone, thereby sophistication of the mobile information terminal equipment had to face the problem from both aspects of the cost and the size.

Furthermore, the structure of the protective cover of the conventional electronic apparatus made it difficult to handle its opening or closing with one hand. It also had such problems of unintentionally pressing the switches while inputting with a pen. Or, the opening and closing structure was complex, it was prone to be broken, and the number of parts was increased. It also had a problem-that it is not easy to hold the equipment in hand because the width of the equipment is increased at opening and closing portion of the cover. It also had a problem that the cover was standing in the way when the cover was in the opened status.

As has explained thus far, the protective cover of the conventional electronic apparatus had problems of operability and durability.

The present invention is aimed at overcoming abovementioned problems. It aims at obtaining a mobile information terminal equipment that enables the user to telephone regardless of the status of its opened or closed cover. It is again another object of the present invention to achieve the mobile information terminal equipment enabling the user to open or close the cover with ease during talking over the telephone. It is yet another object of the present invention to achieve a mobile information terminal equipment enabling the user to use functions for the electronic note, word processor, personal computer, etc., easily during talking over the telephone. It is again another object of the present invention to obtain a mobile information terminal equipment excellent in portability with an easy-to-see screen and improved operability. It is further object of the present invention to achieve a mobile information terminal equipment which allows the extension of the information processing functions without adding physical keys, and which allows the use of the information processing functions and data communication functions effectively during telephone talk.

Furthermore, the present invention aims at solving the above mentioned problems, and at improving the operability and durability of the protective cover for the input display unit of the mobile electronic apparatus.

SUMMARY OF THE INVENTION

A mobile information terminal equipment may comprise a slide cover for sliding and covering part of a surface of the mobile information terminal equipment.

The mobile information terminal equipment may further comprise a display unit for displaying information on a display area in part of the surface of the mobile information terminal equipment, a location detector for detecting a location of the slide cover, and a display switch for changing a size of the display area for displaying information and a displaying direction of information according to the location of the slide cover detected by the location detector.

A mobile information terminal equipment may comprise a display unit for displaying an application screen, wherein information may be displayed in telephone mode when the mobile information terminal equipment may be used as a telephone set and in information terminal mode when the mobile information terminal equipment may be used as an information terminal, and wherein one of the applications among a plurality of applications, each of which may have one or more application screens and display one of the application screens on the display unit may be executed in telephone mode, and a subsequent screen determinator for selecting possible subsequent screens among a plurality of application screens and for determining one application screen to be displayed among the possible subsequent screens in case of transitting from telephone mode to information terminal mode.

The mobile information terminal equipment may further comprise a transition table for setting a transition condition and a subsequent screen in accordance with a use status in telephone mode, and wherein the subsequent screen determinator may determine the subsequent screen based on the transition table.

The mobile information terminal equipment may further comprise a user information setter for arbitrarily setting the subsequent screen as user information in accordance with the use status in telephone mode, and wherein the subsequent screen set as the user information may be retrieved as the possible subsequent screen based on which the subsequent screen may be determined.

The mobile information terminal equipment may further comprise a historical information storage for storing the use status in telephone mode and history of the subsequent screen, and wherein the subsequent screen stored in the historical information may be retrieved as the possible screen based on which the subsequent screen may be determined.

The mobile information terminal equipment may further comprise a talk log information storage for storing talk log information of telephone mode including the subsequent screen displayed during telephone talk, wherein the mobile information terminal equipment may be possible to transit from telephone mode to information terminal mode during telephone talk, and wherein the subsequent screen may be set based on the talk log information as one of the possible subsequent screens.

The mobile information terminal equipment may be, wherein data obtained in information terminal mode may be used in telephone mode after information terminal mode may be transitted to telephone mode.

The mobile information terminal equipment may be, wherein the application may be possible to activate another application, and at least one of data displayed on a preceding application screen and data pertaining to the data displayed used in a preceding application screen and data may be displayed on a subsequent application screen, in information terminal mode.

The mobile information terminal equipment may further comprise a cover, and wherein the mobile information terminal equipment may be used in telephone mode irrespective of a location of the cover.

The mobile information terminal equipment may be, wherein the talk log information storage may further store the data concerning the subsequent screen during telephone talk as the talk log information, and the data may be displayed on the subsequent screen when the subsequent screen stored in the talk log information may be displayed.

The mobile information terminal equipment may further comprise a reservation application among the applications executed in information terminal mode, and wherein the reservation application may have an input screen on which information necessary for reservation may be input and then transmitted.

The mobile information terminal equipment may further comprise a voice output unit and a telephone keyboard used in telephone mode, an application which may have an application screen on which data may be input/output in information terminal mode, and wherein an input request from an opposite party may be made by one of outputting the input request into the voice output unit and displaying the input request on the application screen display unit, and a response to the opposite party may be input from the telephone keyboard in telephone mode, wherein an input request from the opposite party may be displayed on the application screen and a response to the opposite party may be input onto the application screen in information terminal mode, and wherein the application may be executed in telephone mode and in information terminal mode.

The mobile information terminal equipment may be, wherein a content of the display unit in telephone mode may be selected and discarded before being displayed on the display unit when transitting from information terminal mode to telephone mode.

The mobile information terminal equipment may comprise the telephone keyboard for inputting data in telephone mode, wherein the application may be executed one of by limiting its functions and by selecting and discarding the information to be displayed on the display unit in information terminal mode.

A mobile information terminal equipment having a body may comprise a display unit having a touch screen, a door having a display window on part of the display unit a switch button, a door opening/closing detector for detecting door opened/closed status, a first software module for providing a user interface when using as a telephone set in the door closed status, and a second software module for providing a user interface when using as an information processor in the door opened status.

The mobile information terminal equipment may be, wherein the first and the second software modules may share information for a telephone operation.

The mobile information terminal equipment may further comprise a third software module for providing a function to access the shared data.

The mobile information terminal equipment may be, wherein the mobile information terminal equipment may be used as a telephone set in the door closed status by the same operation as that for a mobile telephone with the switch button.

The mobile information terminal equipment may be, wherein characters and pictographs may be displayed on the display window of the door in the direction easier to see when the body may be vertically held in the door closed status.

The mobile information terminal equipment may be, wherein the touch screen may be located under the door and touched by pressing the switch button of the door in the door closed status, and a touch input may be mapped with the switch button of the door.

The mobile information terminal equipment may be, wherein the touch screen may be directly touched in the door opened status, and wherein a personal management information function, telephone, and data transmission may be enabled by graphic user interface (GUI) using a display screen.

The mobile information terminal equipment may be, wherein the characters and pictographs may be displayed on the display unit in the direction easier to see when the body may be horizontally held in the door opened status.

The mobile information terminal equipment may be, wherein the touch input may be mapped with the graphic user interface in the door opened status.

The mobile information terminal equipment may comprise a microphone and a speaker, and wherein the input sensitivity to the microphone and the output from the speaker may be adjustable so that the user may use the body in hand-free condition with ear and mouth released from the body when the door may be opened from the door closed status.

The mobile information terminal equipment may further comprise a microphone, a voice signal switch unit, a radio unit, and a modem, and a control unit for controlling the microphone, the voice signal switch unit, the radio unit and the modem, and wherein the control unit may instruct the voice signal switch unit to temporarily shut a path from the microphone to the radio unit during talk to validate a path from the modem to the radio unit, so as to switch the line used for the telephone to the modem to allow the user to halt the talk being conducted with hand-free condition and to transmit the data including the information written using the personal management function, and then may resume the talk upon completion of the data transmission.

A portable electronic apparatus may comprise an input display unit for inputting information and displaying the information, a key panel with switches, a body with the input display unit and the key panel allocated on a surface, and a slide cover mounted on the surface of the body for opening/closing the input display unit.

The portable electronic apparatus may be, wherein the slide cover may be used to select one of the input display unit and the key panel and to protect the covered other part.

The portable electronic apparatus may further comprise a rail on the body for sliding the slide cover.

The portable electronic apparatus may further comprise a support projection on the surface for supporting an inside of the slide cover.

The portable electronic apparatus may further comprise a switch on the rail for detecting opened/closed status of the slide cover.

The portable electronic apparatus may further comprise a cut-off part on the slide cover for displaying part of the input display unit even when it may be covered with the slide cover.

The portable electronic apparatus may further comprise a transparent part on the slide cover.

The portable electronic apparatus may further comprise the opening/closing support projection for the slide cover and the rail for keeping the slide cover in its opened/closed position.

The portable electronic apparatus may further comprise projection on the rail for preventing the slide cover from falling off the body.

The portable electronic apparatus may further comprise a convex on the slide cover for facilitating a slide operation on the surface.

The portable electronic apparatus may further comprise the slide operation support projection on the slide cover for making the slide cover smoothly slide against the rail.

BRIEF DESCRIPTION OF THE DRAWINGS

In the drawings,

FIG. 6 is a figure showing an example of displaying a name list of an ADDRESS BOOK of the mobile information terminal equipment with its cover opened of the present invention;

FIG. 7 is a figure showing an example of displaying detailed information of an ADDRESS BOOK of the mobile information terminal equipment with its cover opened of the present invention;

FIG. 11 is a figure showing an example of displaying a TALK LOG of the mobile information terminal equipment with the cover opened of the present invention;

FIG. 12 is a figure showing a display example of a TELEPHONE screen of the mobile information terminal equipment with the cover opened of the present invention;

FIG. 13 is a figure explaining the operation of moving from the cover closed to the cover opened status of the mobile information terminal equipment of the present invention;

FIG. 14 is a figure showing an example of transition table of the mobile information terminal equipment of the present invention;

FIG. 15 is a figure showing an example of the user information of the mobile information terminal equipment of the present invention;

FIG. 16 is a figure showing an example of historical information of the mobile information terminal equipment of the present information;

FIG. 17 is a figure showing an example of a TALK LOG of the mobile information terminal equipment of the present invention;

FIG. 28 is a figure of an ADDRESS BOOK screen explaining the operation for moving from the cover opened status to the cover closed status of the mobile information terminal equipment of the present invention;

FIG. 29 is a figure of a display screen of telephone mode explaining the operation for moving from the cover opened to the cover closed status of FIG. 28 of the mobile information terminal equipment;

FIG. 30 is a figure showing an example of data format of an ADDRESS BOOK stored in the RAM of the mobile information terminal equipment of the present invention;

FIG. 31 is a figure showing an example of a screen for seat reservation of the mobile information terminal equipment with the cover opened of the present invention;

DESCRIPTION OF THE PREFERRED EMBODIMENTS

Embodiment 1

Embodiment 1 of the mobile information terminal equipment of the present invention is explained below with reference to figures. Firstly, the mechanical configuration of the mobile information terminal equipment of the present invention is explained with FIGS. 1 and 2.

Figure 1:
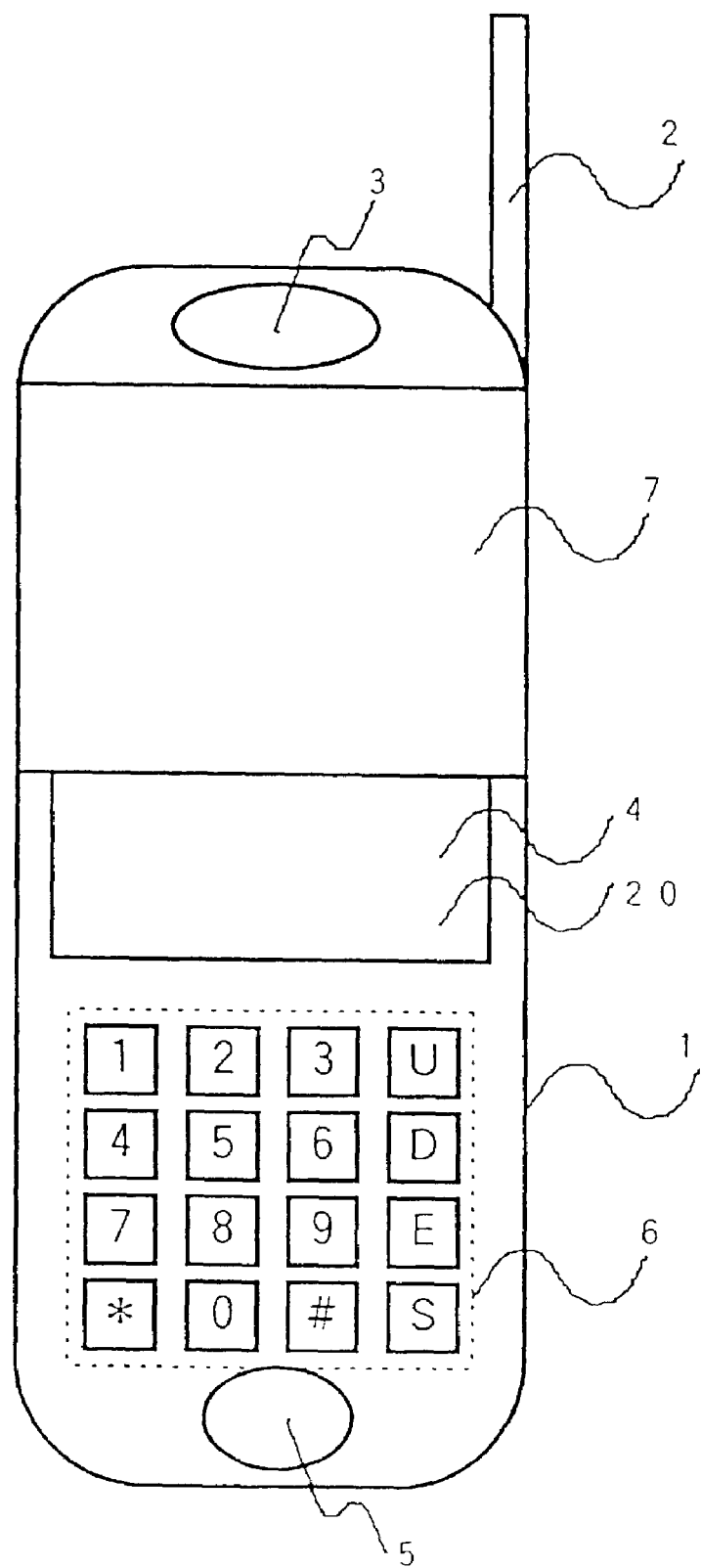
FIG. 1 is a front view showing the appearance of the mobile information terminal equipment of Embodiment 1 of the present invention.
Figure 2:
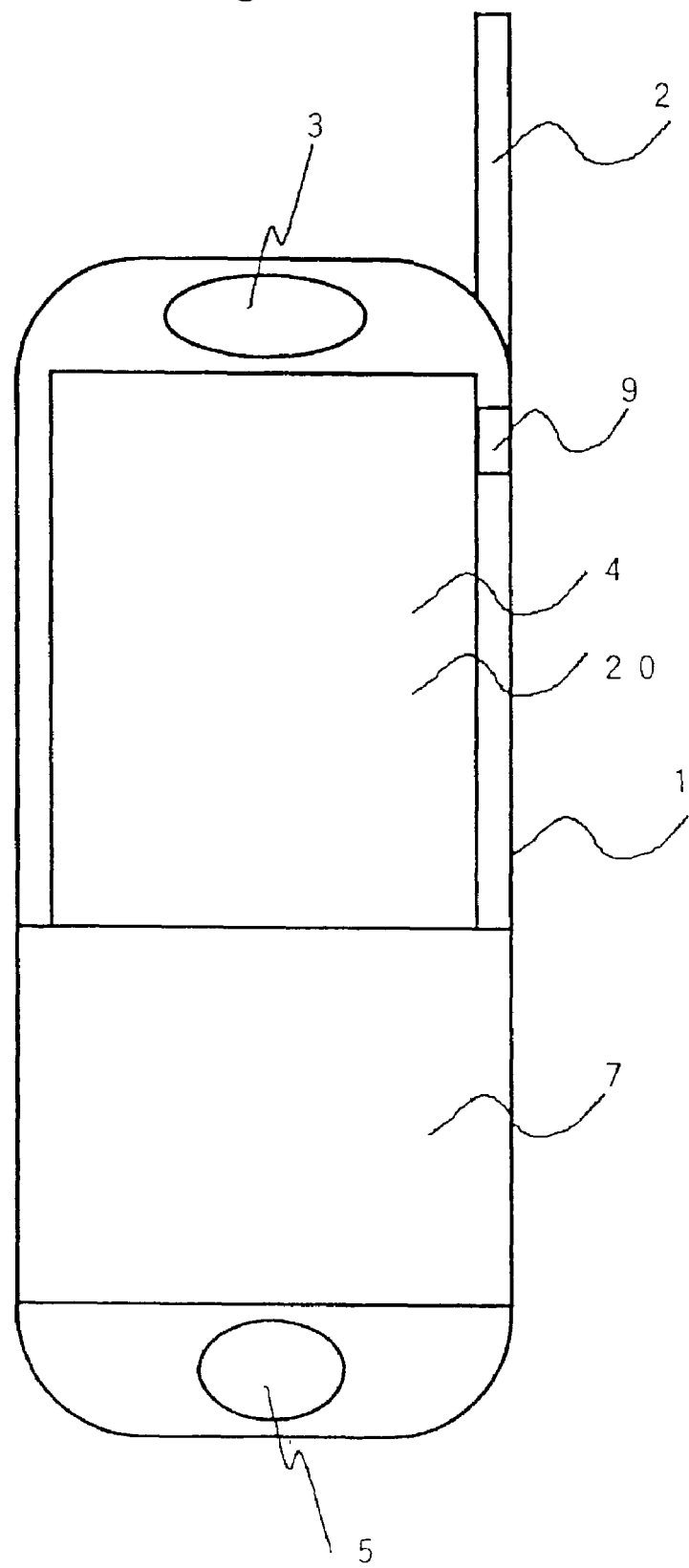
FIG. 2 is a front view showing the appearance of the mobile information terminal equipment of Embodiment 1 of the present invention.

FIG. 1 and FIG. 2 are the front views showing the appearance of the mobile information terminal equipment according to the present invention.

In FIG. 1 and FIG. 2, a touch screen 20 is a transparent tablet on which the coordinate can be input with a pen (not shown) or by touching it with a finger. The configuration elements, the same parts, or corresponding parts explained in the conventional examples are given the same reference numbers and their explanation is omitted.

Touch screen 20 is attached on liquid crystal display 4, and constituting an input/output device (called the liquid crystal tablet) used for display and input operation. For the mobile information terminal equipment of this Embodiment, cover 7 moves (slides) up and down along the plane surface on the drawing shown in FIG. 1 and FIG. 2. FIG. 1 shows that cover 7 is at the top and FIG. 2 shows cover 7 at the bottom. In contrast with the conventional mobile information terminal equipment, FIG. 1 is called as the status in which the cover is closed (cover closed status) and FIG. 2 is called as the status in which the cover is opened (cover opened status).

As a location detector for detecting a location of cover 7, a cover switch 9 is employed. Cover switch 9 detects the opened/closed status of cover 7, and if the cover is in the closed status, telephone mode is set. If the cover is in the opened status, information terminal mode is set and used as an information terminal equipment.

In the cover closed status (FIG. 1), mechanismwise, the appearance becomes a mobile telephone, telephone keyboard 6 can be used, and only the bottom part of liquid crystal display 4 is exposed, and only the exposed part can be used. On the other hand, in the cover opened status (FIG. 2), although the entire liquid crystal display 4 is exposed, telephone keyboard 6 is hidden and unavailable. In this status, normally it is turned by 90 degrees, and used with its right side before the user, in view of the drawing shown in FIG. 2.

Even during telephone talk, the cover can be easily opened by slide cover 7 with the hand holding mobile information terminal equipment body 1. In the cover opened status, by holding the side of microphone 5 of mobile information terminal equipment body 1 with the left hand, data input or menu selection, etc., can be easily done by holding a pen (not shown) with the right hand or by touching touch screen 20 with the fingertip of the right hand. In addition, because the screen becomes horizontally long, it becomes easy to see the screen in light of the user interface.

The electrical configuration of the mobile information terminal equipment of the present invention is explained next using FIG. 3.

Figure 3:
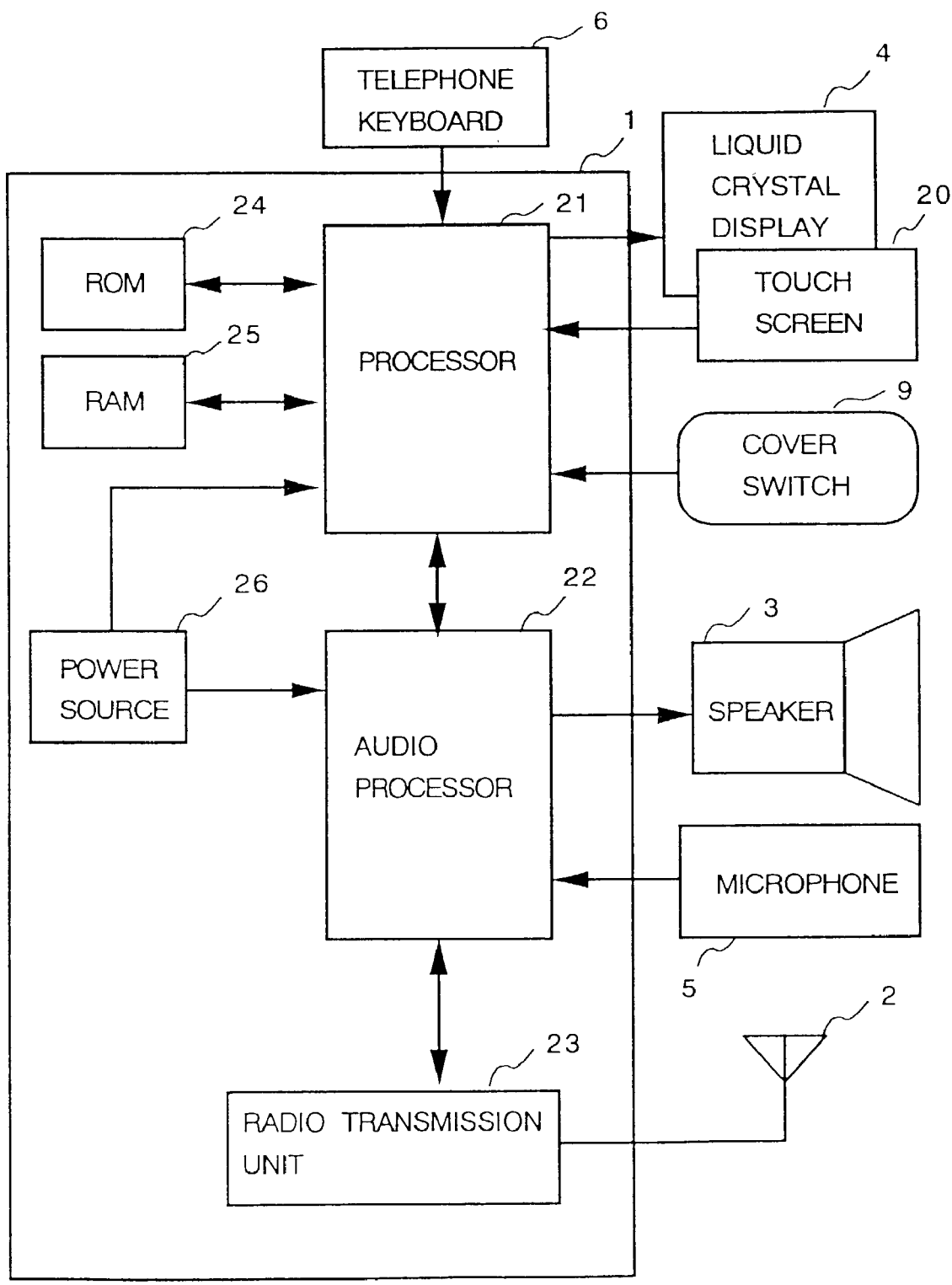
FIG. 3 shows an electrical configuration of the mobile information terminal equipment of Embodiment 1 of the present invention.

In FIG. 3, a processor 21, an audio processor 22, a radio transmission unit 23, a Read Only Memory (ROM) 24, a Random Access Memory (RAM) 25, and a power source 26 are illustrated. These components are incorporated in mobile information terminal equipment body 1.

Processor 21 handles the digital data and implements functions of the electronic note, word processor, personal computer, etc., and controls liquid crystal display 4, touch screen 20, and the input/output of telephone keyboard 6, and performs the controlling according to the cover opening/closing signal sent from cover switch 9. Programs executed by this processor are stored in ROM 24, and various rewritable application data is kept in RAM 25. For the prevention of malfunction, processor 21 stops the operation of touch screen 20 in the cover closed status, and stops the operation of telephone keyboard 6 in the cover opened status.

Audio processor 22 handles analog data, and performs the input/output control of speaker 3 and microphone 5 of the telephone function. Radio transmission unit 23 conducts processing related to the radio, such as the high-frequency modulation and demodulation of the mobile telephone. Furthermore, power source 26 supplies power to processor 21, audio processor 22, and so on.

The operation of cover closed status of the mobile information terminal equipment regarding the present invention is explained next, specifically centering on the user interface, with FIG. 4 and FIG. 5.

Figure 4:
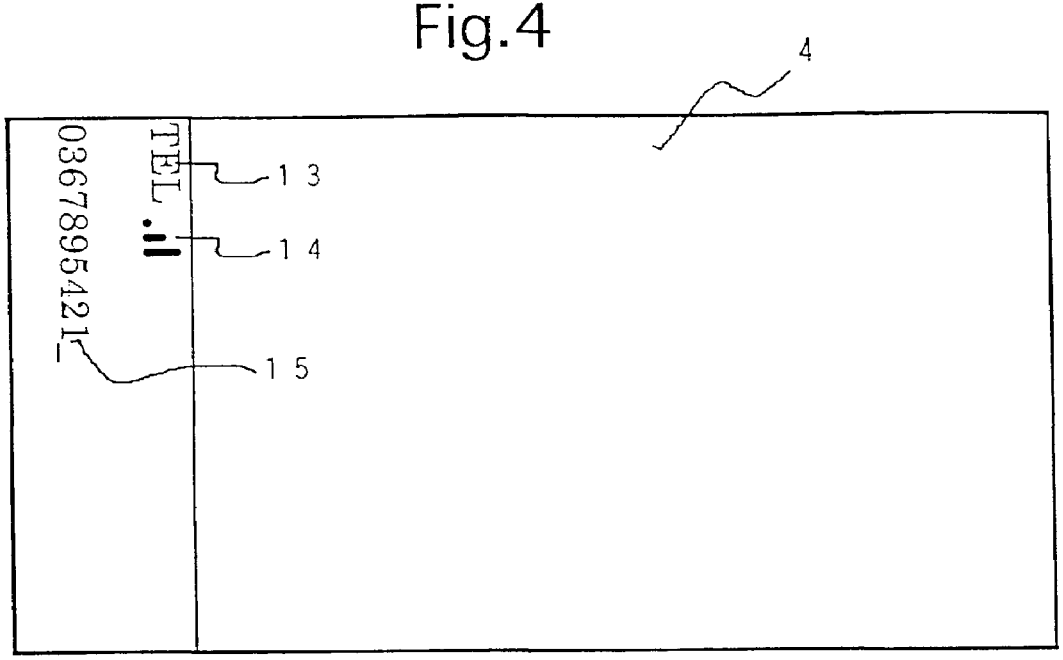
FIG. 4 is a figure explaining the operation (user interface) of the mobile information terminal equipment with its cover closed of the present invention.
Figure 5:
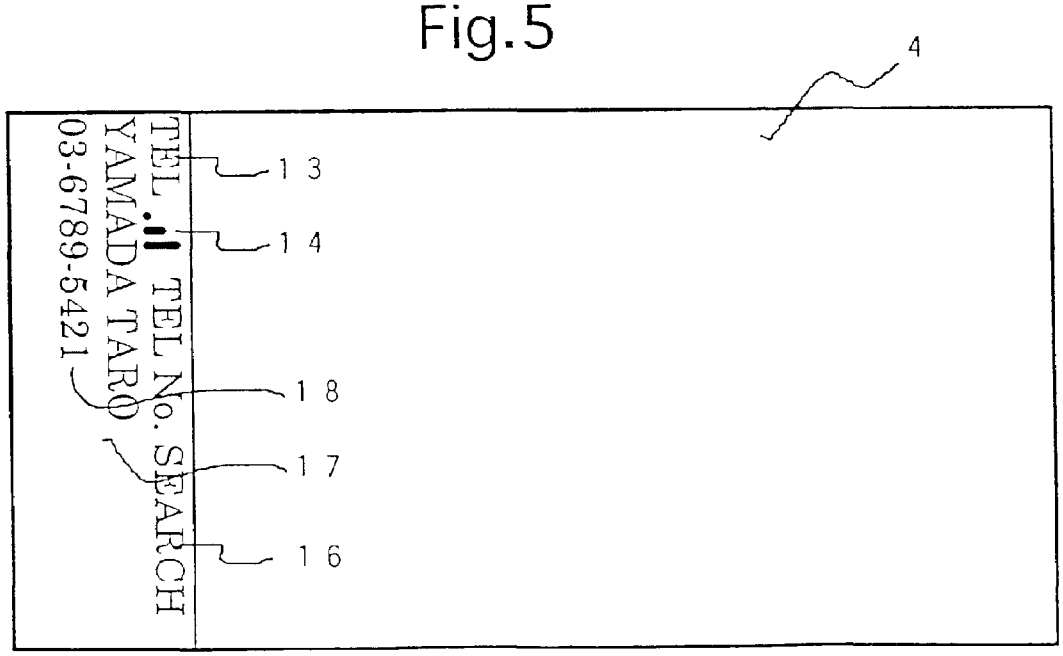
FIG. 5 is a figure explaining the operation (user interface) of the mobile information terminal equipment with the cover closed of the present invention.
Figure 61:
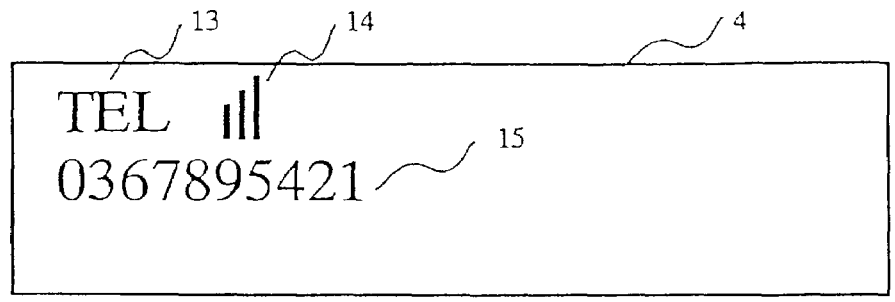
FIG. 61 shows an example of a screen displayed on liquid crystal display 4 of the conventional mobile information terminal equipment.
Figure 62:
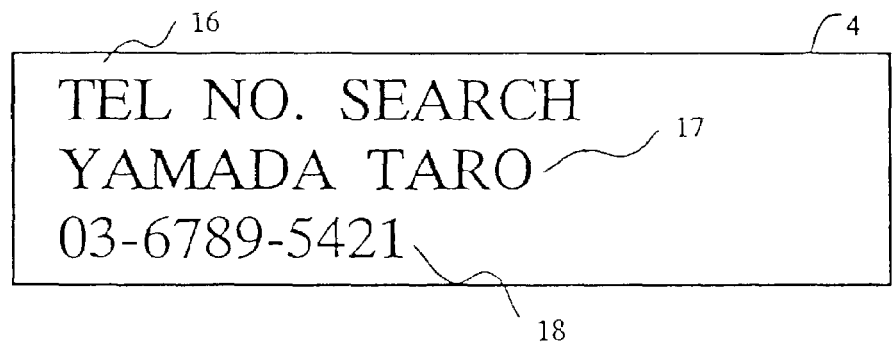
FIG. 62 shows an example of a screen displayed on liquid crystal display 4 of the conventional mobile information terminal equipment.
Figure 63:
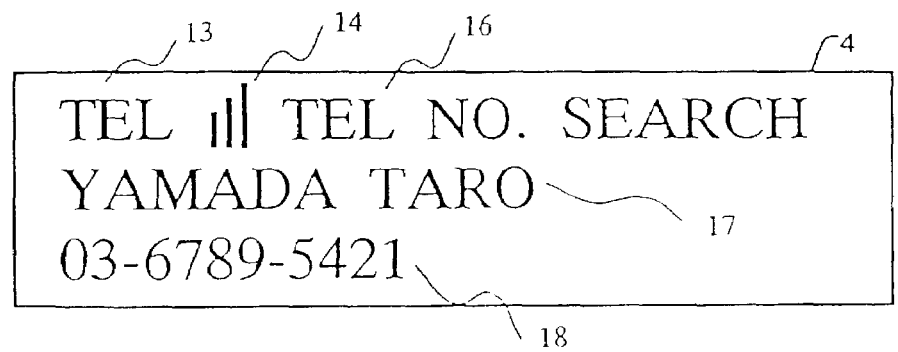
FIG. 63 shows an example of a screen displayed on liquid crystal display 4 of the conventional mobile information terminal equipment.
Figure 64:
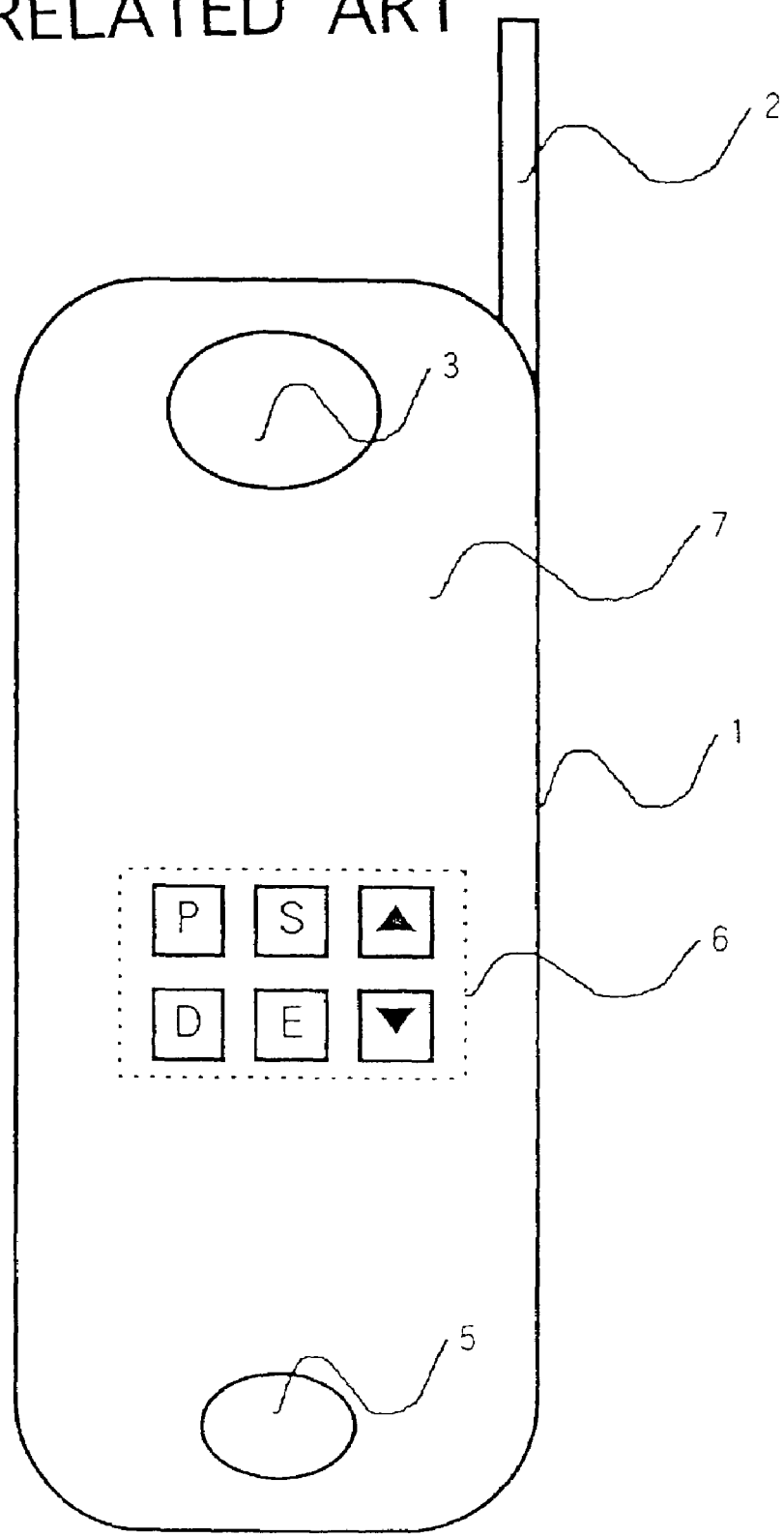
FIG. 64 is a front view showing the appearance of another conventional mobile information terminal equipment.
Figure 65:
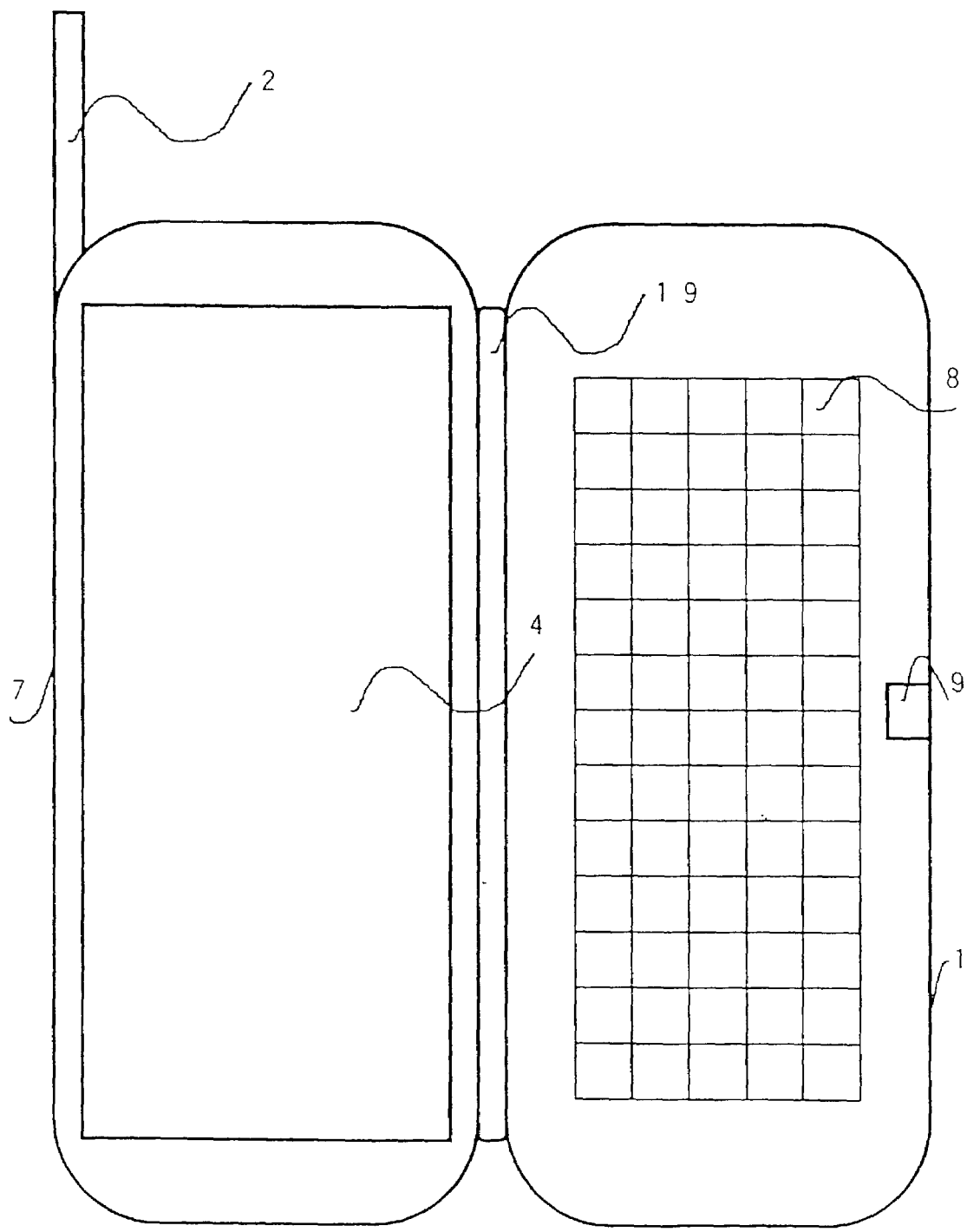
FIG. 65 is a front view showing the appearance of another conventional mobile information terminal equipment.
Figure 66:
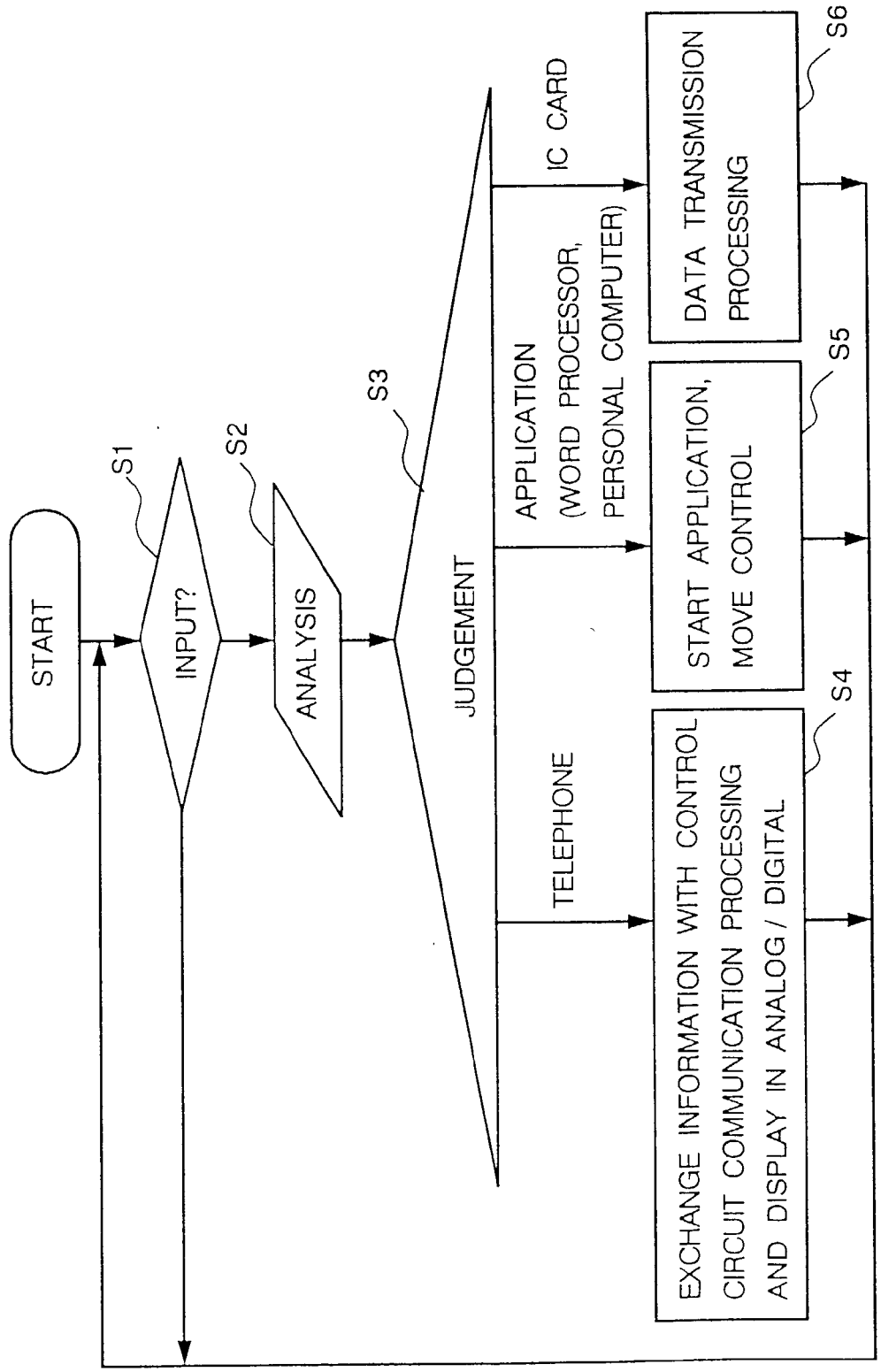
FIG. 66 is a flowchart showing an operation of another conventional mobile information terminal equipment.
Figure 67:
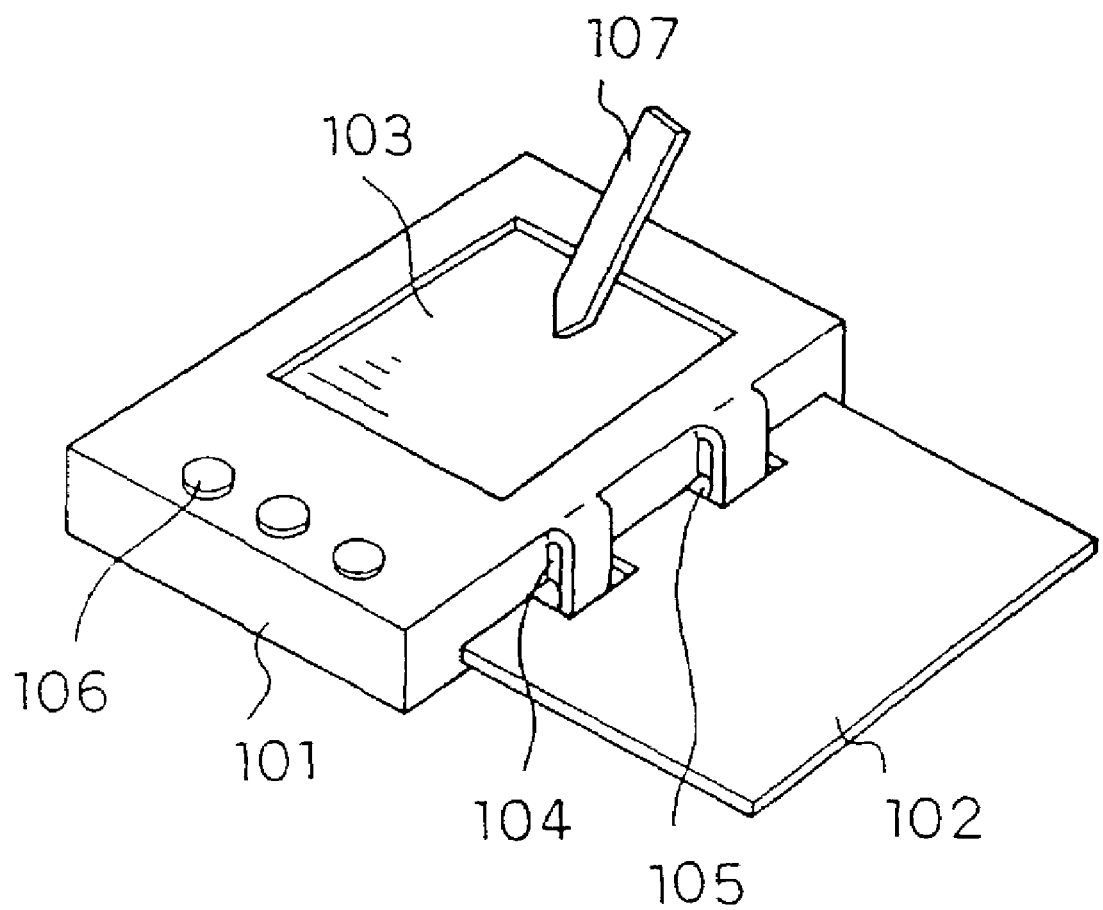
FIG. 67 shows a cover of the conventional portable electronic apparatus.

FIG. 4 and FIG. 5 show examples of screens displayed on liquid crystal display 4, corresponding to FIG. 61 and FIG. 62, respectively, showing the example of screens of the conventional mobile information terminal equipment.

The examples in FIG. 4 and FIG. 5 show the screens by placing the right side of the front view of the appearance of the mobile information terminal equipment of the present invention shown in FIG. 1 bottom.

The difference in display of the mobile information terminal equipment between the present invention and the conventional art is the contents on the screen are turned by 90 degrees leftward. In the cover closed status, because cover 7 shown in FIG. 1 covers liquid crystal display 4, the right side of liquid crystal display 4 shown in FIG. 4 and FIG. 5 cannot be used. Viewed from the case using in the cover opened status as the reference, the screen is turned by 90 degrees. Based on the output from cover switch 9 which detects the location of cover 7, a display switch (not shown) limits the display area of liquid crystal display 4 to the area shown in FIG. 1, and performs turning processing for the display characters and symbols by 90 degrees. For instance, for this 90-degree turning processing, the character font stored in ROM 24 is read, turning processing is implemented by processor 21, and then the content is displayed on liquid crystal display 4. In the cover closed status, touch screen 20 is In the sleeping or dead status, thus does not respond to the touch made with a pen or a finger.

The operation of the mobile information terminal equipment of the present invention in its cover opened status is explained next, especially focusing on the user interface using FIGS. 6 through 12.

Drawings in FIGS. 6 to 12 show the examples of the application screens (hereinafter, the screens) displayed on liquid crystal display 4.

Figure 8:
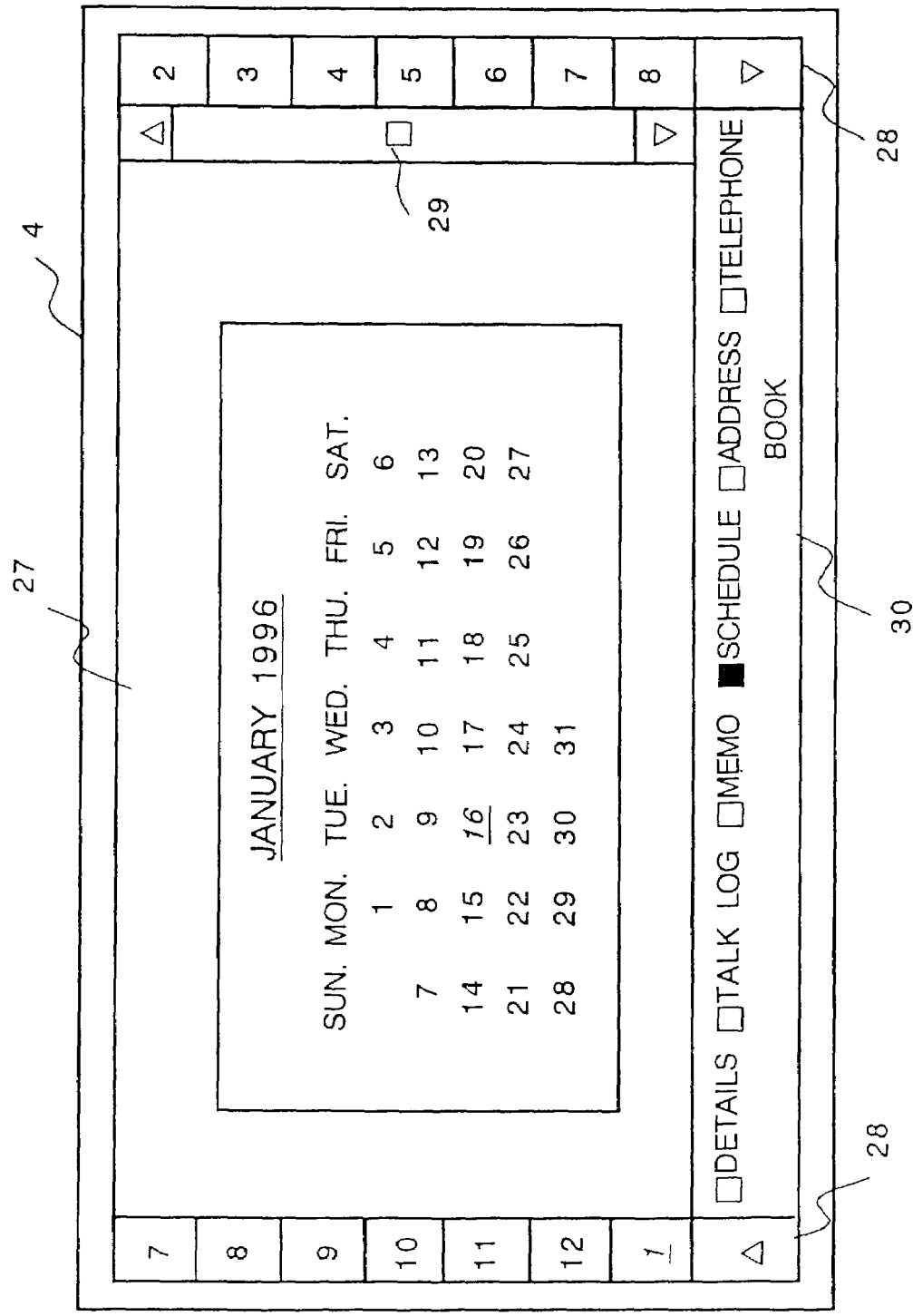
FIG. 8 is a figure showing an example of displaying a monthly calendar of a SCHEDULE of the mobile information terminal equipment with the cover opened of the present invention.
Figure 9:
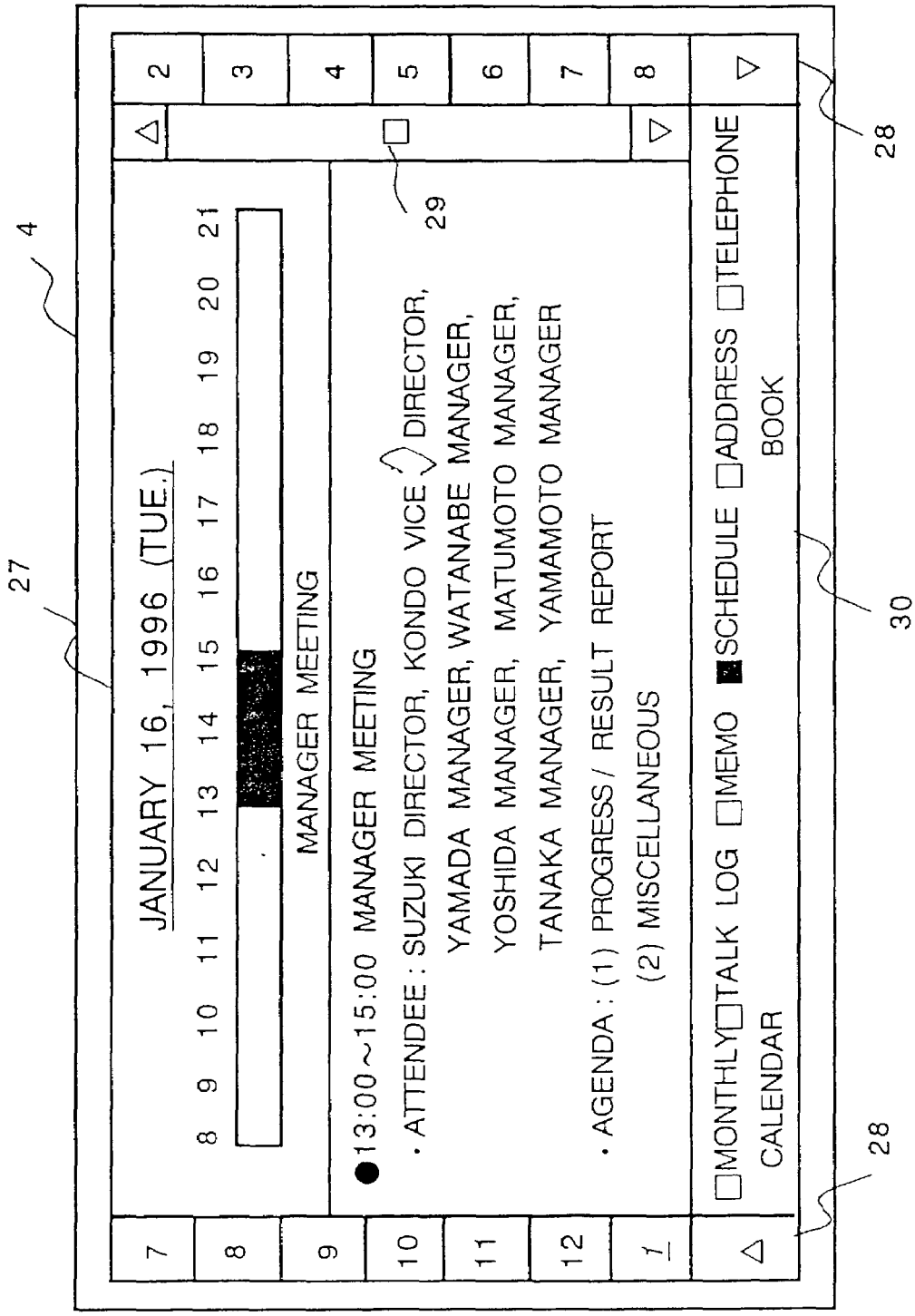
FIG. 9 is a figure showing an example of displaying the detailed information of a SCHEDULE of the mobile information terminal equipment with the cover opened of the present invention.
Figure 10:
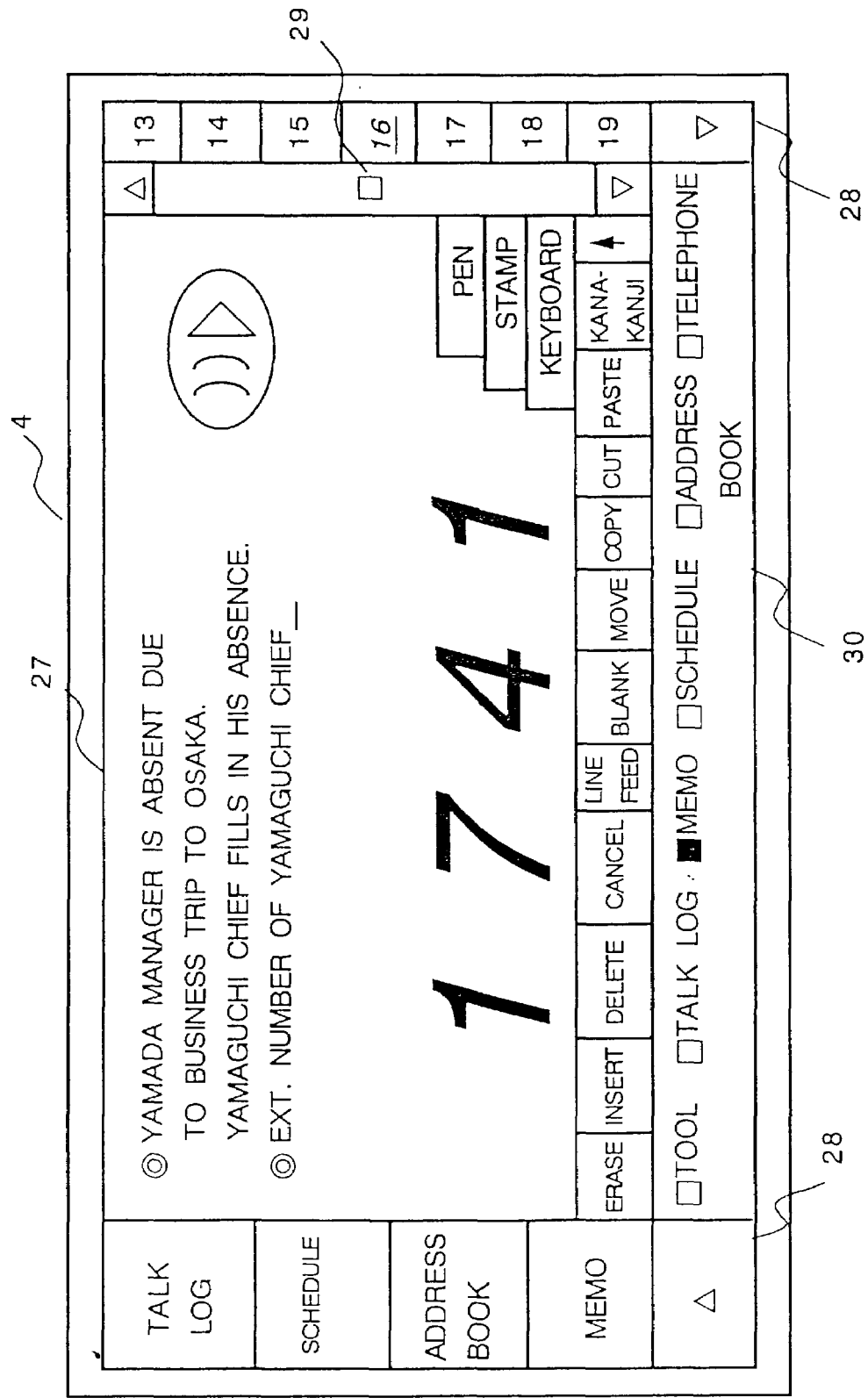
FIG. 10 is a figure showing an example of displaying a MEMO of the mobile information terminal equipment with the cover opened of the present invention.

FIG. 6 is a drawing showing a screen example displaying a name list of the ADDRESS BOOK. FIG. 7 is a drawing showing a screen example of displaying a detailed information of the ADDRESS BOOK. FIG. 8 is a drawing showing a screen example displaying a monthly calendar of the SCHEDULE. FIG. 9 is a drawing showing a screen example displaying detailed information of the SCHEDULE. FIG. 10 is a drawing showing a screen example displaying the MEMO. FIG. 11 is a drawing showing a screen example displaying the TALK LOG. And FIG. 12 is a drawing showing a screen displaying a case for making a phone call in the cover opened status.

FIG. 6 is explained first.

The display screen of liquid crystal display 4 contains major four areas, a content area 27, a tag area 28, a scroll area 29, and a menu area 30. Content area 27 displays various instruction information, and the user can select desired information out of the displayed content or input information. For the example of FIG. 6, a name list of the ADDRESS BOOK is displayed, and the user selects MATSUURA JIRO among them.

Tag area 28 displays tags related to the information displayed in content area 27. When a displayed tag is selected, the top data of the corresponding index is displayed on content area 27. For the example of FIG. 6, because NAME LIST is displayed, the vowel "A" and syllables "KA", "SA", "TA", "NA", "HA", "MA", "YA", "RA", and "WA" ending with "A" of the Japanese alphabets and the first four letters "A", "B", "C" and "D" from the English alphabets are displayed on the tag. Although English alphabets are displayed from "A" till "D" in this example, touching the scroll button "∇" on tag area 28 on the right bottom of the screen allows the tag display to sequentially scroll upward, thus enabling the selection of an alphabet from "E" down to "Z". In this example, if "MA" is touched and selected, for instance, MAEKAWA HANAKO (not shown in FIG. 6) is displayed at the top of the name list on content area 27.

Scroll area 29 is used to see the data in the neighborhood of the data displayed in content area 27. For instance, it is used to see the next page when the whole data cannot be displayed at once in content area 27. Touching the scroll buttons "Δ" and "∇" on the top and the bottom in scroll area 29 allows the hidden information to appear on the screen.

Menu area 30 displays the functional level menu. When a desired function is touched and selected from the menu, the function is activated and data is displayed on content area 27. For the example shown in FIG. 6, the name data of Japanese Kanji characters and Roman characters displayed in content area 27 is obtained by selecting the ADDRESS BOOK in menu area 30. The menu displayed in menu area 30 can be partially changed case by case so that the function can be easily activated even when the menu is hierarchical. Meanwhile, the basic functional-level menus are always displayed so that any one of the basic functions can be selected at any stage. The five basic functions in this example are the TALK LOG, MEMO, SCHEDULE, ADDRESS BOOK and TELEPHONE.

FIG. 7 is explained next.

As shown in FIG. 6, in the state in which the name list of the ADDRESS BOOK is displayed in content area 27, if MATSUURA JIRO displayed in content area 27 is double touched, or MATSUURA JIRO displayed in content area 27 is touched, and then the DETAILS displayed in menu area 30 is touched, content area 27 displays the screen of DETAILS of the ADDRESS BOOK as in FIG. 7. And in content area 27, HOME ADDRESS, HOME PHONE, HOME FAX, COMPANY NAME, DEPT. POSITION, OFFICE ADDRESS, OFFICE PHONE, OFFICE FAX, and etc., corresponding to the name MATSUURA JIRO are displayed. If HOME PHONE is double touched, for instance, the telephone function, which will be explained later is activated, and after the S button is touched, a telephone call can be made. At this stage, if the NAME LIST displayed in menu area 30 is touched, the status (the screen) shown in FIG. 6 can be recovered.

FIG. 8 is explained next.

When the SCHEDULE in menu area 30 is touched, the MONTHLY CALENDAR screen appears as shown in FIG. 8, and the calendar for this month is displayed in content area 27. Because the date becomes the retrieval key for the SCHEDULE, for instance, months are displayed in tag area 28. Similarly to the above-mentioned address book, the desired month can be displayed as the tag by touching the scroll buttons "Δ" or "∇" in tag area 28, and when the tag is touched, the screen displays the desired month, that is, the calendar for the desired month can be displayed in content area 27.

FIG. 9 is displayed next.

In the state in which MONTHLY CALENDAR of the SCHEDULE is displayed in content area 27, if the date "16" on the calendar of January 1996 is double touched or the date 16 displayed in content area 27 is touched, and then if the DETAILS displayed in menu area 30 is touched, content area 27 displays the screen of the DETAILS of the SCHEDULE as in FIG. 9. In content area 27, the schedule table (bar) by time corresponding to the date "16" is displayed on the top of content area 27. If the MANAGER MEETING displayed on the schedule table in content area 27 is touched, MEMO which is the detailed information corresponding to the MANAGER MEETING is displayed on the bottom of content area 27. If the MONTHLY CALENDAR displayed in menu area 30 is touched at this stage, the state (the screen) shown in FIG. 8 can be recovered.

FIG. 10 is explained next.

When the MEMO in menu area 30 is touched, the MEMO screen appears as shown in FIG. 10. Various word-processor functions (edit command, etc.) are displayed in content area 27, and characters can be input. Touching the KEYBOARD displayed in content area 27 makes the screen keyboard displayed, thereby enables the Input of characters at the screen keyboard. Furthermore, by touching the PEN, hand-written characters or diagrams can be input by the pen. Through the character recognition, Input hand-written characters or diagrams can be converted into the character code. In addition, the basic edit functions of the word processor, such as the deletion of input characters, character insertion to an arbitrary location, duplication, cutting, and pasting of arbitrary character strings, etc., can be used.

Moreover, not only characters but also voices can be input through microphone 5 and attached to the memo as a voice memo 31. Touching the attached voice memo 31 permits the replay of the recorded voice memo 31.

In this case, menus such as the TALK LOG, SCHEDULE, ADDRESS BOOK, MEMO, etc., are displayed on the left, and the schedule date is displayed on the right side of tag area 28. The display on the right side tag varies depending on the preceding menu. FIG. 10 shows the case moved from the SCHEDULE shown in FIG. 9. Double touching one of the tags displayed on the right in tag area 28 (for instance, the date "17") allows the screen to show the MEMO of the SCHEDULE of that date (Jan. 17, 1996), without once returning to the SCHEDULE.

On the other hand, the left tags in tag area 28 are used to link the preceding screen with the current screen. For instance, if the SCHEDULE is touched on tag area 28 on the MEMO screen of FIG. 10, the memo data written here is linked to the SCHEDULE for Jan. 16, 1996. In FIG. 10, after the date "17" on tag area 28 is touched, if the SCHEDULE on tag area 28 is touched, the memo data written here is linked with Jan. 17, 1996 of the SCHEDULE. If the function on menu area 30 is touched instead of touching the tag, the current screen is not linked with the next screen.

FIG. 11 is explained next.

When the TALK LOG on menu area 30 is touched, the TALK LOG screen appears as shown in FIG. 11. The date, the opposite party on the line, etc., are displayed in content area 27. For content area 27 of FIG. 11, □ indicates fax transmission, ■ fax receiving, ○ telephone call out, ● telephone call in, Δ mail transmission, and the black Δ indicates mail reception. The ME., SCH., and ADD. indicate that the memo, schedule, and address book exist corresponding to the telephone talk. When the ME., SCH., and ADD. are touched, each screen corresponding to the ME., SCH., and ADD. of the telephone talk appears.

In this case, the date tags are displayed on the left side and the menu tags are displayed on the right in tag area 28. When one of the date tags on the left is touched, one page of the TALK LOG corresponding to the touched date appears from the top in content area 27. If one of the menu tags on the right (for instance MEMO) is touched, the corresponding screen (the MEMO screen in this case) appears and the subsequent screen (the MEMO screen in this case) is linked and corresponded to the TALK LOG which has been selected on the preceding screen.

FIG. 12 is explained next.

When the TELEPHONE is touched on menu area 30, the TELEPHONE screen appears as shown in FIG. 12. A telephone set is displayed in content area 27, and a telephone call can be made. This screen appears when the home phone is double touched on the ADDRESS BOOK screen shown in FIG. 7, or when the log relating to the telephone is double touched on the TALK LOG screen of FIG. 11. In this case, the telephone number shown in the preceding screen is displayed on telephone number display window 32. When the send button S is touched, a telephone call can be made.

By touching the numeric buttons on the TELEPHONE screen shown in FIG. 12, a telephone number can be input manually, and then touching the send button S also allows the telephone call to be made. Just like a regular telephone, functions such as redial, speed dial, and one-touch dial are provided, each of which enabling a telephone call to be easily made by simply touching it. In the cover opened status, because the opposite parties and their numbers registered for the redial and one-touch dial are visually displayed as shown in FIG. 12, a very handy and easy-to-see user interface can be provided.

With the speed dial, touching the tag displayed in tag area 28 allows the telephone number and the opposite party registered to be displayed. FIG. 12 shows an example of a screen displayed in content area 27 when tag "21" on the left tag area 28 is touched. The telephone number (09) 9999-9999 and the name ASUKA stored at the 21st memory area are displayed to the right of the SPEED DIAL button. To select a number not displayed on the tag in tag area 28, touching the scroll buttons "Δ" and "∇" shown in tag area 28 allows it to be displayed. The menu tags displayed on the right of tag area 28 are the same as those explained for the TALK LOG with FIG. 11.

With FIG. 13, the subsequent screens which can be displayed at the time of the transition from telephone mode (the cover closed status) to the cover opened status are explained next.

There can be four statuses in telephone mode, a STAND BY status 33, a DIALING status 34, a TALKING status 35, and a TELEPHONE DIRECTORY OPERATING status 36. Meanwhile, as the subsequent screens for transitting to the cover opened status, the TELEPHONE screen 37, TALK LOG screen 38, MEMO screen 39, SCHEDULE screen 40, and ADDRESS BOOK screen 41 can be considered.

If, for instance, the cover is opened during the STAND BY status 33, the user may want to use a screen of either the TALK LOG screen 38, MEMO screen 39, SCHEDULE screen 40, or ADDRESS BOOK screen 41. Because it is in the STAND BY status 33, there are cases to immediately transit to TELEPHONE screen 37. If the cover is opened during the DIALING status 33, the TELEPHONE screen 37, TALK LOG screen 38, and ADDRESS BOOK screen 41 are the screens which the user may want to use. Because it is in the DIALING status 34, there are few cases to immediately transit to the MEMO screen 39 or SCHEDULE screen 40. If the cover is opened during the TALKING status 35, the user can use either the MEMO screen 39, SCHEDULE screen 40, or ADDRESS BOOK screen 41. Because it is in the TALKING status 35, there are few cases to immediately transit to TELEPHONE screen 37 or TALK LOG screen 38. Furthermore, if the cover is opened during the TELEPHONE DIRECTORY OPERATING status 36, ADDRESS BOOK screen 41 is the only screen available to the user.

In opening the cover, because the subsequent screens which can be displayed are limited to a certain one as explained above, it is possible that the subsequent screen can be automatically decided. Therefore, the number of touch operations can be reduced to improve the operability. By reducing the time to display the appearing screen, the call charge can be cut in case that the operation is taken in the TALKING status 35.

Among several possible subsequent screens from the TELEPHONE status shown in FIG. 13, how to decide which subsequent screen to be displayed is explained next.

FIG. 14 shows an example of a transition table 42 stored in ROM for the subsequent screen at the time of opening the cover.

On transition table 42, a TELEPHONE status 43, subsequent screen 45 when the cover is opened, and transition condition 44 for the subsequent screen are described. Some examples of transition conditions 44 are the presence or absence of user setting, the presence or absence of history setting, or the presence of absence of corresponding TALK LOG. The presence or absence of user setting indicates, when transitting from telephone mode to information terminal mode, whether or not the user has set the subsequent screen as the user information for each status of telephone mode. The presence or absence of the history setting indicates whether or not each status of telephone mode and the history of subsequent screen are stored when transitting from telephone mode to information terminal mode. The presence or absence of a talk log indicates, since the screen can be transitted to screen for information terminal mode, which are the MEMO screen, SCHEDULE screen, or ADDRESS BOOK screen, from telephone mode, whether or not the talk log information of the TELEPHONE including these subsequent screens during talk has been stored. Although the values on transition table 42 are expressed with words for the purpose of explanation, actually, they are coded.

The user can set, clear, or update the values for TELEPHONE status 43, transition condition 44, and subsequent screens 45 on transition table 42. In this case, transition table 42 is stored in RAM 25.

The user information setting means (not shown) stores user information in RAM 25. The user can set, clear, update the user information.

FIG. 15 shows one example of the user information stored in RAM 25. For user information 46 in this example, subsequent screen 48 can be set for each TELEPHONE status 47. If the user has not set any subsequent screen 48, for instance, "-" is stored. Although the values of user information 46 are expressed with words for the purpose of explanation, actually, they are coded.

A historical information setting means (not shown) stores the historical information in RAM 25.

It is also possible for the historical information setting means to automatically acquire the historical information and stores it in RAM 25 only when it is set to do so. The historical information setting means could be realized by a program which is loaded from RAM 25 and executed by processor 21. It is also possible that a hardware or firmware which acquires the historical information and stores it in RAM 25 realizes the historical information setting means FIG. 16 gives an example of storing the historical information in RAM 25. In this example, historical information 49 contains items of a history number 50, a TELEPHONE status 51, a transition direction 52, and a screen 53. Historical information 49 is stored consecutively from the information having lower history number 50, and if the number of information exceeds the designated storage area, the information is deleted consecutively from the one having the oldest number (from lowest history number 50).

With reference to FIG. 16, how to store historical information 49 is explained next.

In the example of FIG. 16, the last status with the cover closed status is stored in the column for TELEPHONE status 51 for history number 50 "1". In this example, STAND BY status 33 is stored. Then, when the cover is opened, "→" is stored in the column of transition direction 52 for history number 50 "1". Further, the first screen displayed when the cover is opened is stored in the column of screen 53 for history number 50 "1". In this example, the MEMO screen is stored. Subsequent screens after the first screen with the cover opened status are not stored in historical information 49. The screen immediately before the cover closing is stored in the column of screen 53 for history number 50 "2". In this example, TALK LOG screen 38 is stored.

When the cover is closed, "←" is stored in the column of transition direction 52 for history number 50 "2". Then, the first TELEPHONE status entered after the cover is closed is stored in the column of TELEPHONE status 51 for history number 50 "2". In this example, TALKING status 35 is stored. Statuses after the first TELEPHONE status in the cover closed status are not stored in historical information 49, and the status immediately before the cover opening is stored in the column of TELEPHONE status 51 for history number. 50 "3". In this example, STAND BY status 33 is stored. After that, historical information 49 is consecutively stored in the same manner.

For the historical information, the two consecutive numbers in history number 50, an odd and an even, pair up one block. For example, "1" and "2" in history number 50 form one block. The columns of transition direction 52 are added only for the sake of explanation and unnecessary in reality. Although the values in the columns of historical information 49 are expressed with words for the purpose of explanation, actually, they are coded. Moreover, the above manner of storing the screen or status immediately before the cover closed or opened status can be actually realized by overwriting in the pertinent column whenever the screen or the status has changed.

A talk log information setting means (not shown) automatically acquires TALK LOG 38 and stores it in RAM 25.

FIG. 17 shows an example of TALK LOG 38 stored in RAM 25. Talk log information 54 contains items' for talking type 55, talk time and date 56, phone No. 57, opposite party 58, and pointers 59, 61, and 63 indicating the top address at which data the user obtained by operating on the subsequent screen is stored, and subsequent screen types 60, 62, and 64. Item names are abbreviated in FIG. 17 due to spacing. Values given in FIG. 17 correspond to the TALK LOG screen shown in FIG. 11. Although the values in each column of talk log information 54 are expressed with words for the purpose of explanation, actually, they are coded.

The storing method for talk log information 54 is next explained using FIG. 17.

Irrespective of the cover closed or opened status, type 55, talk time and date 56, phone No. 57, and opposite party 58 are stored in the pertinent columns in next line each time a telephone talk has been made. Then, when a screen is changed automatically by the system or by the user operation, the type of the subsequent screen is stored in the column of subsequent screen type 60, and the top address at which the data the user obtained on that screen is stored in the pertinent column of pointer 59. When the screen is changed after the user changed the type of the screen, the type of the subsequent screen is stored in the column of subsequent screen type 62, and the top address of the data is stored in the column of pointer 62 of the pertinent line, respectively. In the example of FIG. 17, up to 3 types can be stored. If the subsequent screen has four or more different types, the subsequent screens at the fourth and after are not stored in talk log information 54.

Figure 18:
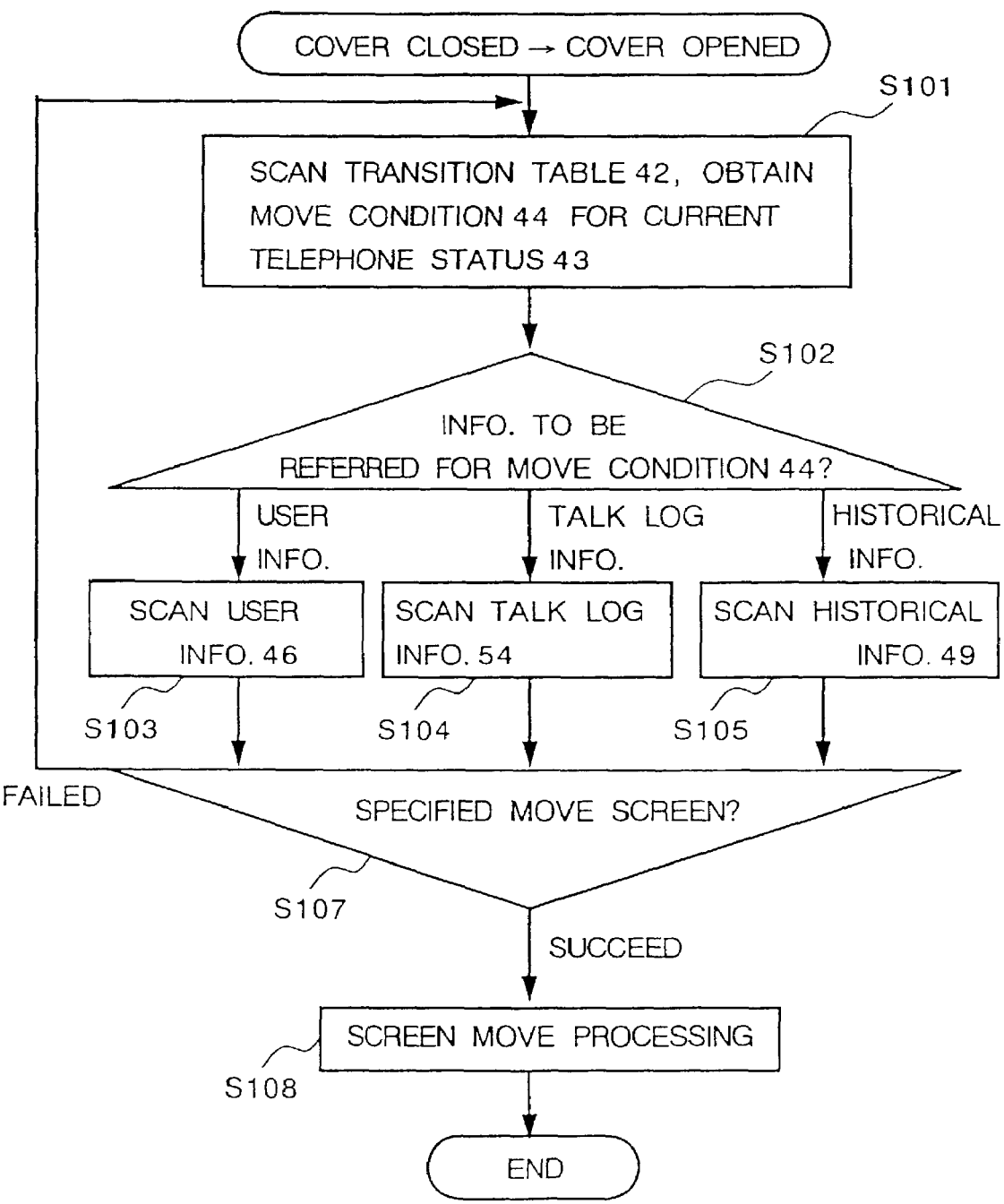
FIG. 18 is a flowchart explaining the operation of moving from the cover closed to the cover opened status of the mobile information terminal equipment of the present invention.

The flowchart in FIG. 18 outlines the processing flow of deciding the subsequent screen in transitting from telephone mode to information terminal mode.

With reference to FIGS. 15 to 18, the procedure of deciding which screen to be displayed is explained with transition table 42 shown in FIG. 14.

At step S101, transition table 42 is scanned to get the transition condition 44 for the current TELEPHONE status 43. At step S102, the information to be referenced by the transition condition 44 is checked. If the transition condition 44 on transition table 42 is the user information, the process forwards to step S103. At step S103, user information 46 is scanned. At step S102, if transition condition 44 on transition table 42 indicates the presence of talk log information, at step S104, talk log information 54 is scanned. At step S102, if transition condition 44 on transition table 42 indicates the presence of the history setting, at step S105, historical information 49 is scanned. After step S103, step S104, and step S105, at step S107, whether or not the subsequent screen has been identified is checked, and if it has been successfully identified, the process is forwarded to step S108. At step S108, screen transition processing is performed. That is, the subsequent screen displayed on liquid crustal display 4 when this status is transitted from the cover closed to the cover opened status, concluding processing. At step S107, whether or not the subsequent screen has been identified is checked, and if failed, processing is repeated again from step S101.

With reference to FIGS. 15 to 18, the procedure of deciding which screen to be displayed is explained in concrete.

The operation of deciding the screen to be displayed in transitting from telephone mode to information terminal mode is performed by a subsequent screen decision means (not shown), The subsequent screen decision means, for instance, can be realized by executing a program stored in RAM 24 by processor 21. Or, it can be realized by the hardware or firmware capable of performing these functions.

The situation in which the cover is closed and the TELEPHONE status 43 is in STAND BY status 33 is explained first.

Transition table 42 is scanned first to find a line indicating TELEPHONE status 43 is in STAND BY status 33. Then transition condition 44 on the line firstly found is checked. In the example in FIG. 14, because it says USER SETTING, user information 46 of FIG. 15 is scanned. The example of FIG. 15 shows "-" for subsequent screen 48, indicating that no setting has been made for TELEPHONE status 47 at STAND BY status 33. The scan, therefore, was a failure, and transition table 42 shown in FIG. 14 is referred again. Then, transition condition 44 for the next line showing the STAND BY status 33 in the column of the TELEPHONE status 43 is checked. Because transition condition 44 for the example in FIG. 14 says HISTORY SETTING, historical information 49 given in FIG. 16 is scanned. In historical information 49, an item indicating the STAND BY status 33 in the column of the TELEPHONE status 51 in the cover closed status is at STAND BY 33, and that transition direction 52 is "→", indicating the transition toward the cover opened status is scanned. The scanning is conducted in the direction from the bigger history number toward the smaller number. In this situation, history No. 9 is not scanned because it stands for the current situation. The first item that satisfies the condition is history number 50 "5". Because screen 53 at this time is SCHEDULE screen 40. SCHEDULE screen 40 is determined to be the next screen to be displayed.

There is a method different from the above description of determining the screen by scanning historical information 49 of FIG. 16. It is also possible to determine a screen with the most frequent appearance as the subsequent screen by picking up screen 53 indicating "→" for transition direction 52 showing the STAND BY status 33 in the column of the TELEPHONE status 43. The example in FIG. 16 shows MEMO screen 39 twice and SCHEDULE screen once, thus MEMO screen 39 is determined to be the screen to display in this method. In this method, because the most recent screen is not selected, but because the most frequent subsequent screen up to that point is selected, the determination of subsequent screen becomes more proper.

The situation in which TELEPHONE status 43 is TALKING status 35 with the cover closed status is explained next.

Transition table 42 is first scanned to find a line indicating the TALKING status 35 in the column of the TELEPHONE status 43. Transition condition 44 for the line firstly found is checked. Because the example in FIG. 14 says USER SETTING, user information 46 of FIG. 15 is scanned. The example of FIG. 15 says "-", which indicates that setting has not been made for transition screen 48 showing the TALKING status 35 in the column of the TELEPHONE status 47. Therefore, this scan is a failure, and transition table 42 of FIG. 14 is referred again. Then, the next transition condition 44 showing the TALKING status 35 in the column of the TELEPHONE status 43 is checked. Because CORRESPONDING TALK LOG is indicated in this example, talk log information shown in FIG. 17 is scanned. If, for instance, the type of the on-going telephone talk is telephone transmission, and the phone No. is (0467) 12-3456, talk log information 54 is scanned sequentially from the latest log to find a line indicating that the TYPE is ○, and PHONE No. is (0467) 12-3456. In the example of FIG. 17, the line that says KIMURA WATCH for opposite party 58 is found in the Figure. Then, because the column of subsequent screen type 60 is ADD., the transition screen is determined to be ADDRESS BOOK screen 41.

The data to be displayed on the subsequent screen in this case could be the data pointed by the address "10120" indicated by pointer 59 corresponding to subsequent screen type 60 "ADD". It is also possible to find the subsequent screen with the same talking type (phone, fax, etc.) but in the direction opposite to the stored talking direction TRANSMISSION or RECEPTION, and with the same telephone number as the current talk. Or irrespective of the phone, face, etc., it is possible to find the subsequent screen only in the direction opposite to the stored talking direction. Likewise, it is also possible to find the latest subsequent screen with the same telephone number as the one currently in use. In either case, it is advantageous because the data concerning the previous talk with the opposite party can be promptly seen. There are various methods to decide the subsequent screen depending on how to grasp the previous talk with the opposite party.

If there is no line that matches the condition or if the subsequent screen type 60 is "-" even if the line is existent, the scanning is a failure and transition table 42 shown in FIG. 14 is referred again. Then, the next line indicating TALKING status 35 in the column of the TELEPHONE status 43 is checked under TRANSITION CONDITION 44. Because TRANSITION CONDITION 44 in the example of FIG. 14 says HISTORY SETTING, historical information 49 shown in FIG. 16 is scanned. The procedure after that is the same as above. If the line matching the condition exists, but if subsequent screen type 60 is nonexistent, showing "-", the scanning condition can be changed among the various methods to make re-scanning possible.

A situation in which TELEPHONE status 43 is at TELEPHONE DIRECTORY OPERATING status 36 with the cover closed status is explained next.

Transition table 42 is first scanned to find a line showing TELEPHONE DIRECTORY OPERATING status 36 in the column of the TELEPHONE status 43. Transmission condition 44 of the line firstly found is checked. Because it says USER SETTING in the example of FIG. 14, user information 46 of FIG. 15 is scanned. Because subsequent screen 48 showing TELEPHONE DIRECTORY OPERATING status 36 in the column of the TELEPHONE status 47 says the TALK LOG status 38, the subsequent screen is determined to be the TALK LOG screen 38.

Although only possible screen to be displayed in FIG. 13 is the ADDRESS BOOK screen 41 for the TELEPHONE DIRECTORY OPERATING status 36, the screen is changed to the TALK LOG screen 38 in the above case. This is because the user has set the subsequent screen. FIG. 13 represents the candidates of system-provided subsequent screens. If the setting has been made by the user, it is prioritized. The subsequent screen can always be determined even when the matching transition condition is not found. Even if no matching transition condition is found, FIG. 14 obviously indicates that a screen changes to the ADDRESS BOOK screen 41 for the STAND BY screen 33, to the TELEPHONE screen 37 for the DIALING screen 34, to the MEMO screen 39 for the TALKING screen 35, and to the ADDRESS BOOK screen 41 for the TELEPHONE DIRECTORY OPERATING screen 36, respectively.

It is also possible to select the subsequent screen based on the user information, historical information, or talk log information without referring the transition table. The user information, historical information, and talk log information in this case can be used independently.

This Embodiment therefore improves operability besides ensuring the certain size of the display screen by mechanically adopting a liquid crystal tablet of combined display and input operation. Moreover, the adoption of a slide cover renders it handy, allowing the user to open or close the cover easily with one hand even during talk.

Functionwise, a telephone call can be made even when the cover is open, thus the number of operations for opening/closing the cover is reduced. Furthermore, it is easy to use because the user can use it by selecting the preferred status (the cover opened or closed status) depending on the use conditions and environment in using as a telephone set.

Moreover, when the cover is opened, the screen is displayed in accordance with the historical information, operation situation in conjunction with the cover opening/closing, user setting, and so forth. Thus the number of operations is reduced and the waiting time until the desired screen appears can be shortened. Therefore, functions for the electronic note, word processor, personal computer, etc., can be easily employed even during telephone talk, with improved operability.

In addition, the Embodiment offers convenience because the data can be linked based on the historical information of the operation on the basis of the talk log, the desired data can be easily obtained with less number of operation times.

In this way, by determining the subsequent screen to be displayed when the cover is opened according to the historical information, operation situation (talk log for the telephone set, as an example), user setting, etc., the number of operation times until the desired screen can be obtained is reduced, and the waiting time until the desired screen appears is shortened, the operability improves.

Embodiment 2

The mobile information terminal equipment of this Embodiment is explained next referring to figures.

Figure 19:
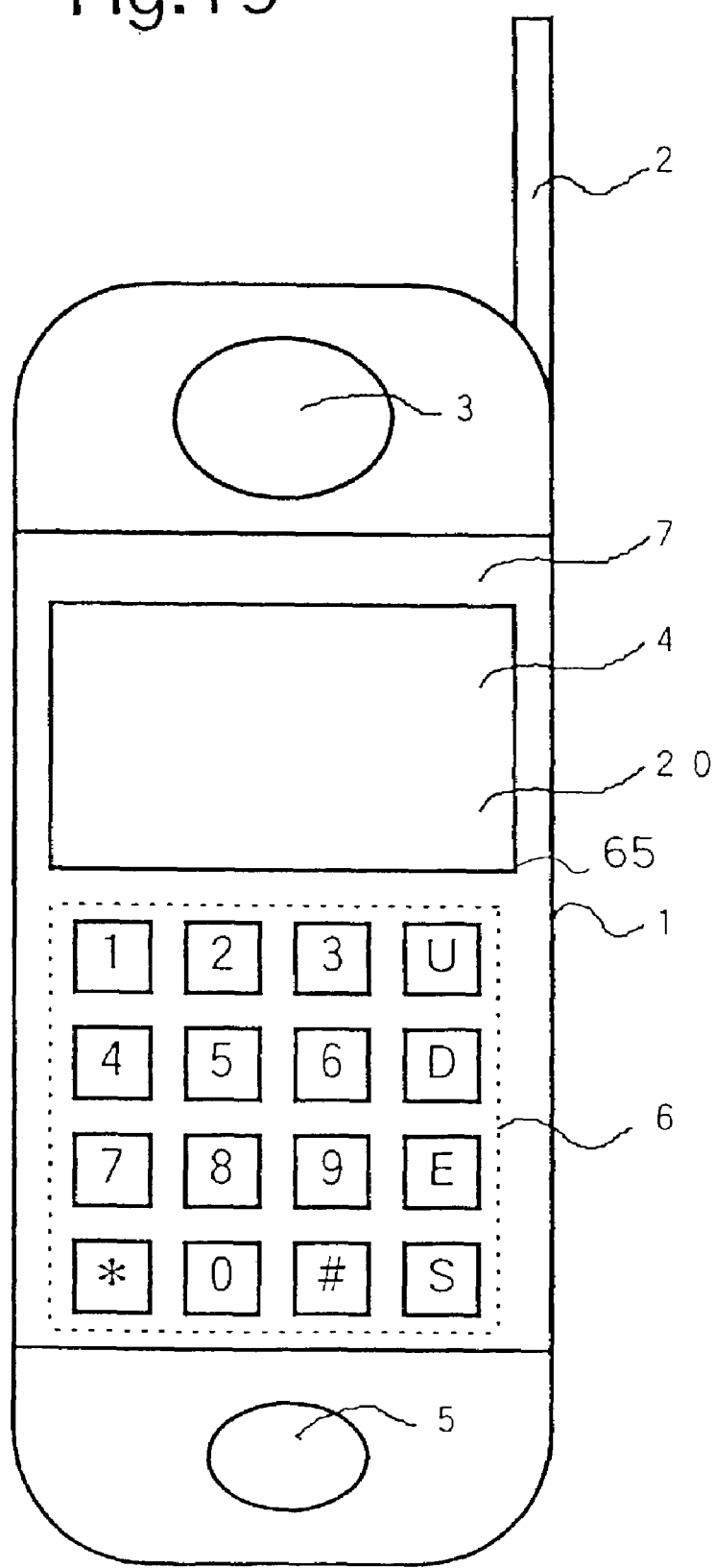
FIG. 19 is a front view showing the appearance of the mobile information terminal equipment of Embodiment 1 of the present invention.
Figure 20:
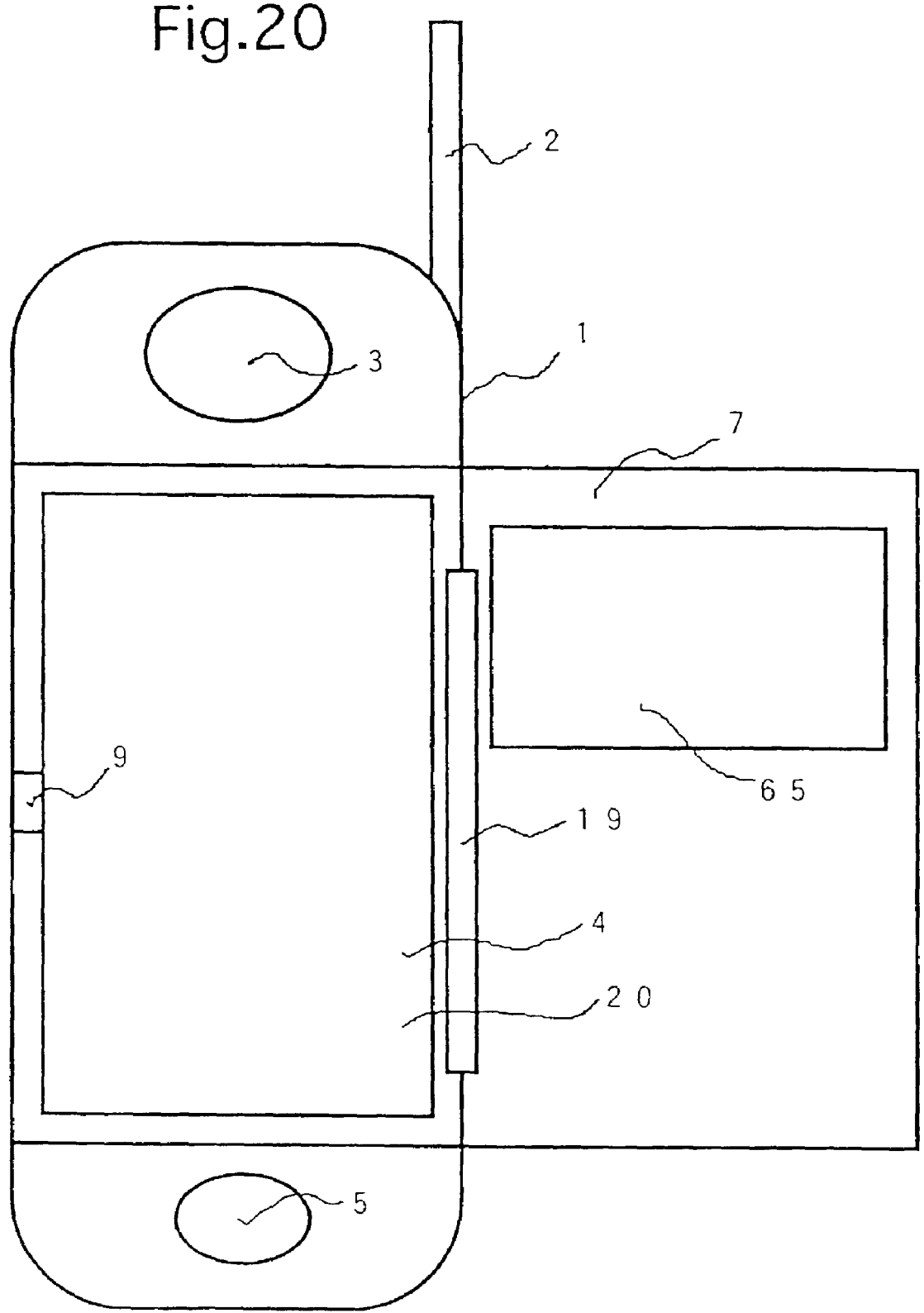
FIG. 20 is a front view showing the appearance of the mobile information terminal equipment of Embodiment 1 of the present invention.

The mechanical configuration of the mobile information terminal equipment is explained with FIG. 19 and FIG. 20.

FIG. 19 and FIG. 20 are the front views showing the appearance of the mobile information terminal equipment. FIG. 19 is a front view with cover 7 in the closed status, and FIG. 20 is a front view with cover 7 in the opened status.

In FIG. 19 and FIG. 20, a window 65 is shown. Window 65 is constructed either by cutting out cover 7 or by applying a transparent material. The displayed information inside the window 65 on liquid crystal display 4 can be seen with cover 7 in the closed status (FIG. 19).

For the mobile information terminal equipment, cover 7 and mobile information terminal equipment body 1 overlap along the plane parallel to the plane of the front view, in the cover closed status, and coupled with hinge 19. In opening the cover, cover 7 turns around until it overlaps the rear surface of mobile information terminal equipment body 1 with the hinge as the pivot. Because telephone keyboard 6 is attached to cover 7, it is advantageous in making liquid crystal display 4 and touch screen 20 relatively larger compared with the mobile information terminal equipment described in Embodiment 1. Therefore, this Embodiment offers improved operability. However, for the cover opening/ closing operation, operability is somewhat less desirable compared with the one described in Embodiment 1 when the mobile information terminal equipment is operated with the hand holding it. For the electrical configuration, the explanation is omitted because it is the same as FIG. 3 described for Embodiment 1.

Figure 21:
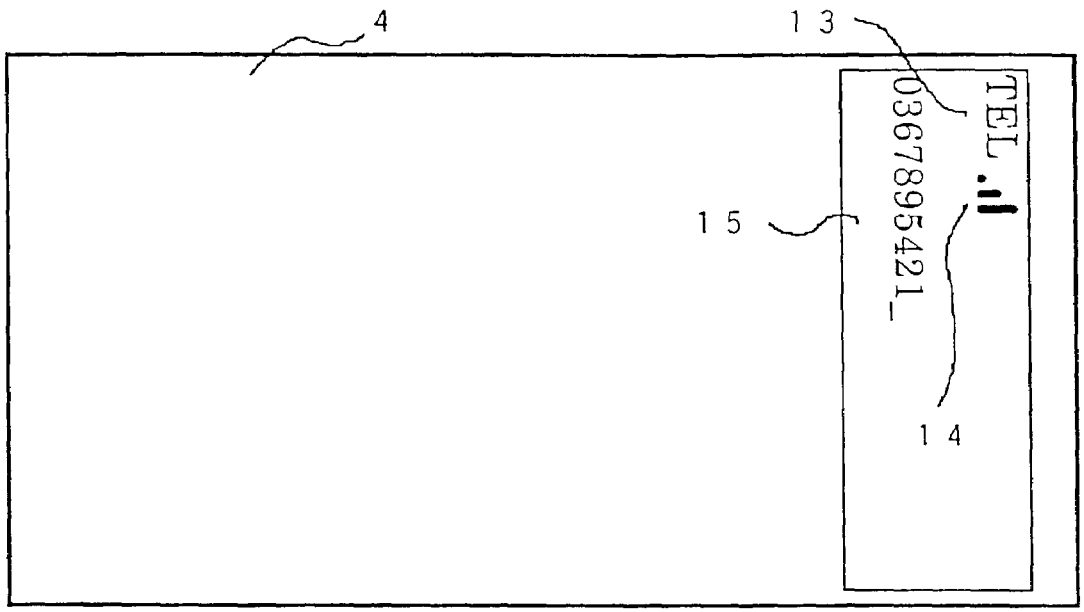
FIG. 21 is a figure explaining the operation (user interface) of the mobile information terminal equipment with the cover in the closed status of the present invention.
Figure 22:
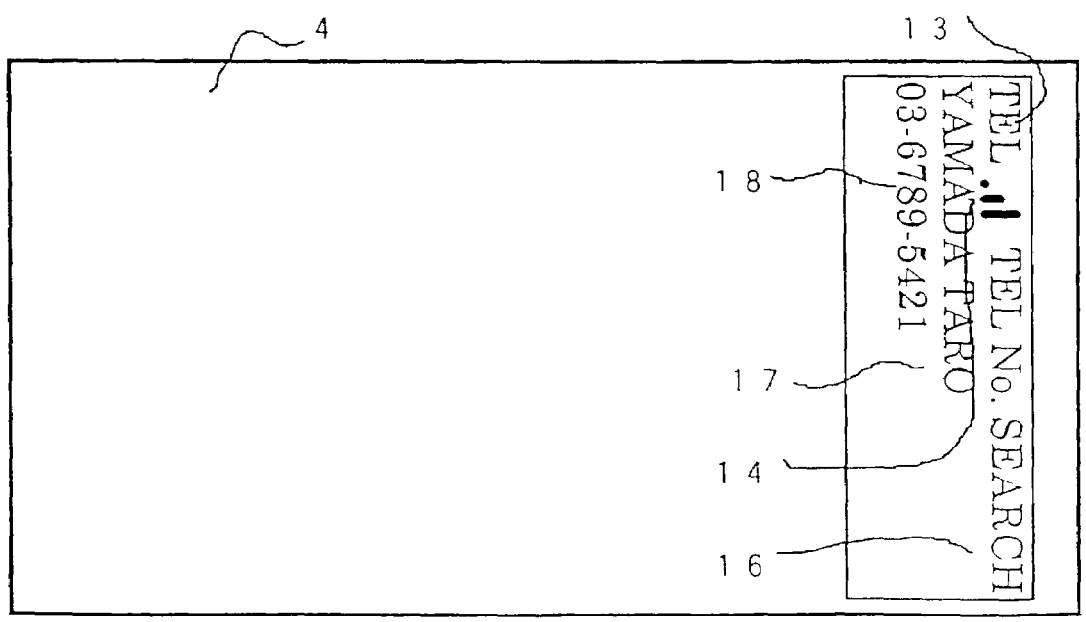
FIG. 22 is a figure explaining the operation (user interface) of the mobile information terminal equipment with he cover in the closed status of the present invention.

The operation for the cover closed status is explained next with FIG. 21 and FIG. 22, specially centering on the user interface.

The difference in display from the mobile information terminal equipment described in Embodiment 1 lies in that the content is turned by 90 degrees rightward on the screen. This is because, mechanically, window 65 is placed at upper part of the liquid crystal display 4 and touch screen 20 in FIG. 20. Other explanation is omitted because it is the same as those explained for Embodiment 1. The explanation for the operation in the cover opened status is also omitted for it is the same as that of Embodiment 1.

The subsequent screen for transitting from telephone mode (the cover closed status) to information terminal mode (the cover opened status) is explained next.

As explained in Embodiment 1, the screen that appears upon cover opening can be determined by historical information, operation situation (TELEPHONE status), user setting (user information), and so on. It is also possible to fix the subsequent screen. This embodiment explains for fixing the subsequent screen for transitting from telephone mode to information terminal mode. This embodiment is advantageous in cost cutting and in simplifying (down-sizing) the equipment because memory amount and processing amount can be reduced.

The subsequent screen could be 1) always an initial screen, 2) always the TELEPHONE status 37, 3) always user set screen, and 4) the immediately preceding screen when the cover was closed most recently. Another possible way is to 5) prioritize the user setting, and if there is no user setting, adopt either the screen of 1), 2) or 4) mentioned above.

The above-mentioned case 1) can be realized by resetting the system every time the cover is opened or closed (the initialization or release of unnecessary area such as work area in RAM 25 and the initialization of programs executed by processor 21). The above case 2) can be realized by activating the processing module of the TELEPHONE screen after processing the case 1). For the above case 3), the user sets one subsequent screen on the transition table irrespective of the TELEPHONE status. After processing the case 1), a screen can be changed to the one set on the transition table. For the above case 4), the system status can be always maintained irrespective of the cover opening/closing. For the above case 5), by checking whether the user setting has been made or not, and if there is the user setting, the above case 3) is performed, and if there is no user setting, either case 1), 2), or 4) can be performed.

It is also possible for the mobile information terminal equipment in Embodiment 1 to fix the subsequent screen as has explained.

Embodiment 3

The method of determining the subsequent screen from telephone mode (the cover closed status) to information terminal mode (the cover opened status) has been explained in Embodiments 1 and 2. Conversely, the subsequent TELEPHONE status and the display data to be displayed on the display screen can be linked with the transition from information terminal mode (the cover opened status) to telephone mode (the cover closed status). With reference to FIG. 23 through FIG. 29, the determination of subsequent TELEPHONE status and the creation of display screen when transitting from the cover opened status to the cover closed status are explained below.

Figure 23:
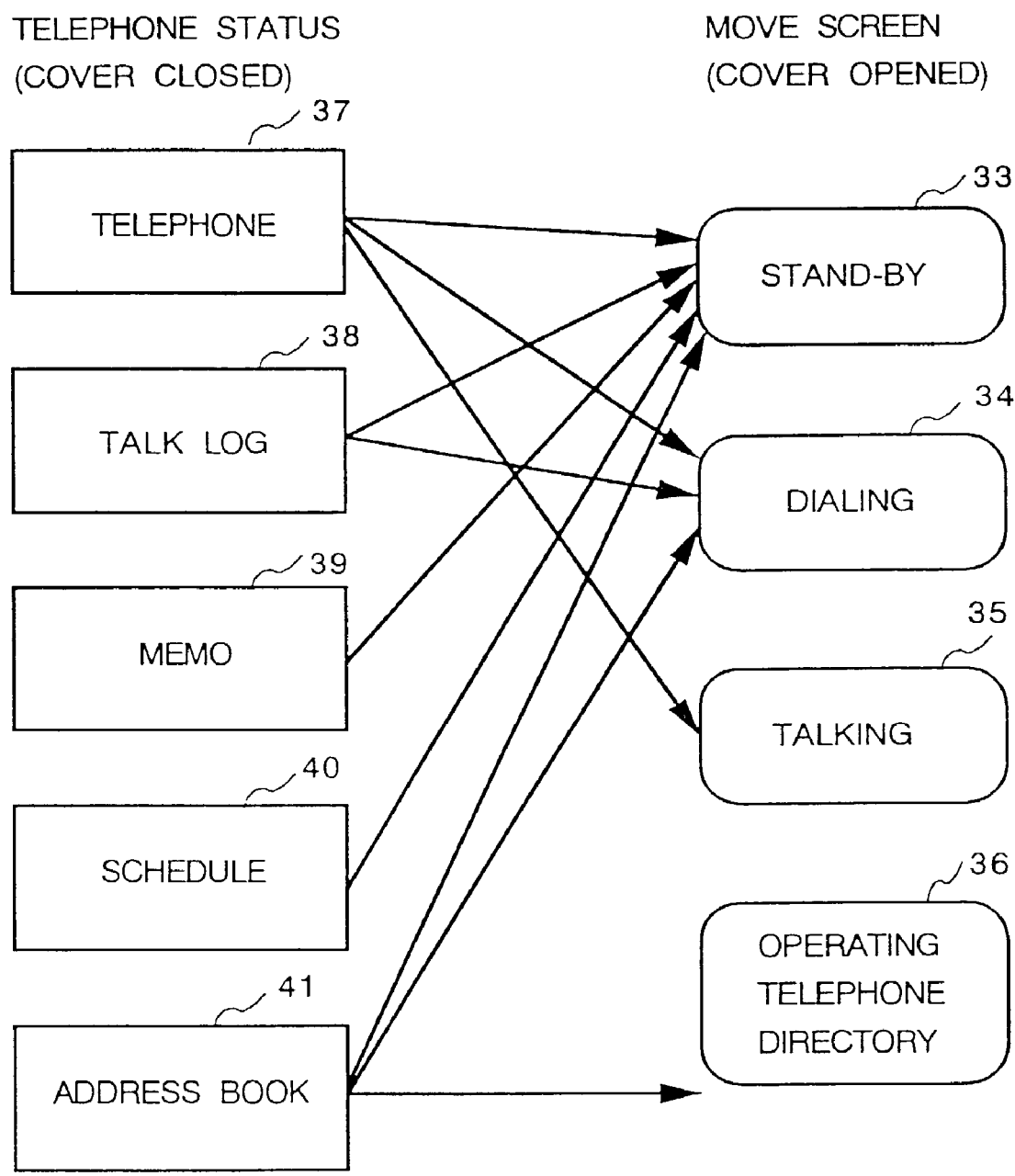
FIG. 23 is a figure explaining the operation for moving from the cover opened to the cover closed status of the mobile information terminal equipment of one Embodiment of the present invention.

FIG. 23 is a figure indicating the candidates of the TELEPHONE status for each screen when transitting from the cover opened status to the cover closed status.

When the screen immediately before closing the cover is the TELEPHONE screen 37, the TELEPHONE status could be either the STAND BY status 33, DIALING status 34, or TALKING status 35 after the cover is closed. On the TELEPHONE screen displayed in FIG. 12, when characters such as numerics, etc., are not displayed on telephone number display window 32, e.g., when there is no input, it transits to the STAND BY status 33. When characters such as numerics, etc., are displayed in telephone number display window 32 shown in FIG. 12, e.g., when the telephone number has been input, and if the send button S is not touched, it transits to the DIALING status 34. Further, when characters such as numerics, etc., are displayed in telephone number display window 32, e.g., when the telephone number has been input, and if the send button S is touched, it transits to the TALKING status 35.

When the screen immediately before closing the cover is the TALK LOG screen 38, the TELEPHONE status could be STAND BY status 33 or DIALING status 34 after the cover is closed. On the TALK LOG. screen shown in FIG. 11, when a specific line is touched or double touched, e.g., a specific log is selected, it transits to the DIALING status 34. On the TALK LOG screen shown in FIG. 11, when a specific line is not touched at all, e.g., when no specific log is selected, it transits to the STAND BY status 33. When the cover is not closed after a double-touch, it transits to the TELEPHONE screen 37. In order to avoid dialing a wrong number, it does not directly transits from the TALK LOG screen 38 to TALKING status 35 so as to enable the user to confirm the telephone number. In order to transit to the TALKING status 35, after the TELEPHONE screen 37 appears, the send button S shown in FIG. 12 is touched (telephone talk is enabled irrespective of the cover opened/closed in this case), or after the cover is closed, the send key S shown in FIG. 1 is pressed.

When the screen immediately before closing the cover is the MEMO screen 39 or SCHEDULE screen 40, the TELEPHONE status after the cover is closed is only the STAND BY status 33. This is because the functions of the MEMO screen 39 and SCHEDULE screen 40 are not directly linked with the telephone functions. Therefore, when the cover is closed on the SCHEDULE screen shown in FIG. 8 and FIG. 9, and on the MEMO screen shown in FIG. 10, it transits to the STAND BY status 33.

When the screen immediately before closing the cover is the ADDRESS BOOK screen 41, the TELEPHONE status after the cover is closed could be either the STAND BY status 33, DIALING status 34, or TELEPHONE DIRECTORY OPERATING status 36. On the ADDRESS BOOK screen of FIG. 6, when a specific line is touched or double touched, or when the ADDRESS BOOK screen 16 is displayed, e.g., when a specific name is selected, it transits to the DIALING 34 status just as the case for the above TALK LOG screen 38. On the ADDRESS BOOK screen of FIG. 6, if a specific name is selected, the home telephone for that name is automatically selected, and if the home telephone is not set, the office phone is automatically selected. The user can set to give a home phone the precedence over an office phone, and vice versa.

When no specific line is selected on the ADDRESS BOOK screen of FIG. 7, or when a name line is selected, a selection similar to the above is made. The user can set the home phone to be selected when the line of home address or home phone is selected, and the office phone to be selected when the-line of the company name, department and position, office address, or office phone number is selected. In either case, if the cover is opened after a double-touch, the TELEPHONE screen of FIG. 12 appears, and the call number (telephone number) selected is displayed at telephone number display window 32. If the cover is closed after a touch or double-touch, the call number (telephone number) selected is displayed in the visible area of liquid crystal display 4 shown in FIG. 1.

When the cover is closed after a touch or double-touch, a display screen shown in FIG. 5 appears and it transits to TELEPHONE DIRECTORY OPERATING status 36. Then, for instance, by operating the roll key U or D, the call numbers stored in the address book adjacent to the displayed call number are displayed in the visible area on liquid crystal display 4 shown in FIG. 1, and pressing the send key S allows the user to talk to the opposite party corresponding to the displayed call number.

FIG. 24 through FIG. 29 illustrate concrete examples of the above operation.

Figure 24:
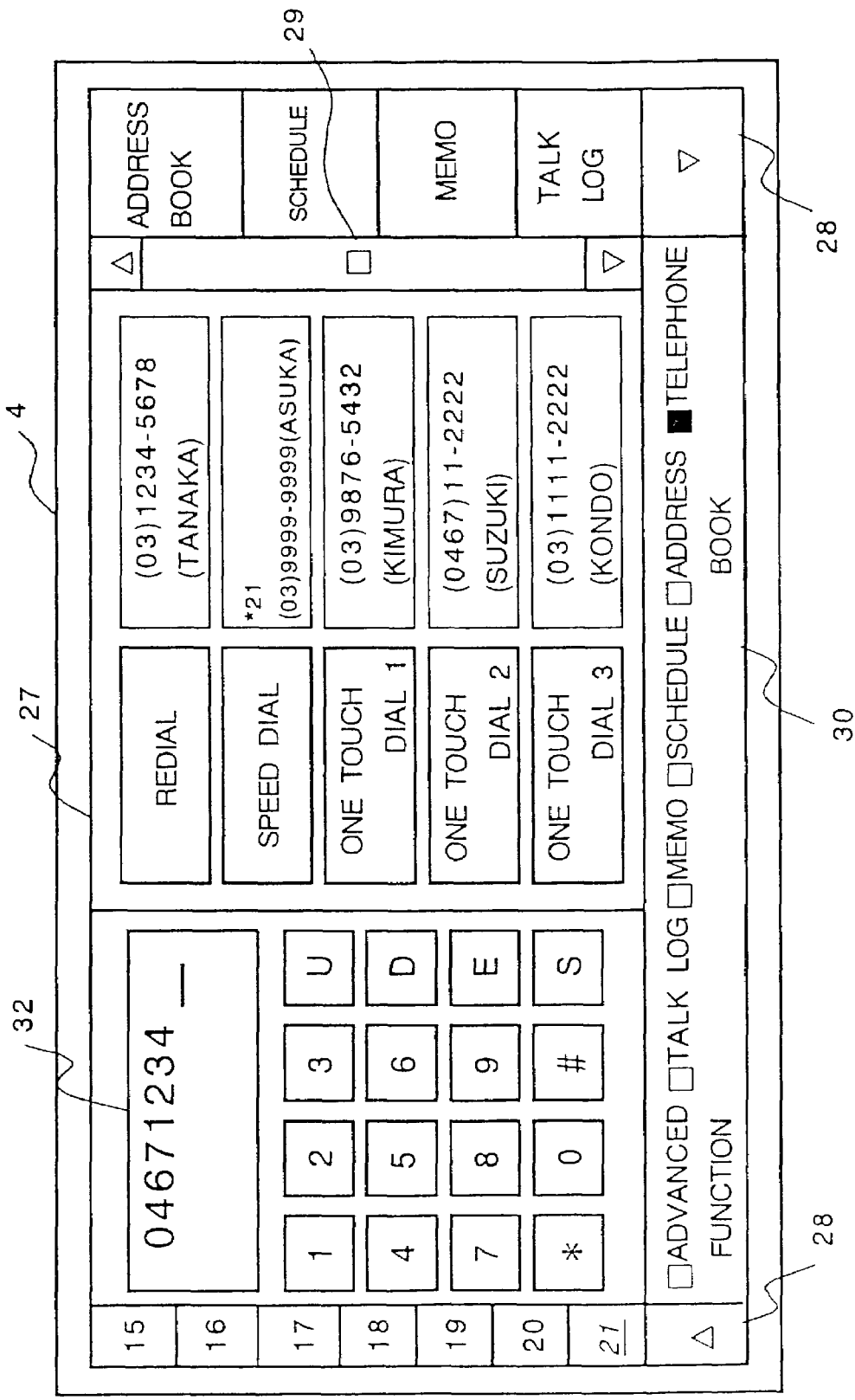
FIG. 24 is a figure of a TELEPHONE screen explaining the operation of moving from the cover opened status to the cover opened status of the mobile information terminal equipment of the present invention.
Figure 25:
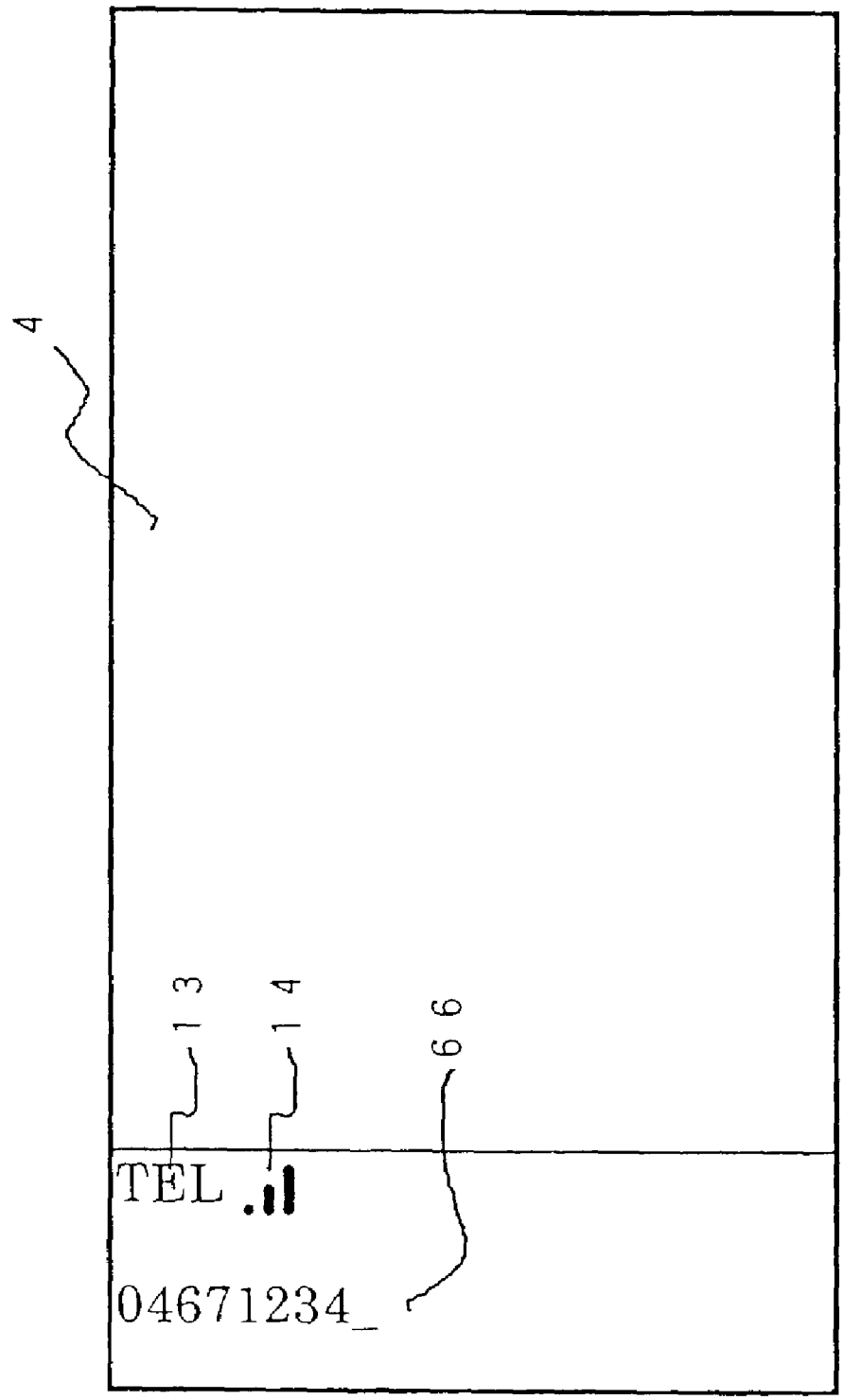
FIG. 25 is a figure of a display screen of telephone mode explaining the operation for moving from the cover opened status to the cover closed status shown in FIG. 24 of the mobile information terminal equipment.

FIG. 24 indicates that the telephone number is being input. On the TELEPHONE screen in the cover opened status, the telephone number "04671234" is being input manually. When the cover is closed in this status, as in FIG. 25, the input telephone number "04671234" 66 is displayed in the visible area on liquid crystal display 4 shown in FIG. 1. Then, by operating telephone keyboard 6 of FIG. 1, the telephone number can be input continuously. Therefore, the input in the cover opened status is not wasted, thus operability is improved.

Figure 26:
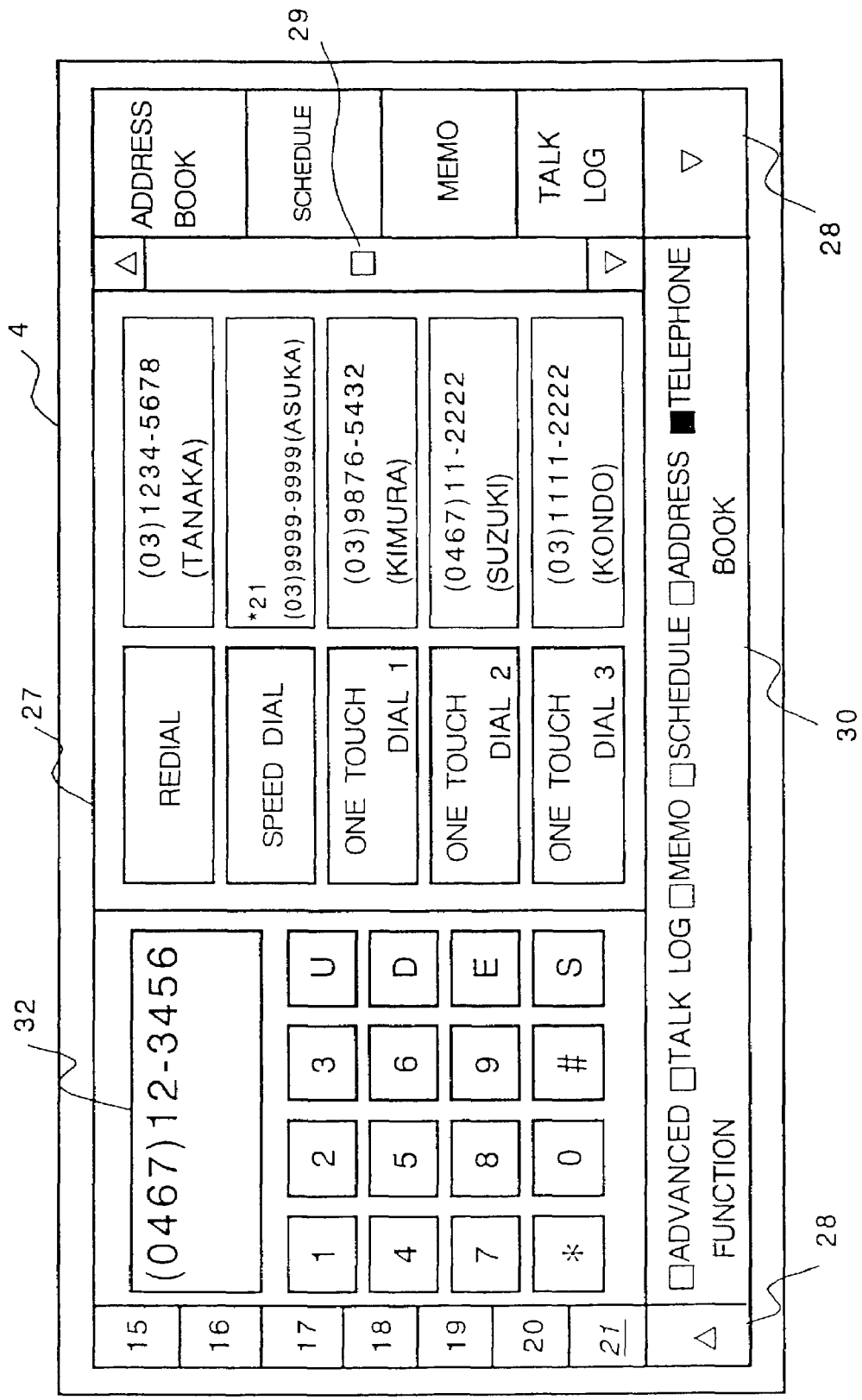
FIG. 26 is a figure of a TELEPHONE screen explaining the operation for moving from the cover opened to the cover closed status of the mobile information terminal equipment of the present invention.
Figure 27:
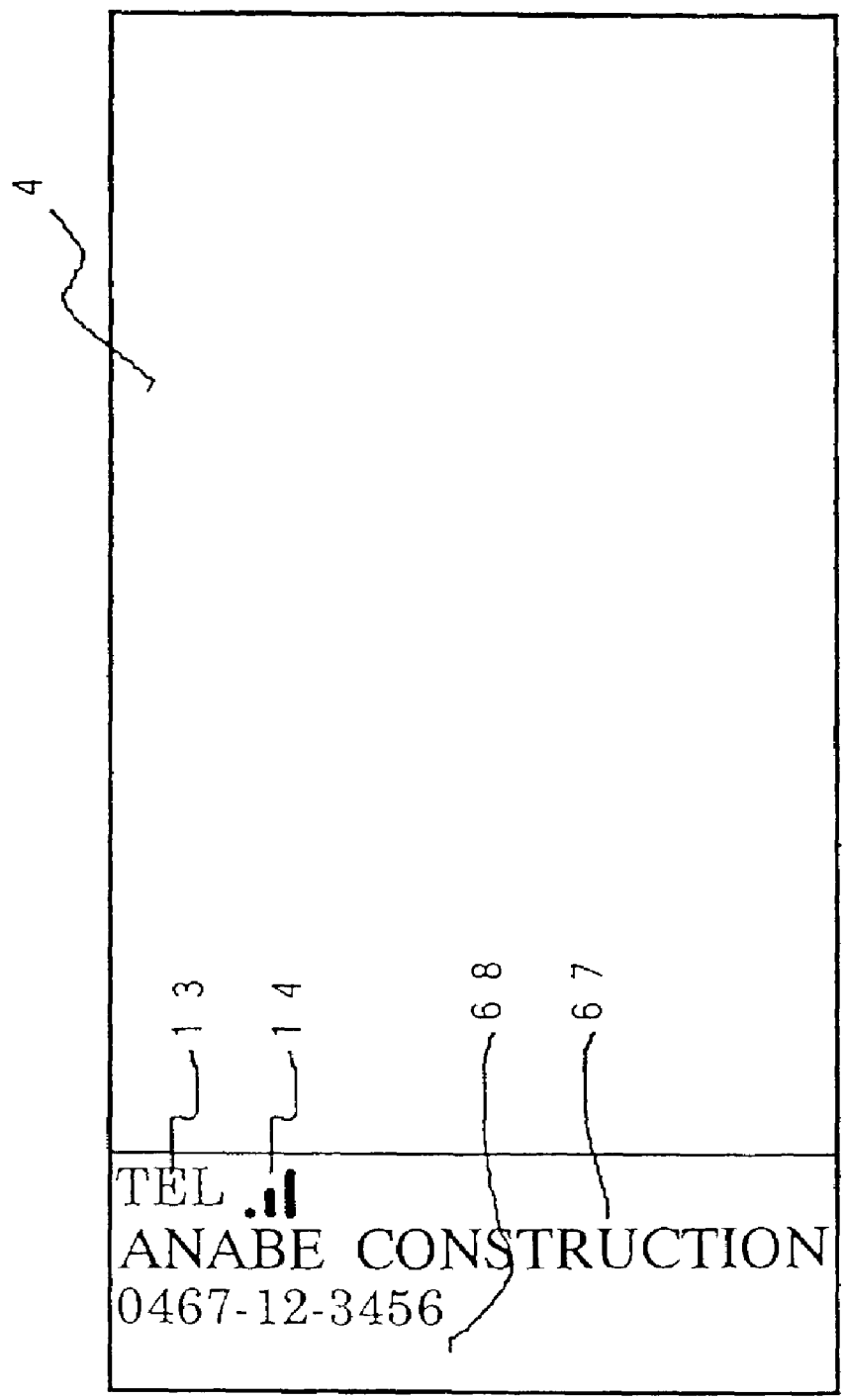
FIG. 27 is a figure of a display screen of telephone mode for explaining the operation of moving from the cover opened status to the cover closed status shown in FIG. 26 of the mobile information terminal equipment.

FIG. 26 shows the TELEPHONE screen displayed after the uppermost line (the line which says WATANABE CONSTRUCTION) on the TALK LOG screen shown in FIG. 11 is double touched. Therefore, the corresponding telephone number "(0467) 12-3456" is displayed on telephone number display window 32. When the cover is closed in this status, as in FIG. 27, the telephone number "(0467)-12-3456" 68 and the corresponding opposite party (WATANABE CONSTRUCTION) 67 are displayed in the visible area on liquid crystal display 4 shown in FIG. 1. After that, talk is enabled by pressing the send key S of FIG. 1. Therefore, there is no need of inputting the telephone number again after the cover is closed, and the operability is improved.

FIG. 28 indicates the situation in which the HOME PHONE line on the ADDRESS BOOK screen shown in FIG. 7 is touched. When the cover is closed in this situation, as in FIG. 29, the telephone number "(0467)-11-2222" 70 and the corresponding opposite party (MATUURA JIRO) 69 are displayed in the visible area on liquid crystal display 4. In this case, the TELEPHONE DIRECTORY OPERATING status 36 is also valid, and TEL.NO.SEARCH 16 indicating the status (mode) is displayed in the visible area on liquid crystal display 4 of FIG. 1. After that, the adjacent telephone numbers stored in the ADDRESS BOOK are searched and displayed by operating the roll key "U" or "D" of FIG. 1, and the telephone talk is enabled by pressing the send key S. This is the case that the retrieval has been completed close to the desired opposite party then the desired opposite party searched manually. Thus operability is improved since the retrieval of the telephone number after the cover is closed becomes easy.

In retrieving the telephone number stored in the ADDRESS BOOK by operating the above roll key "U" or "D", because the opposite party may have several telephone numbers (for instance, home phone and office phone, etc.), there are cases that the user wants to retrieve an opposite party and the user wants to retrieve one of the telephone numbers belonging to the opposite party. Therefore, it is also possible to retrieve the opposite party by simply operating the roll key "U" or "D", and to retrieve one of the telephone numbers of the displayed opposite party, by pressing the "#" key first, and then by operating the roll key "U" or "D".

When the address book is retrieved in the cover opened status, by storing the historical information, it is possible that the retrieval can be implemented in historical order in the cover closed status. For instance, if the "*" key is pressed, and then the roll key "U" or "D" is operated, the opposite parties on the screen are not displayed in the order stored in the ADDRESS BOOK, but the ADDRESS BOOK data can appear according to the order retrieved in the cover opened status. This improves the operability because the data being retrieved often is displayed first, the key operation is cut down.

FIG. 30 shows an example of the data format of the ADDRESS BOOK stored in RAM 25.

FIG. 30 is provided with the historical information concerning the address book retrieval. The data described in the figure corresponds to the ADDRESS BOOK screen shown in FIG. 6 and FIG. 7. For the example of FIG. 30, one data block (record) consists of 10 items, a name 71 of Japanese Kanji characters and Roman characters, a home address 72, a home phone 73, a home fax 74, a company name 75, a department & position 76, an office address 77, an office phone 78, an office fax 79, and forward and backward pointers 80.

When the ADDRESS BOOK is retrieved in the cover opened status, the top address(es) of the preceding and/or succeeding data blocks are stored in the column of forward and backward pointers 80 of FIG. 30 as the historical information. After pressing the "*" key, and when the roll key "U" or "D" is operated, and the address book data can be displayed according to the retrieved order in the cover opened status by following the pointer.

The mobile information terminal equipment shown in FIG. 1 and FIG. 2 explained in Embodiment 1 is described so far. In transitting from information terminal mode to telephone mode, the same description applies to the mobile information terminal equipment of FIG. 19 and FIG. 20 of Embodiment 2.

Embodiment 4

In the above Embodiments, the determination methods of the subsequent screen and the subsequent TELEPHONE status concerning the opening/closing of the cover are explained. However, the display screen becomes smaller in the cover closed status compared with the cover opened status. Therefore, in order to display the data obtained in the cover opened status in the cover closed status, the data on the display screen in the cover opened status must be selected to be displayed in the cover closed status.

FIG. 30 shows the data format of the ADDRESS BOOK stored in RAM 25.

In FIG. 30, items to be displayed in the cover closed status are stored in the first data block (record). In this example, the items indicated with [], name 71 and home office 73, are ones to be displayed. With name 71, because the description says ONLY IN ( ), only the name of the Roman characters are displayed. With home phone 73, because "*" is described, all data for the item are displayed. When the cover is closed on the screen shown in FIG. 28, the information is selected and then displayed just as the screen shown in FIG. 29.

For some application (service), questions or input requests from the server to the mobile information terminal are made by outputting voice or a brief message from the screen to the mobile information terminal, and then responses to the server are made by inputting from the telephone keyboard of the mobile information terminal in telephone mode. For the same application (service), in information terminal mode, questions or input requests are made from the server to the mobile information terminal by displaying the application screen on the mobile information terminal and the reply from the mobile information terminal to the server are made by selecting an item on the displayed application screen or by handwriting in the designated area. A mobile information terminal equipment capable of performing such functions for one application is explained below.

The cover closed status is fundamentally the TELEPHONE status. Therefore, for instance, to make a seat reservation by calling a train company, it is easier to receive voice instructions, and then respond by pressing telephone keyboard 6. However, in the cover opened status, because the screen is large, it is easier to input with a pen to the screen on which items to be input are displayed in the fill-in-the-blank format. With FIG. 31, a method of selecting information on the screen display in the cover closed status and a method of changing the response depending on the cover opened/closed status are explained below.

Figure 31:
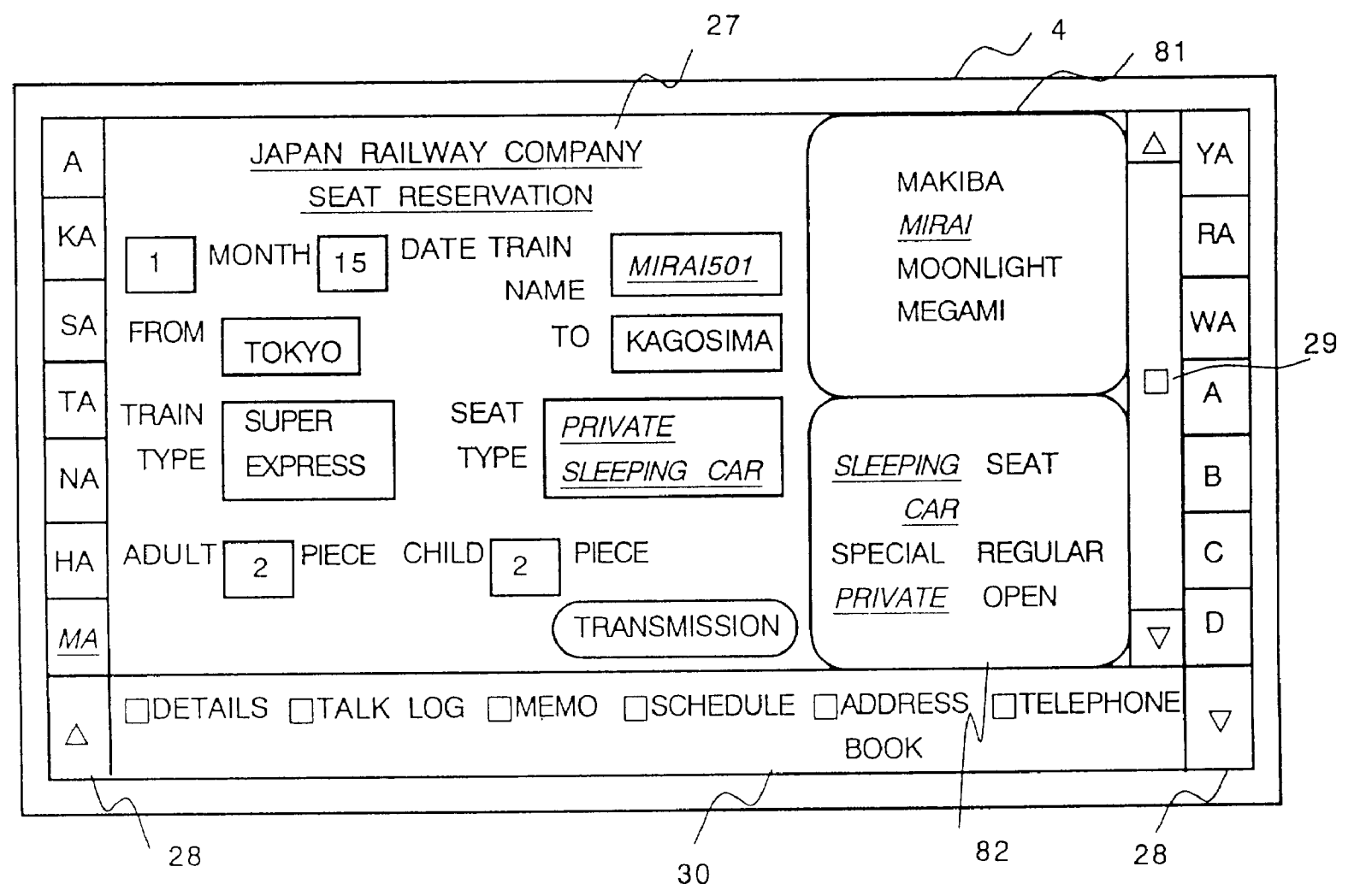

FIG. 31 shows an example of an application screen for the seat reservation using the telephone line or data communication line.

In the cover opened status, when a telephone call is made to a railway company, a telephone number database (not shown) is retrieved, and a matched application is automatically activated by the system. In this example, an application of JAPAN RAILWAY COMPANY SEAT RESERVATION is activated. The user fills in necessary information in the ☐ columns with a pen. For instance, when the user hand-writes numbers directly with a pen in the MONTH and DATE column, the numbers are character recognized and then coded. For the TRAIN NAME column, first touch the TRAIN NAME and then touch MA in tag area 28. Then a window 81 appears, displaying train names beginning with ma, mi, mu, me, and mo. If the MIRAI is touched, for instance, it appears on the column right to the TRAIN NAME. When train number 501 is directly written with a pen, the number is character recognized and then coded.

For the SEAT TYPE column, when the SEAT TYPE is touched, a window 82 appears, displaying the type menu. If the user touches PRIVATE and then SLEEPING CAR, PRIVATE SLEEPING CAR is displayed in the seat type column. After necessary information has been input (filled in blanks), the TRANSMISSION button is touched to make the system send the input data by calling the pertinent railway company. If the railway company has both the data communication line and the telephone line, data transmission is performed via the data communication line. If only telephone line is available, input data is converted into the DTMF (Dual Tone Multi-Frequency) tone, and then transmitted according to the voice instruction.

In the cover closed status, when a telephone call is made to the railway company (after the telephone number is input, the send key S is pressed), the system performs call-out processing, and after the line is connected, the user inputs necessary information through the key operation according to the voice instruction. In the cover opened status, on the other hand, after a telephone call operation is made to the pertinent railway company (after the telephone number is input, the send button S is touched), the system activates the application without performing actual call-out processing. After the TRANSMISSION button is touched in the application, the actual call-out processing is performed and the data transmission starts when the line has been connected.

The application of making a seat reservation to a railway company is explained above. The method is also applicable to making a seat reservation to a theater, or an airline company. It is also adopted to send a certain forms of information, such as the registration to a government office, etc., to a company or an organization.

Depending on the cover opened/closed status, a suitable user interface can be used. In the cover opened status, a visual user interface can be used and the communication charge can be lowered. The user can freely select the cover closed/opened status depending on the situation.

Embodiment 5

The linkage method of the subsequent screen in connection with the cover opening/closing has been explained in the above Embodiments. During the cover opened status, the subsequent screen can be determined using the historical information in the similar manner, and the desired screen appears with fewer number of operations.

Although the cover closed status is assumed to be telephone mode and the cover opened status to be information terminal mode in the previous Embodiments, it is possible to use the cover closed status as information terminal mode by limiting the functions. For instance, by displaying the data only for retrieving the telephone numbers in the address book in telephone mode, it is possible to set information terminal mode in the cover closed status.

Embodiment 6

This Embodiment explains about the user interface and communication control of a terminal having combined functions of a mobile telephone and a personal information management. The structural features of the terminal are first explained.

Figure 32:
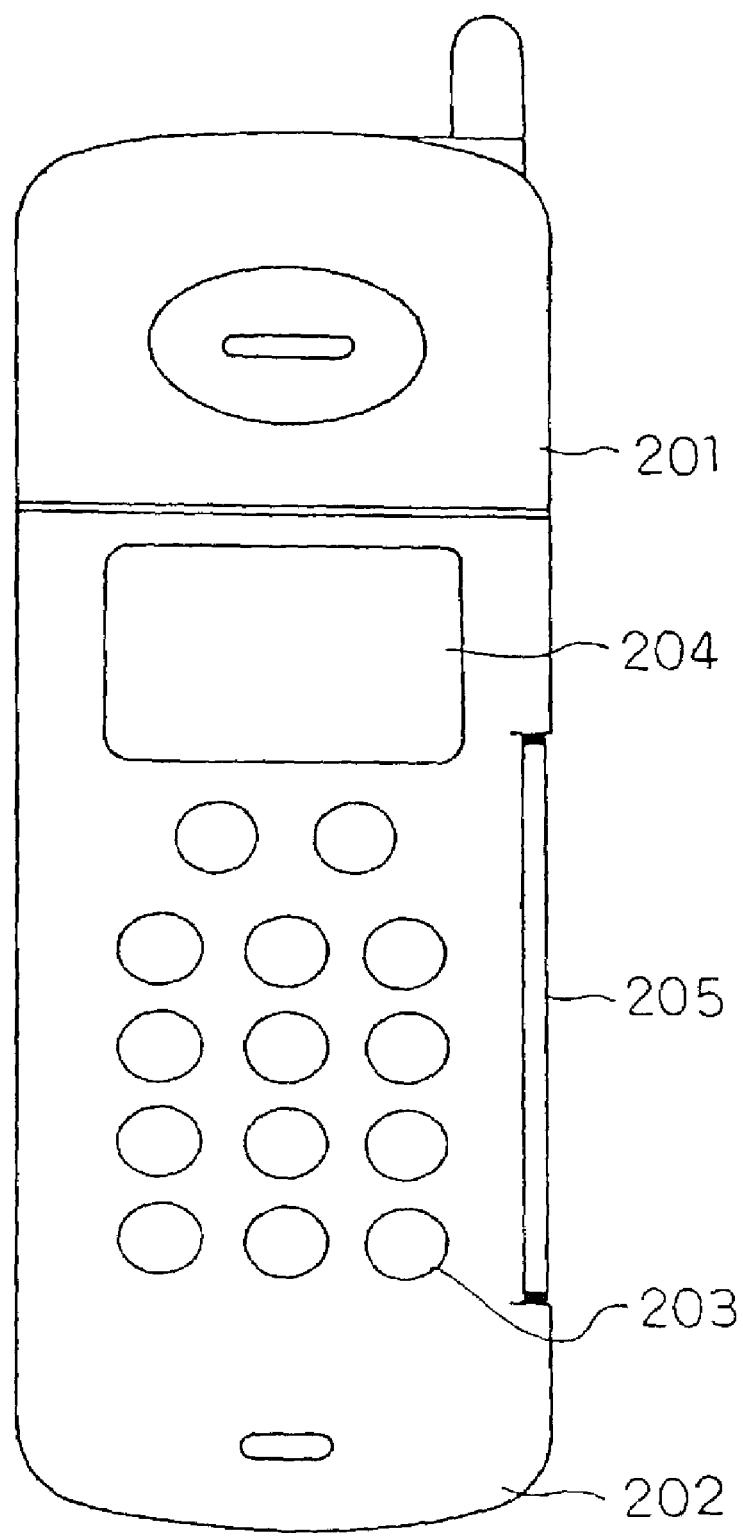
FIG. 32 is a front view of the mobile information terminal equipment with the door closed of the present invention.

In FIG. 32, which shows a front view of the mobile information terminal equipment of this Embodiment in the cover closed status, a mobile information terminal equipment body 201, a door 202 attached to mobile information terminal equipment body 201 with a hinge 205, and a display window 204 and a switch button 203 attached to door 202 are illustrated.

Figure 33:
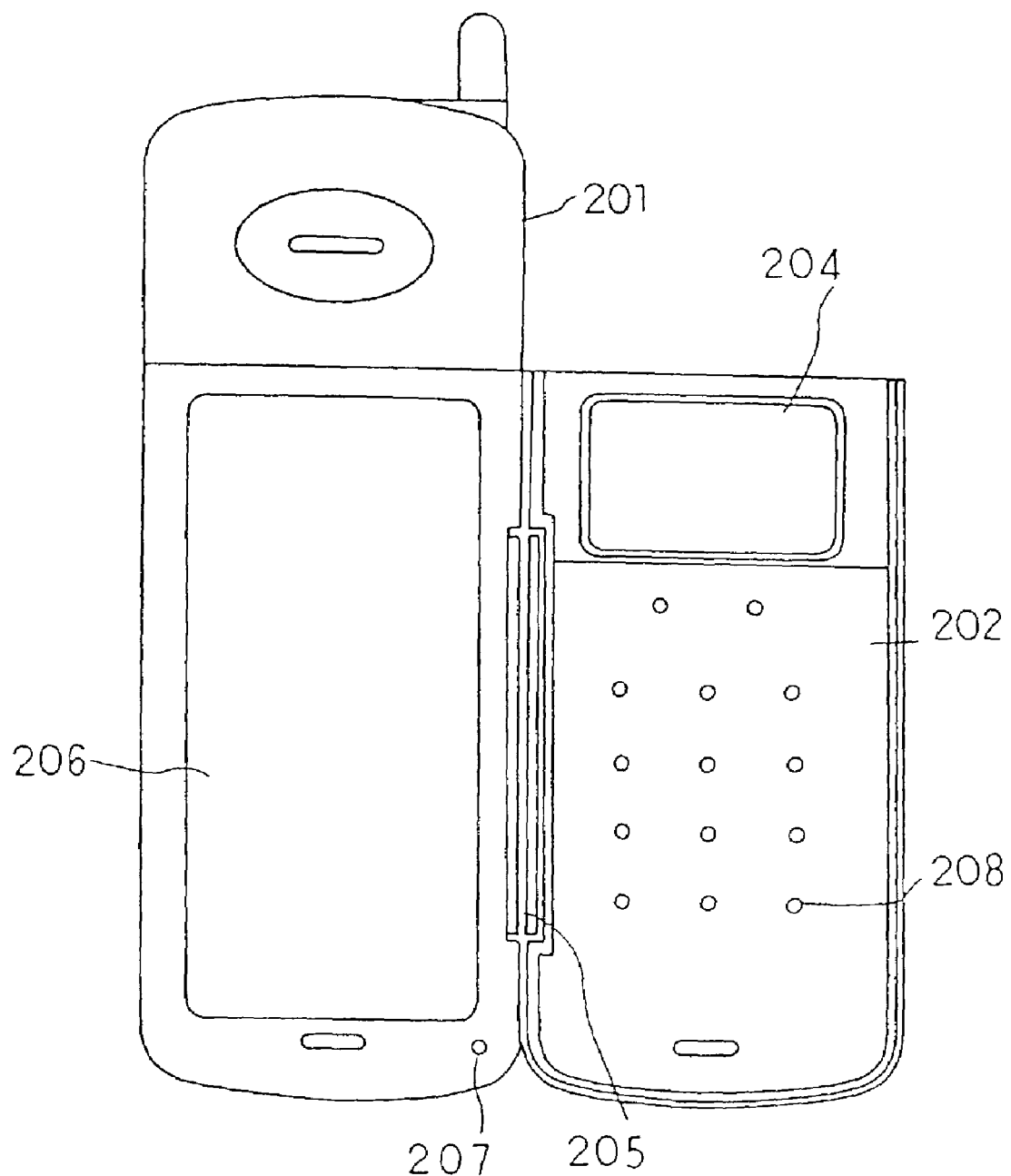
FIG. 33 is a front view of the mobile information terminal equipment with the door opened of the present invention.

FIG. 33 is a front view of the mobile information terminal equipment in the door 202 opened status.

In the figure, a cover detect switch (a means for detecting the door opened/closed) 207 detects the opened/closed status of door 202, and a touch screen 206 makes a contact with switch button 203 when switch button 203 is pressed.

Figure 34:
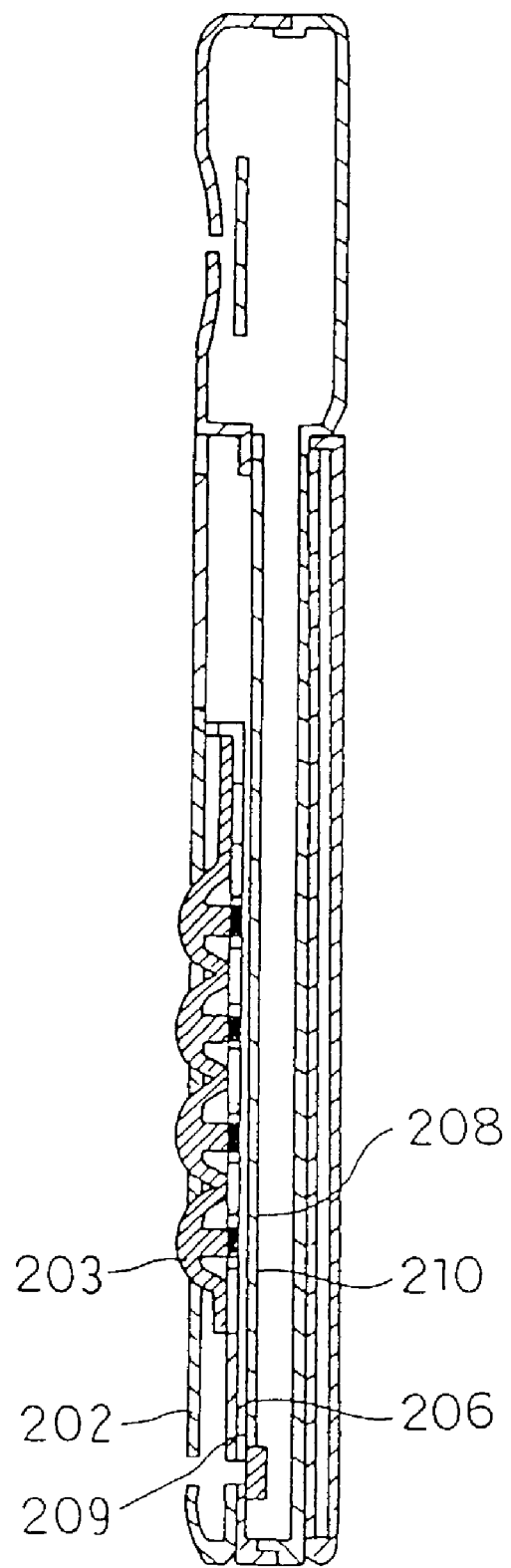
FIG. 34 is a sectional view of the mobile information terminal equipment in the door closed status of the present invention.

FIG. 34 is a cross sectional view of the mobile information terminal equipment of this Embodiment with the door closed.

In the figure, the part with which switch button 203 contacts touch screen 206 is formed with a soft rubber (elastic material) having some area. Switch button 203 is supported by a support 209 attached to door 202. On the bottom of touch screen 206, a display unit 210 is installed contacting with touch screen 206.

Figure 35:
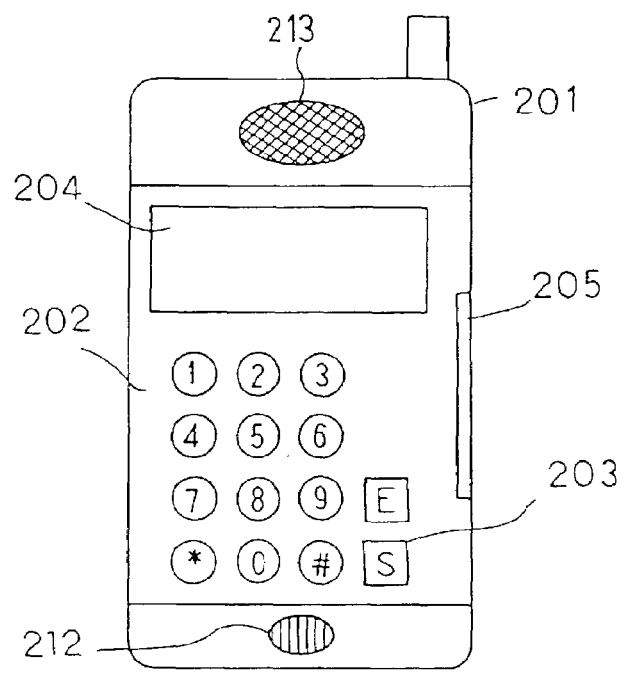
FIG. 35 shows the appearance for using the mobile information terminal equipment as a mobile phone in accordance with Embodiment 6 of the present invention.
Figure 36:
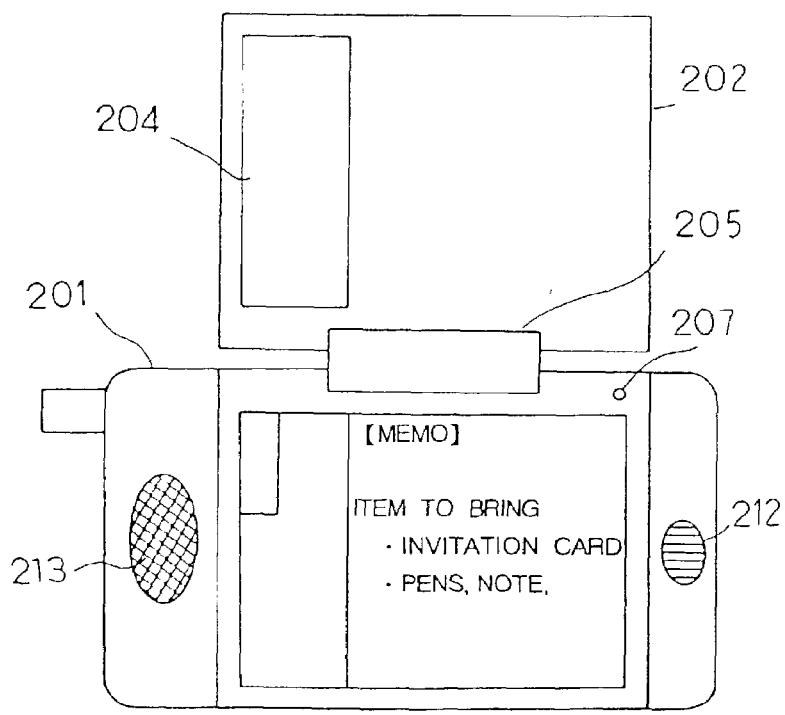
FIG. 36 is a figure showing a use status for using the mobile information terminal equipment as the portable personal Information management apparatus in accordance with Embodiment 6 of the present invention.

FIG. 35 shows the appearance of the mobile information terminal equipment of Embodiment 6 for using as a mobile telephone, and FIG. 36 shows a status using it mainly as a portable personal information management apparatus.

In the figure, a microphone 212, and a speaker 213 are shown.

For using the equipment as a mobile telephone with the door closed, because it is generally easier to use the body holding vertically, characters or pictographs are also set to be displayed vertically. When using it as a mobile telephone with door 202 closed, if switch button 203 attached to door 202 is pressed, an input is judged as an dialing operation, and the pressed numbers are displayed at the location in the display window where the user can see.

For using the equipment as a portable personal information management apparatus, because information in schedule book or address book, received mail, or user memo, etc., are often retrieved, it is generally easier to use body 201 holding horizontally, with a horizontally wide display. Therefore, characters are displayed in the vertical direction on the horizontally wide display, e.g., they are controlled to be displayed in the direction 90 degrees different from the display in the door 202 closed status.

Methods of displaying characters are explained using the explanatory figures of FIG. 37 to FIG. 41.

Figure 37:
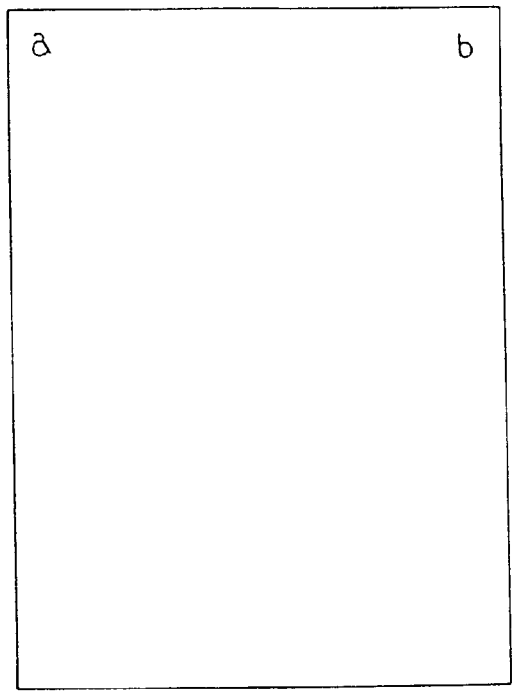
FIG. 37 is an explanation FIG. (1) of character display method of the mobile information terminal equipment in accordance with Embodiment 6 of the present invention.
Figure 38:
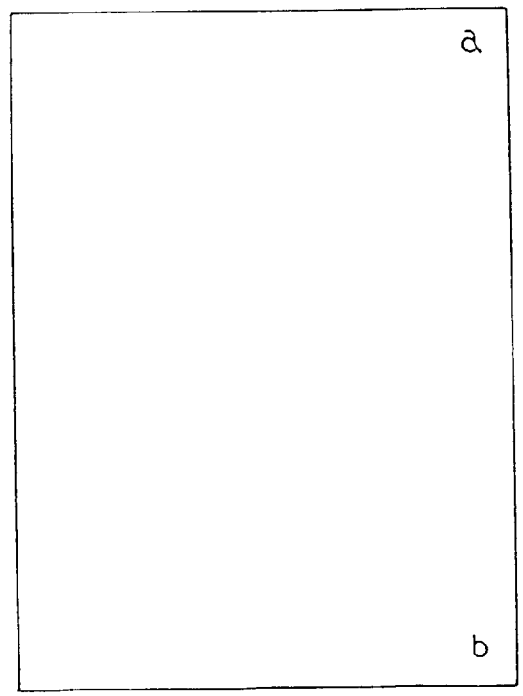
FIG. 38 is an explanation FIG. (2) of character display method of the mobile information terminal equipment in accordance with Embodiment 6 of the present invention.
Figure 39:
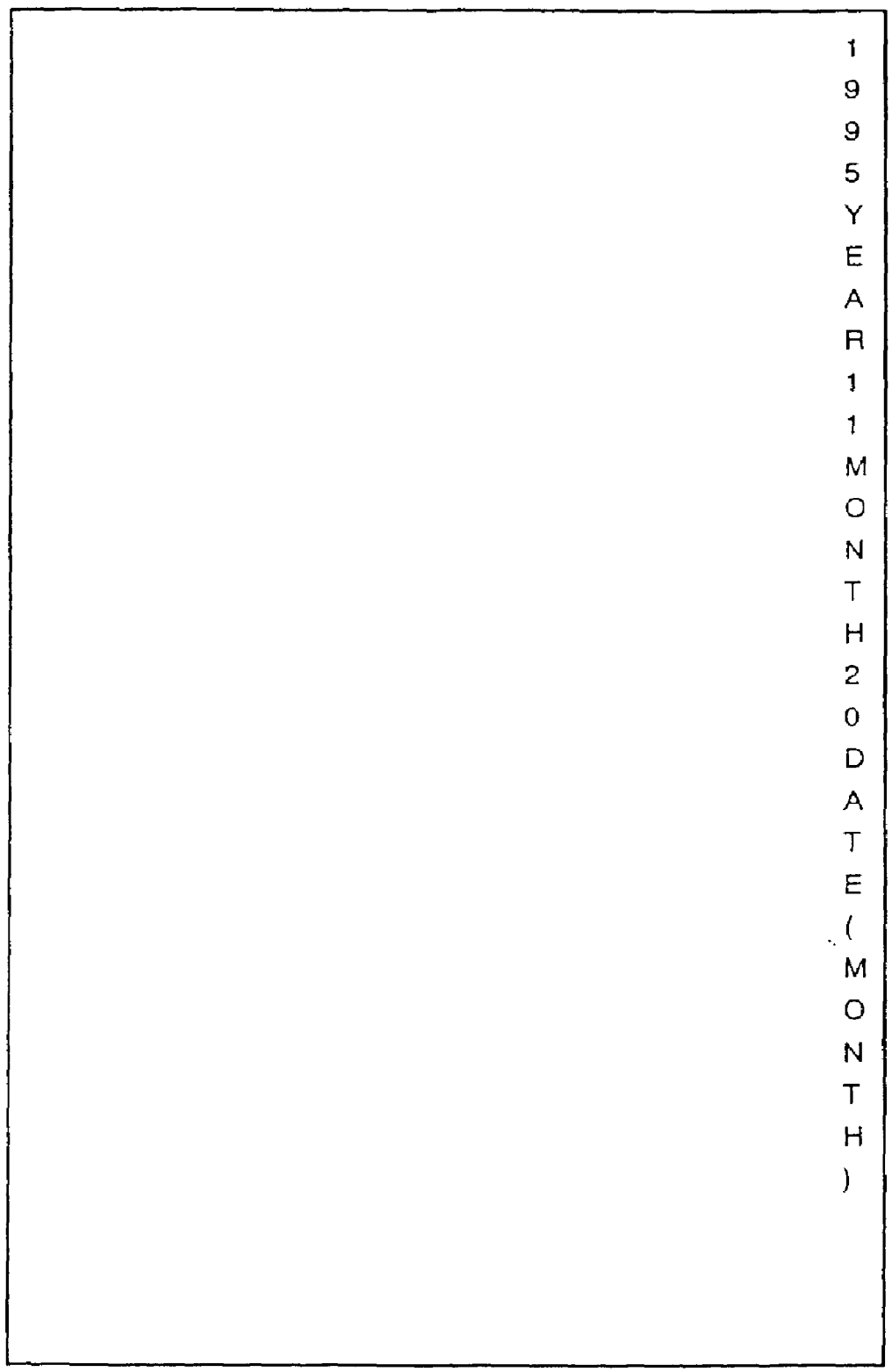
FIG. 39 is an explanation FIG. (3) of character display method of the mobile information terminal equipment in accordance with Embodiment 6 of the present invention.
Figure 40:
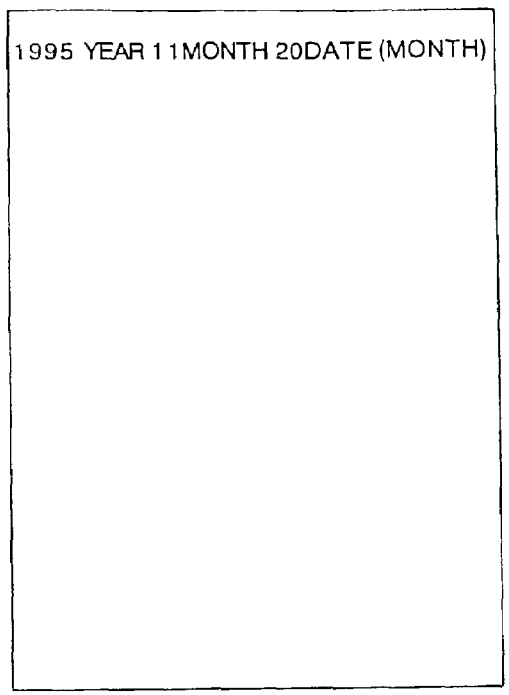
FIG. 40 is an explanation FIG. (4) of character display method of the mobile information terminal equipment in accordance with Embodiment 6 of the present invention.
Figure 41:
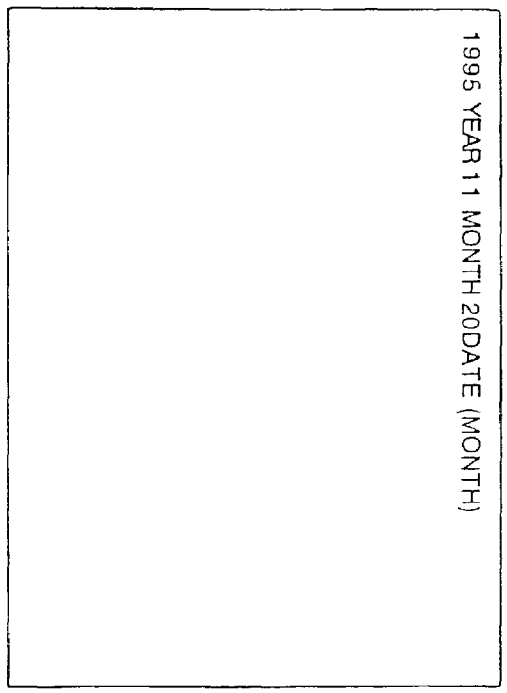
FIG. 41 is an explanation FIG. (5) of character display method of the mobile information terminal equipment in accordance with Embodiment 6 of the present invention.

With body 201 in the vertically placed status, from point a of FIG. 37, characters are displayed one after another until they reach point b. Then, the line is fed to next, and when characters reach the final column of that line, the line is again fed on to next, and this is repeated sequentially. With body 201 in the horizontally placed status, characters are displayed one after another from point a toward point b of FIG. 38. When the characters reach the last column of that line, the line is fed to next, and this is repeated sequentially. Because the character bit mapping data used for the display with body 201 in the vertically placed status is not suited for the display with body 201 in the horizontally placed status, as in FIG. 39, a bit mapping data different from the character bit mapping data used for the display with body 201 placed in the vertical position is used for the display with body 201 placed in the horizontal position. By using a different bit mapping data for body 201 in the vertical and in horizontal positions, the display shown in FIG. 40 is realized for body 201 in the vertically held condition and the display in FIG. 41 is realized for body 201 in horizontally held condition.

The method of switching the display according to the closing/opening of the door is explained below.

Figure 42:
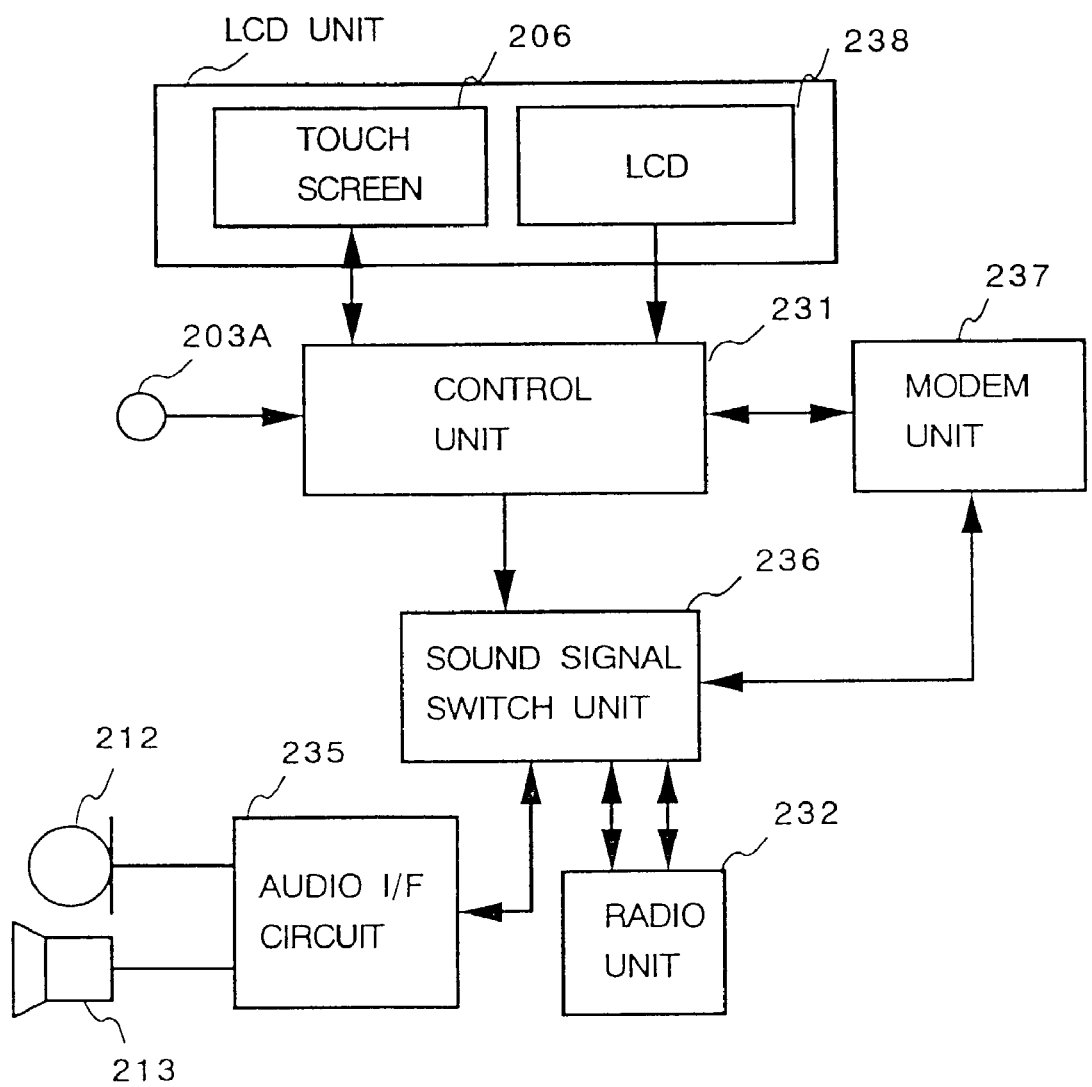
FIG. 42 is a block diagram showing a configuration of the mobile information terminal equipment in accordance with Embodiment 6 of the present invention.

FIG. 42 is a block diagram showing the configuration of Embodiment 6 of the present invention.

In the figure, a control unit 231, a radio unit 232, a microphone 212 for inputting talker's voice to the telephone, etc., a speaker 213 for outputting voice signals during talk, and effect/warning sound, etc., during operation, an audio interface (I/F) circuit 235 for converting analog/digital (A/D) voice signals, a sound signal switch unit 236 for switching input/output path of the voice signal in talk and in generating effect/warning sound stored in memory, a modem unit 237 for implementing data communication, a liquid crystal display (LCD) 238 for displaying a screen, a touch screen 206 for detecting a user's touch input, and a touch location information 203A obtained indirectly by pressing switch button 203 of door 202 are shown.

Control unit 231 controls the display screen of the user interface for the door closed/opened status, using the touch location information from touch screen 206 and the switch status information from cover detect switch 207.

Figure 43:
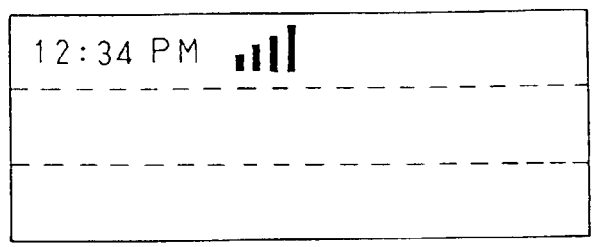
FIG. 43 is a figure showing a screen display example of the mobile information terminal equipment with its door closed in accordance with Embodiment 6 of the present invention.

An example of screen display in the door 202 closed status is shown in FIG. 43.

The screen consists of basic three lines. On the top line, information the user needs before making a phone call, such as time, radio field strength, etc., are displayed. On the second line, the telephone number, etc., input when the user starts the dialing operation are displayed. On the bottom line, message display, error display, etc. necessary for the operation are displayed. Because the example in FIG. 43 shows an idle status immediately after power on, the time and field strength information are displayed on top.

When door 202 is closed, the mapping of touch input is carried out according to switch button 203 of door 202. When the user presses switch button 203 of door 202, a key selected based on the touch location information 203A indirectly obtained is determined to control the user interface.

Figure 44:
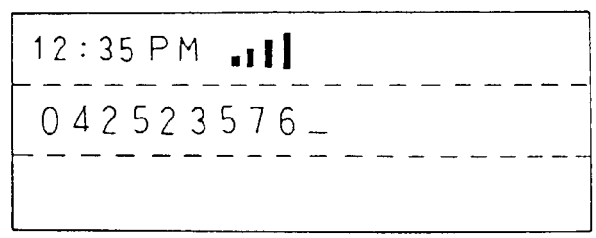
FIG. 44 is a figure showing a screen display example during dial operation of the mobile information terminal equipment with Its door closed in accordance with Embodiment 6 of the present invention.

FIG. 44 shows the dial operation screen in the door 202 closed status.

Figure 45:
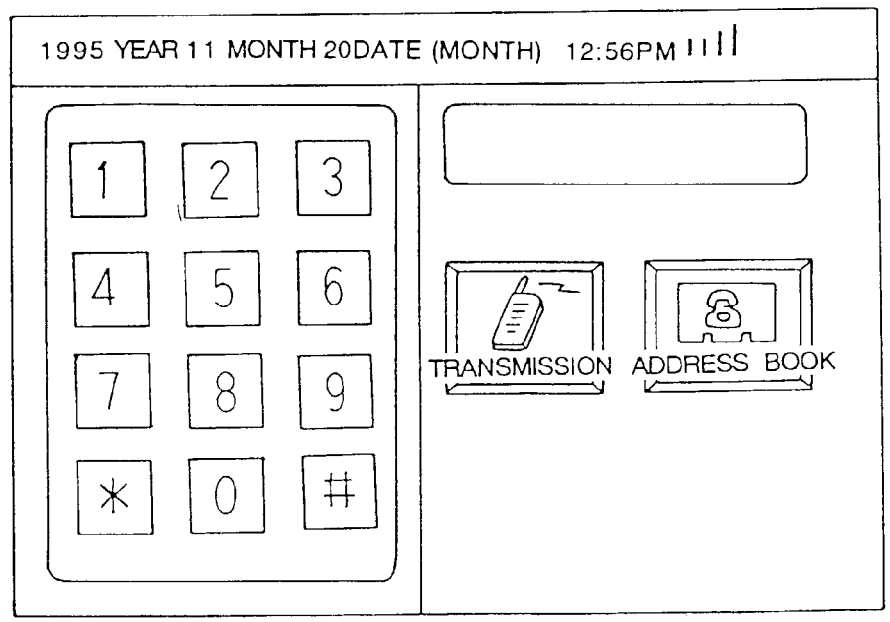
FIG. 45 is a figure showing a screen display example of the mobile information terminal equipment with its door opened in accordance with Embodiment 6 of the present invention.

FIG. 45 shows an example of screen display in the door 202 opened status.

The telephone functions of the mobile information terminal equipment of this Embodiment can be used even when door 202 is opened. FIG. 45 shows the dial operation screen when the door is open. On the screen of FIG. 45, the ten-key button for inputting the dial number and the address book button for activating an electronic telephone directory function among the personal information management functions, etc., are graphically displayed.

The mapping of touch input for the door 202 opened status is performed according to the Graphic User Interface (GUI). The user operates-by directly touching the buttons and icons displayed on the screen.

Figure 46:
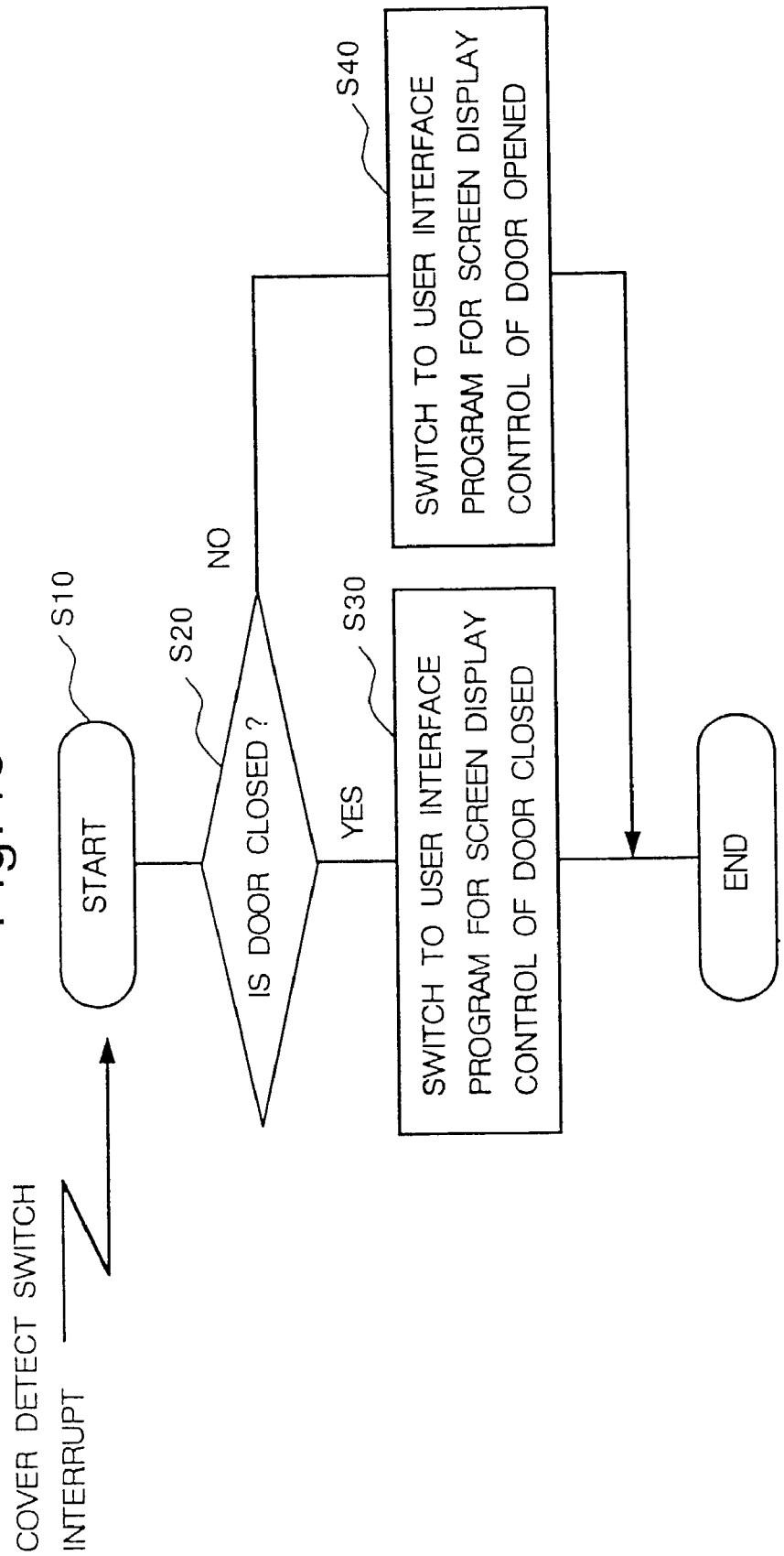
FIG. 46 is a flowchart showing a display switching procedure by opening/closing the door of the mobile information terminal equipment in accordance with Embodiment 6 of the present invention.

The display switching procedure according to the opening/closing of the door is explained with a flowchart shown in FIG. 46.

FIG. 46 is the flowchart showing the operation flow of an interrupt processing program in control unit 231 to handle an interrupt from cover detect switch 207.

When the status of cover detect switch 207 is changed, an interrupt is generated and the program starts (step S10). The program reads the switch status from the input port to determine whether door 202 is closed or opened (step S20). When door 202 is closed, the program activates a user interface program (step S30) of performing the screen display control for closing the door. When door 202 is opened, the program activates a user interface program of performing the screen display control for opening the door. The door opened/closed status can be determined at step S20 simply with the interrupt reception, as a hardware, if the previous door status is stored in the program.

The user interface programs for the door closed and opened status can be configured as two independent software modules, because, as explained previously, they are activated by the interrupt processing program for cover detect switch 207, respectively. However, because it is possible for the mobile information terminal equipment of this Embodiment to make a telephone call both in the door 202 closed and opened statuses, if the user opens or closes door 202 during dialing operation, it is necessary to enable the continuous input operation. Although two independent software modules are programs which control the screen display, the information concerning the telephone operation such as dial data, etc., is shared so that the identical data is to be accessed. The shared data can be safely used from the two independent software modules by controlling the access authority for writing using semaphore, and so on. The safe use of the shared data can be also realized by providing a special software module for controlling the information regarding the telephone operation, wherein the special software module provides a function to access the shared data.

A case of opening/closing door 202 during telephone talk after the telephone dial operation is finished is explained next.

When talking over the telephone in the door 202 closed status, usually microphone 212 is placed close to the mouth and speaker 213 is put in the ear. In order to retrieve SCHEDULE, etc., using the personal information management functions while keeping on talking, when the opening of door 202 is detected during talk, the control is performed so as to be able to talk with hand-free, e.g., the sensitivity of microphone 212 and output level of speaker 213 is increased so that the talk can be carried on without having them close to the mouth or the ear.

To send SCHEDULE data or received mail, etc., to the opposite party during talk, telephone mode is switched to data transmission mode by selecting the transmission button displayed on the SCHEDULE or MAIL screen. Control unit 231 instructs voice signal switch unit 236 to temporarily shut down the path from microphone 212 to radio unit 232, and validates the path from modem 237 to radio unit 232 In order to switch the line from telephone to modem for the data transmission. In such a situation, because the switching of line to the modem must be performed both on the transmission side and the receiving side, some operation must be performed on the receiving side. However, because the telephone talk is already going on with the opposite party, the transmission side can tell the timing of starting data transmission over the telephone. Because the timing of ending data transmission can be mutually confirmed during data transmission procedure, telephone mode is automatically resumed.

According to this Embodiment, the display window and the door having the switch button are provided for the main body. The detector is provided for detecting the opening/closing the door, and the separate software modules control the user interface for using the equipment as a telephone in the door closed status and for using the information processing functions in the door opened status. Therefore, the screen display is optimized for the door closed status and the door opened status. When the cover is opened, because the entire large-size display is used and operated with the graphic user interface (GUI), addition of physical buttons is unnecessary even when the information processing functions are expanded. Thus, the cost and the size of the apparatus can be reduced.

Embodiment 7

As one Embodiment of the present invention, a portable electronic apparatus having a slide cover for the input display unit is explained. The portable electronic apparatus of Embodiment 7 is, for instance, the mobile information terminal equipment described in the previous Embodiments 1 through 6. Or, it can take a different form of portable electronic apparatus.

Figure 47:
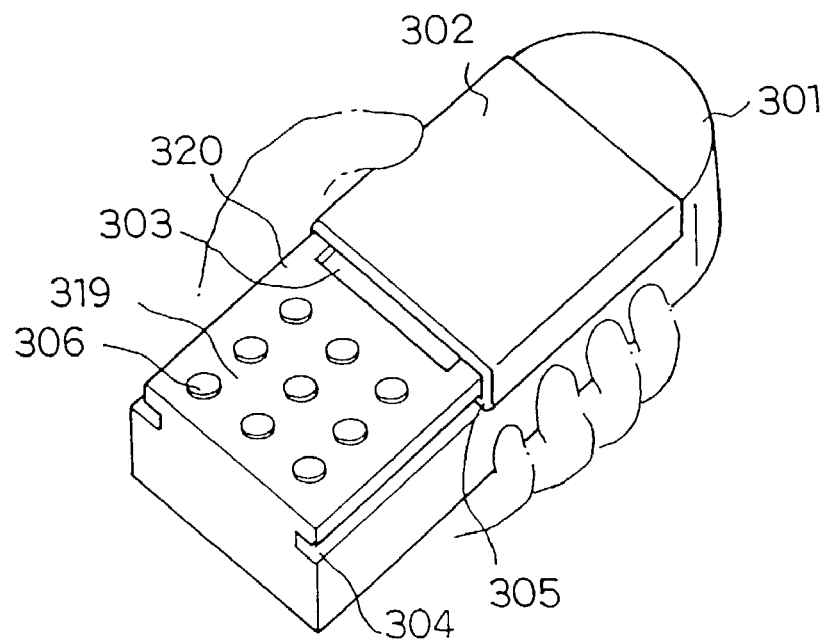
FIG. 47 shows a slide cover in the closed status for the portable electronic apparatus of one Embodiment of the present invention.
Figure 48:
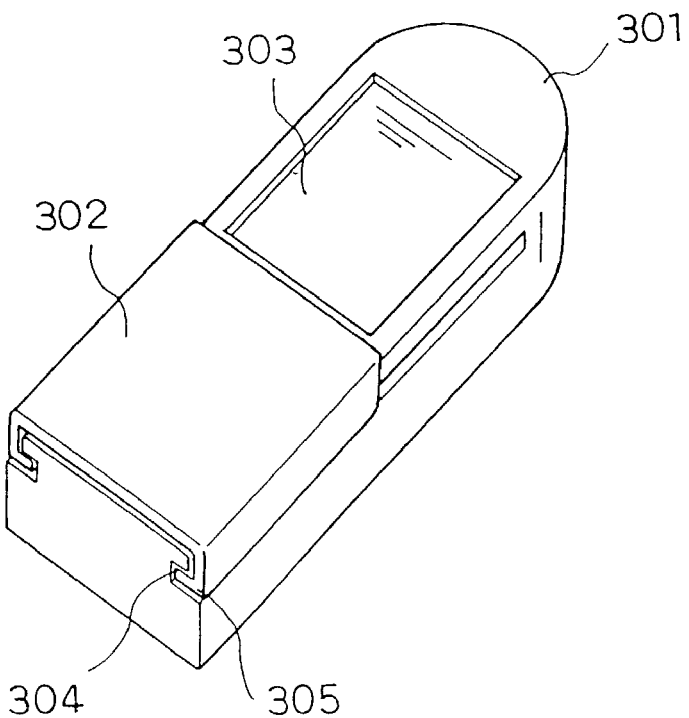
FIG. 48 shows a slide cover in the opened status for the portable electronic apparatus of one Embodiment of the present invention.

In FIG. 47 and FIG. 48, a portable electronic apparatus body 301, a slide cover 302, an input display unit 303, a rail 304 furnished with portable electronic apparatus body 301, a slide projection 305 of slide cover 302 which engages with rail 304, switches 306, a switch panel 319 with allocated switches, and a front face 320 allocated with input display unit 303 and switch panel 319.

FIG. 47 shows the condition with slide cover 302 closed. FIG. 48 shows the condition with slide cover 302 opened.

The operation is explained next.

Holding the portable electronic apparatus body with one hand as shown in FIG. 47, slide cover 302 can be opened or closed by sliding up and down along the body. Furthermore, input display unit 303, switches 306, and rail 304 are allocated in such a manner that switches 306 are hidden and protected when the slide cover is opened.

The configuration thus enable the user to open/close the slide cover easily. Moreover, when the input display unit is exposed as the slide cover is slid down, the switches becomes hidden, thus prevents the user from pressing the switches inadvertently.

Figure 49A:
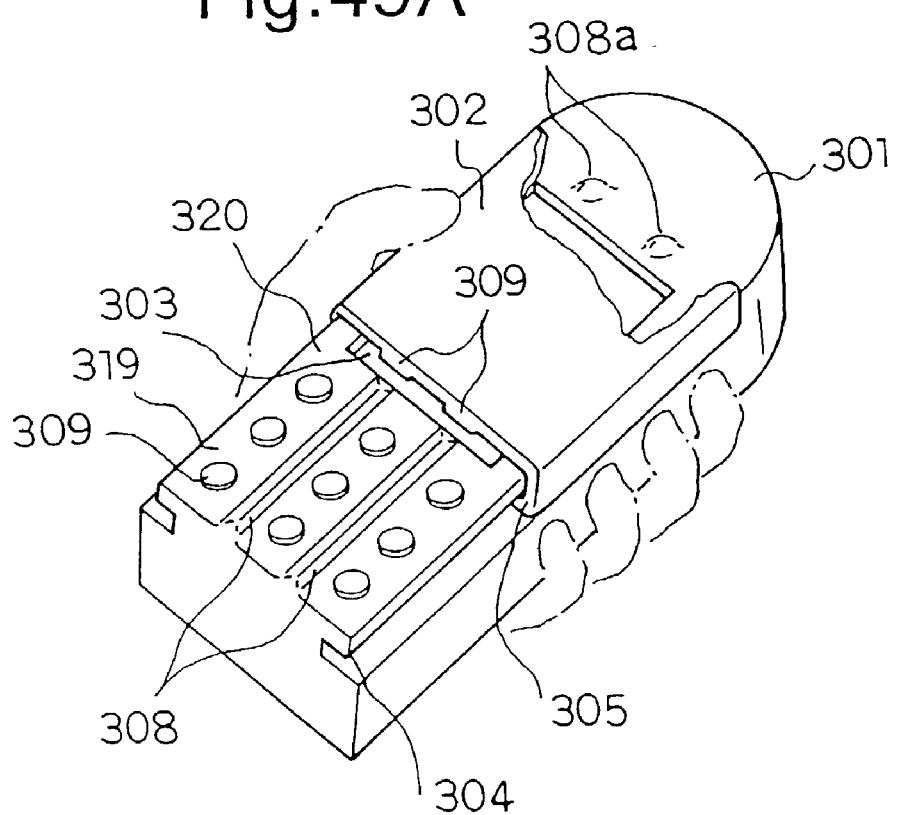
FIGS. 49A and 49B show a portable electronic apparatus of one Embodiment of the present invention.
Figure 49B:
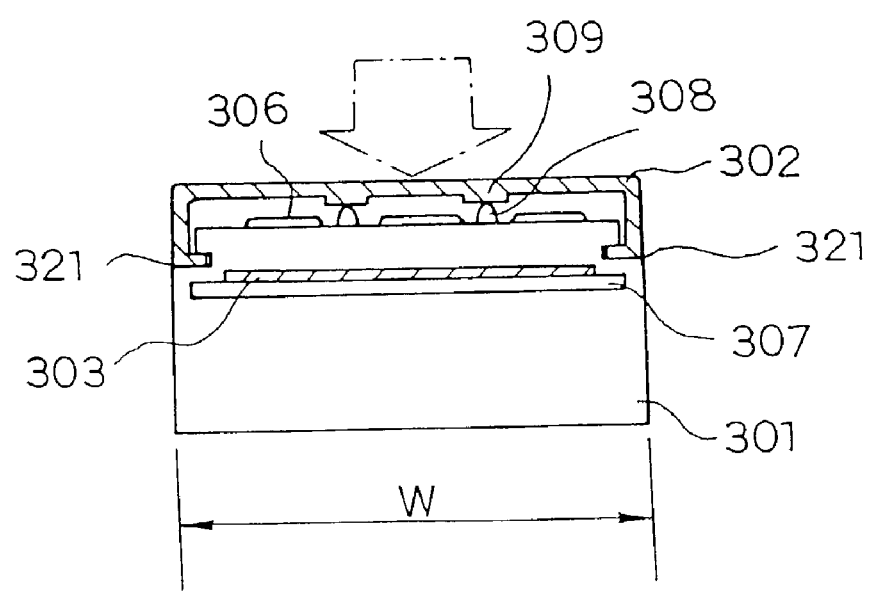

FIGS. 49A and 49B show other examples of portable electronic apparatus.

An input display unit 307, long and narrow support projection 308 and cone-shaped support projection 308a provided among switches on the portable electronic apparatus body 301, contact surfaces 309 provided for slide cover 302 which makes contact with support projections 308 and 308a. By placing rail 304 at the outside of input display unit 303 of display device 307, in the area 321 above the frame of input display unit 303, as in FIGS. 49A and 49B, the hinge previously required for opening/closing the cover, or the additional width required at the rail become unnecessary. Thus the width W of the main body can be shortened.

The width of portable electronic apparatus body 301 is shortened as much as possible. The operability improves because it becomes easier to hold the body with one hand.

As shown in FIGS. 49A and 49B, long and narrow or cone-shaped support projections 308 and 308a are provided among switches 306 of portable electronic apparatus body 301 and contact surfaces 309 are provided for slide cover 302 which makes contact with support projection 308. In force indicated with the imaginary line from top of the slide cover 302 is received at support projections 308 and 308a via contact surfaces 309 without bending the slide cover 302 and without pressing switches 306 at the same time. Even if an excessive force should be erroneously added to the slide cover, the slide cover would not be broken and the switches would not be pressed, which helps improve the durability and operability.

Figure 50:
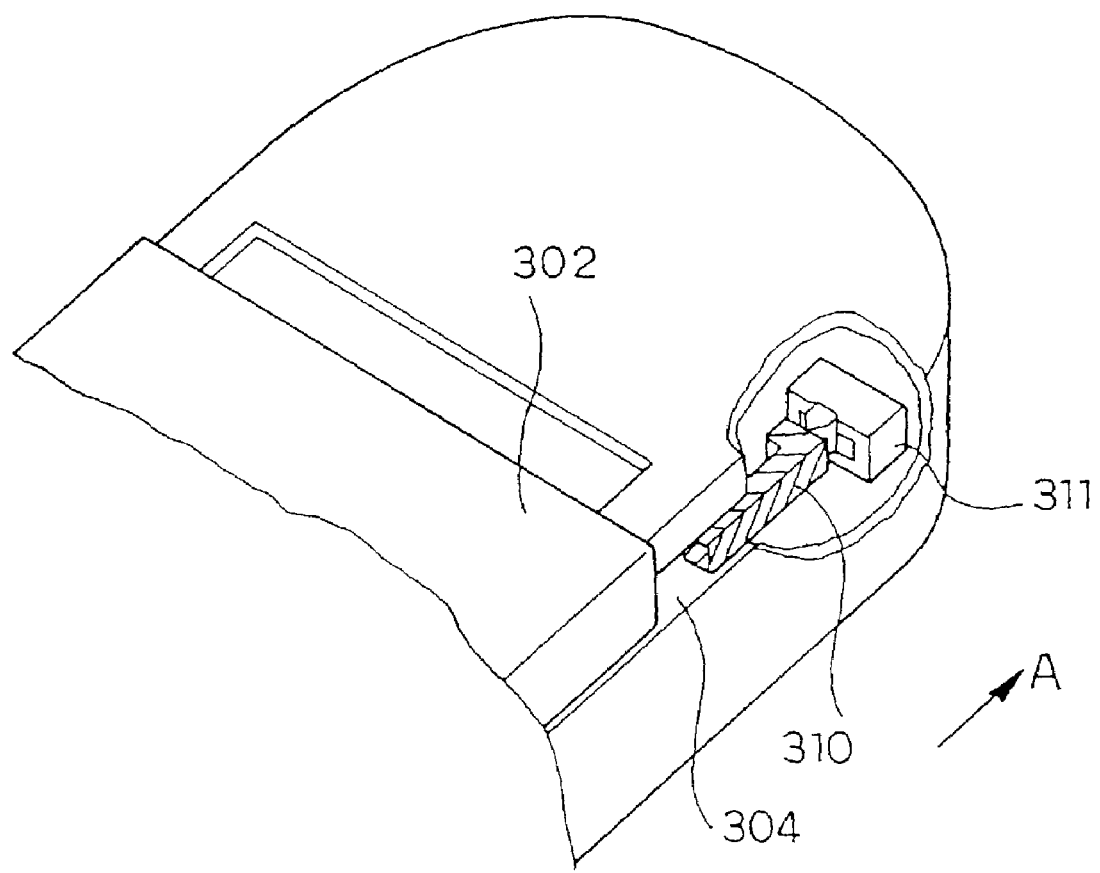
FIG. 50 shows part of a rail of the portable electronic apparatus of one Embodiment of the present invention.

FIG. 50 shows part of the end of the rail.

A switch lever 310 is secured at the end of rail 304. An opening/closing mode switch 311 is set touching the switch lever.

According to the opening/closing operation of slide cover 302, switch lever 310 is pushed in the direction of arrow A, which causes opening/closing switch 311 to be pressed to turn the switch on or off. When this signal is detected, display mode is switched according to the opening/closing of the slide cover. Switch lever 310 is arranged in the rail groove so as to minimize malfunction of opening/closing switch 311.

Figure 51:
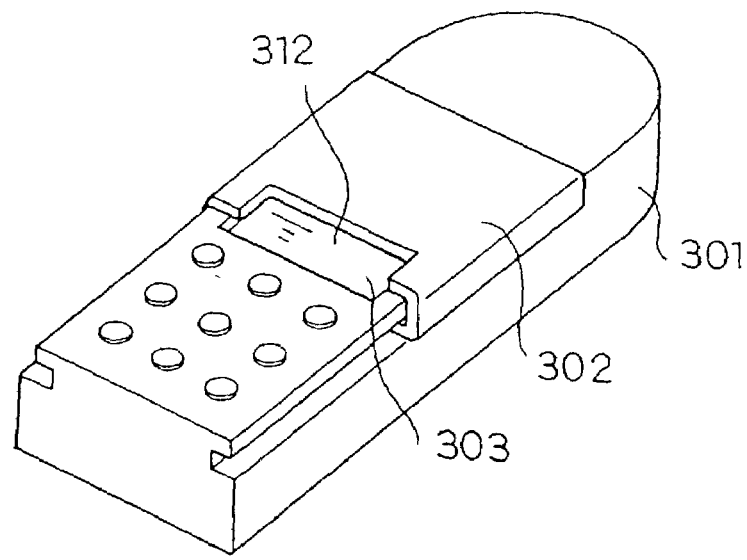
FIG. 51 shows a portable electronic apparatus of one Embodiment of the present invention.
Figure 52:
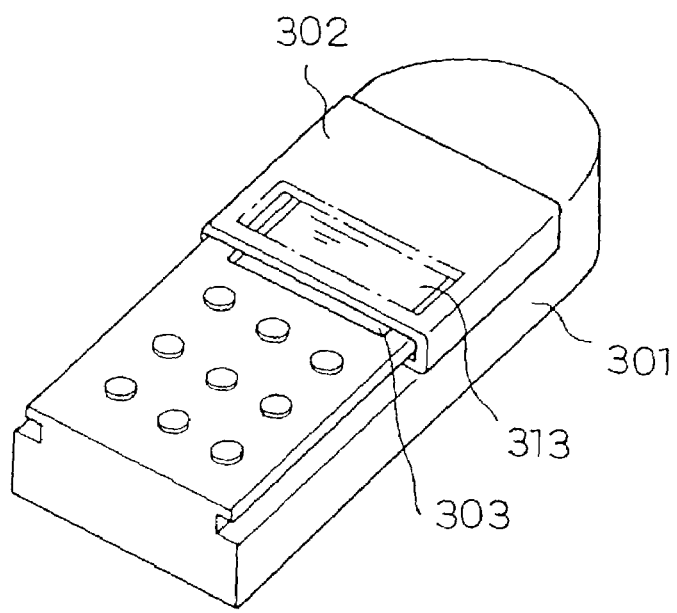
FIG. 52 shows a portable electronic apparatus of one Embodiment of the present invention.

As shown in FIG. 51, it is possible to cut off part of slide cover 302 in such a manner that it would not deteriorate its functions. By using input display unit 303 seen from cut-off part 312, a display screen that fits the small display seen from cut-off part 312 can be created and displayed. Conversely, when the slide cover is opened, a display screen using up the entire display surface can be used. It is also possible to design the slide cover partly transparent 313 instead of a cut-off as shown in FIG. 52.

The operation of the portable electronic apparatus is enabled even when slide cover 302 is closed. Moreover, by linking the opening/closing of slide cover 302 with opening/closing mode switch 311, versatile usage of the portable electronic apparatus is realized with improved functions and operability.

Figure 53:
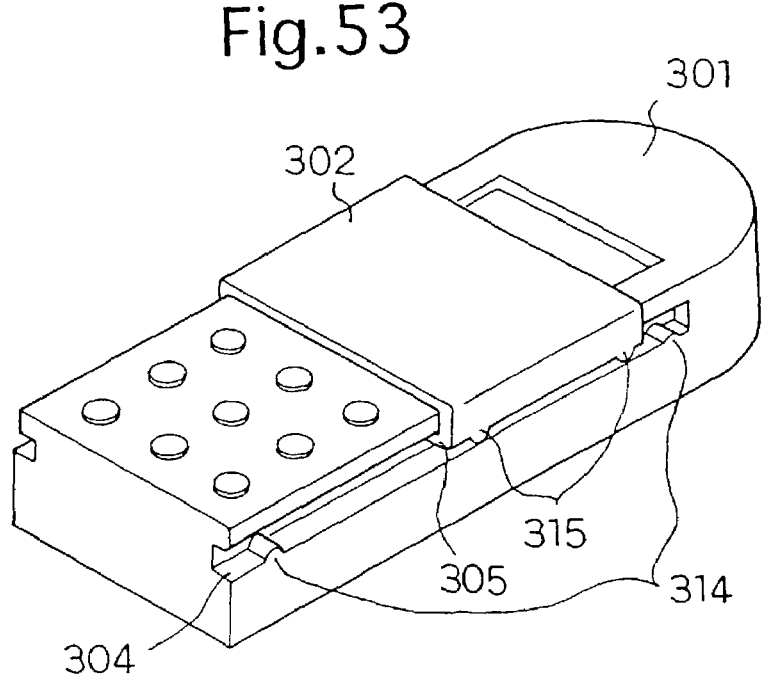
FIG. 53 shows a portable electronic apparatus of one Embodiment of the present invention.

FIG. 53 shows the opening/closing support projections provided for slide cover 302 and rail 304.

Opening/closing support projections 314 are provided near the both ends of rail 304 of portable electronic apparatus body 301. Opening/closing support projections 315 are attached on slide projection 305 of slide cover 302 and located vis-à-vis opening/closing support projections 314.

According to the opening/closing of slide cover 302, opening/closing support projections 314 and 315 touch and click with each other as surmounting the projections mutually. Because the projections work as the obstacles for each other, the locations of slide cover 302 and rail 304 stay unchanged, maintaining slide cover 302 in its opened or closed location.

Figure 54:
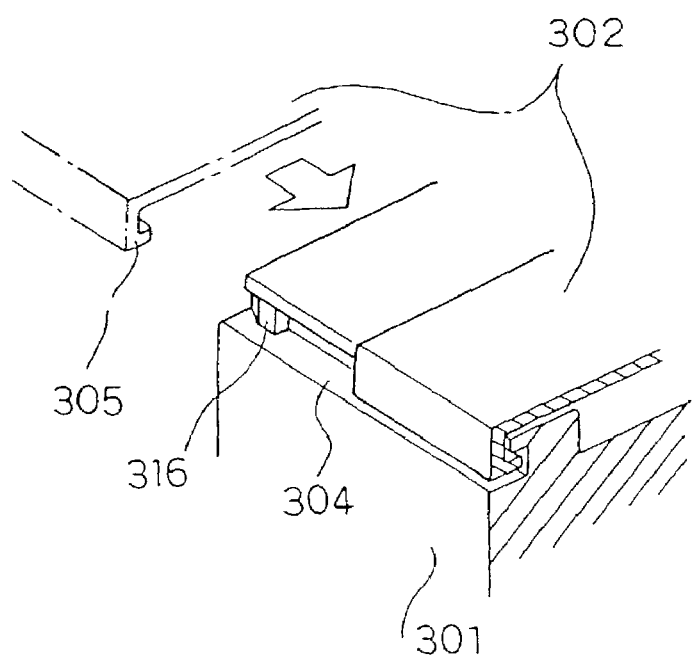
FIG. 54 shows part of a rail of the portable electronic apparatus of one Embodiment of the present invention.

FIG. 54 shows the projection different from opening/closing support projections 314 and 315, to prevent the slide cover from falling off the body.

Figure 55:
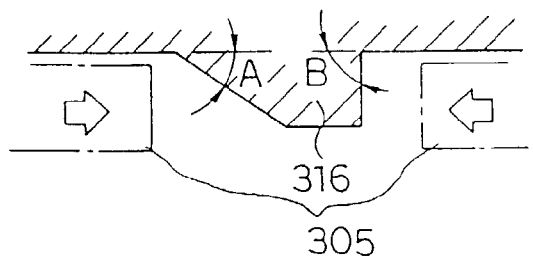
FIG. 55 is a sectional view showing a projection for preventing the slide cover from falling off the main body for the portable electronic apparatus of one Embodiment of the present invention.

In the figure, a projection 316 for preventing the slide cover from falling off the body is attached to one end of rail 304. The cross section of projection 316 is indicated in FIG. 55.

The cross section of projection 316 for preventing the slide cover from falling off the body shows that one end of the projection has a relatively loose grade angle A so that slide projection 305 of slide cover 302 coming from the left is able to surmount it while the other end has a steep grade angle B, close to right angle, so as to become an unsurmountable wall blocking the slide projection 305 that nears from the right.

At the initial stage when the slide cover has not been mounted yet, slide cover 302 is inserted into rail 304 of portable electronic apparatus body 301 in the direction approaching grade angle A and then mounted. After that, when slide cover 302 is opened, it nears the wall at grade angle B. However, slide cover 302 does not move farther blocked by the wall at grade angle B of projection 316 unless abnormally destructive force is involved.

Due to opening/closing support projections 314 and 315, slide cover 302 is kept on the rails as it is opened or closed. The operation is secured by the clicking of the projections. Projection 316 for preventing the slide cover from falling off prevents slide cover 302 from falling off portable electronic apparatus body 301 during operation. Therefore, the operability of the portable electronic apparatus is improved.

Figure 56:
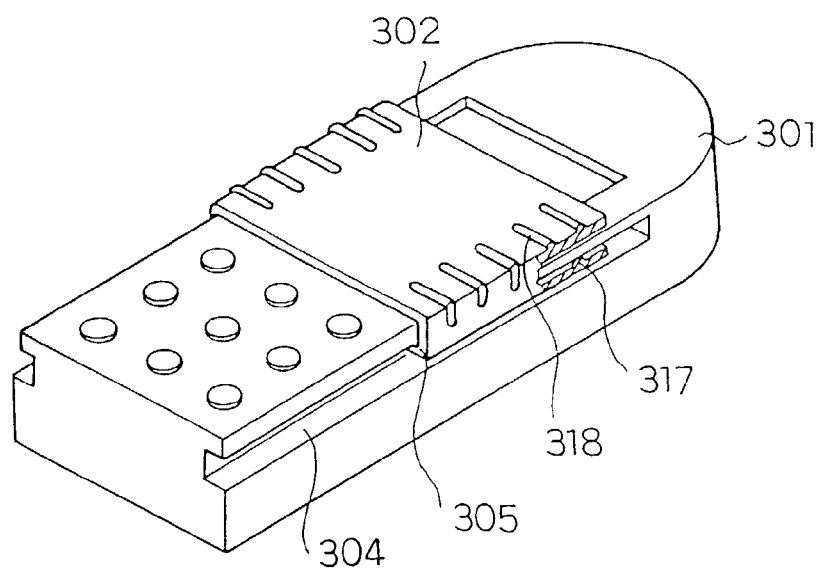
FIG. 56 shows a portable electronic apparatus of one Embodiment of the present invention.

FIG. 56 shows the shape of a slide cover.

Figure 57:
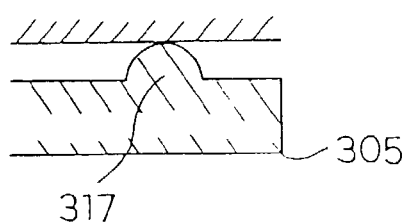
FIG. 57 is a sectional view of a projection of a slide operation support of the portable electronic apparatus of one Embodiment of the present invention.
Figure 58:
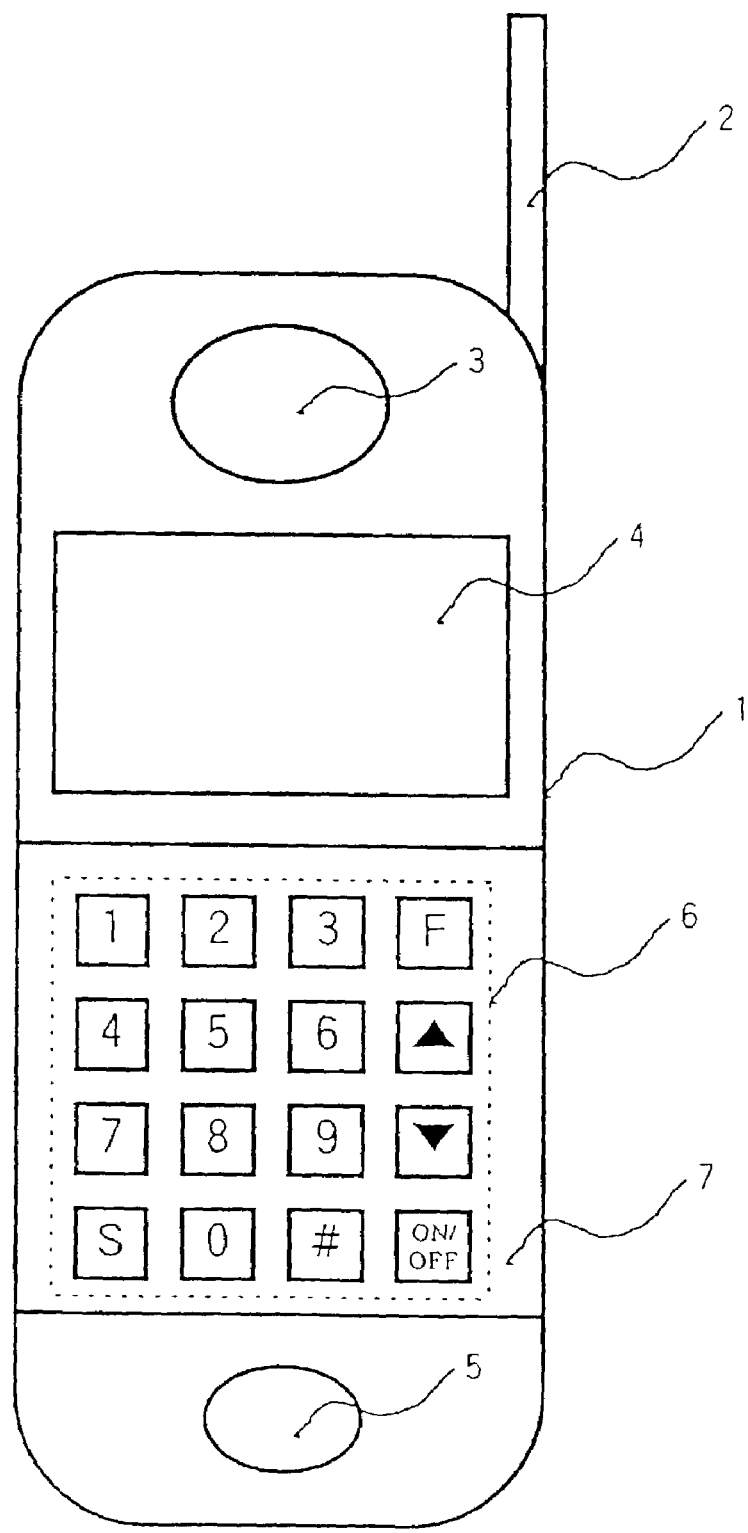
FIG. 58 is a front view showing an apparatus of the conventional mobile information terminal equipment.
Figure 59:
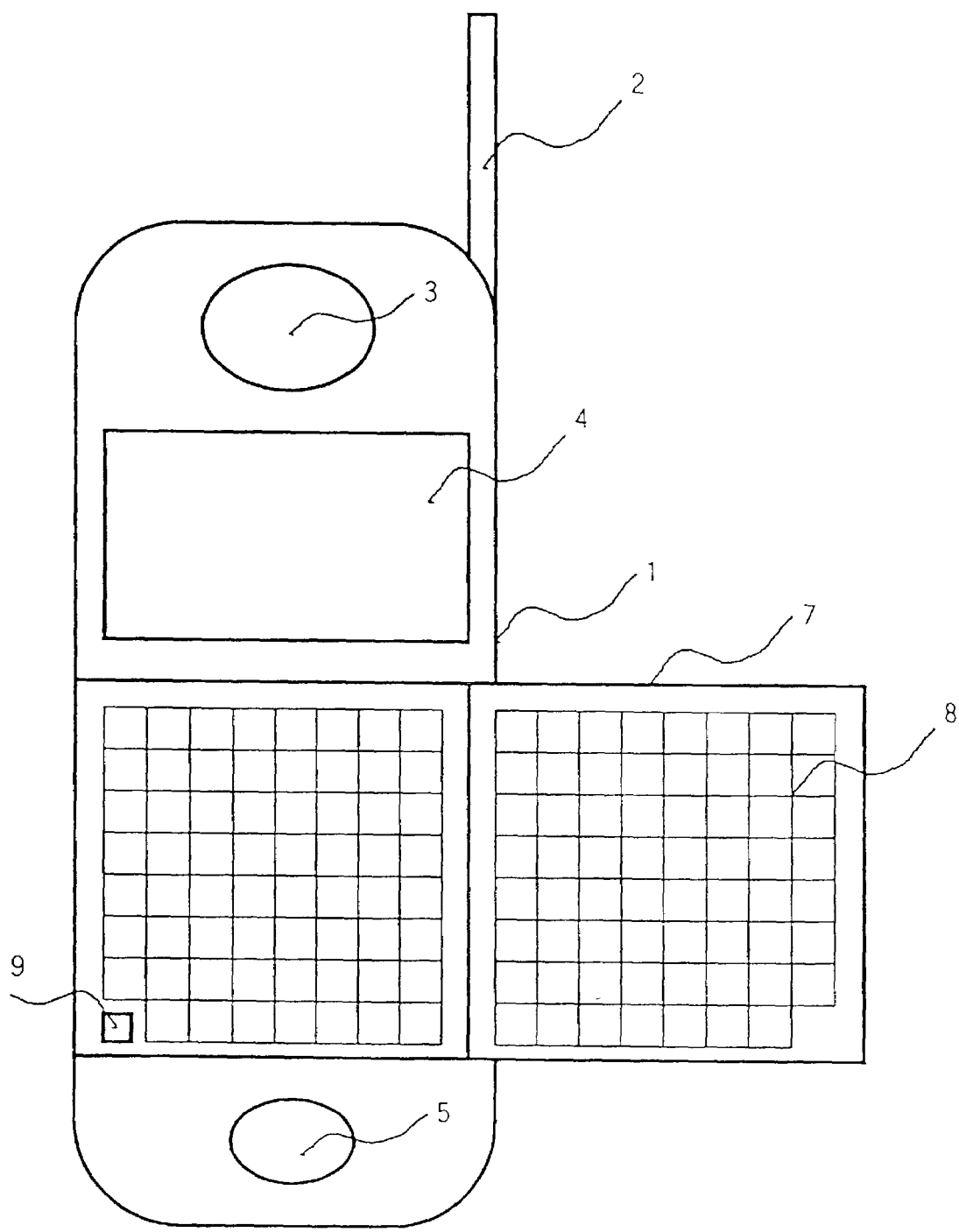
FIG. 59 is a front view showing the appearance of the conventional mobile information terminal equipment.
Figure 60:
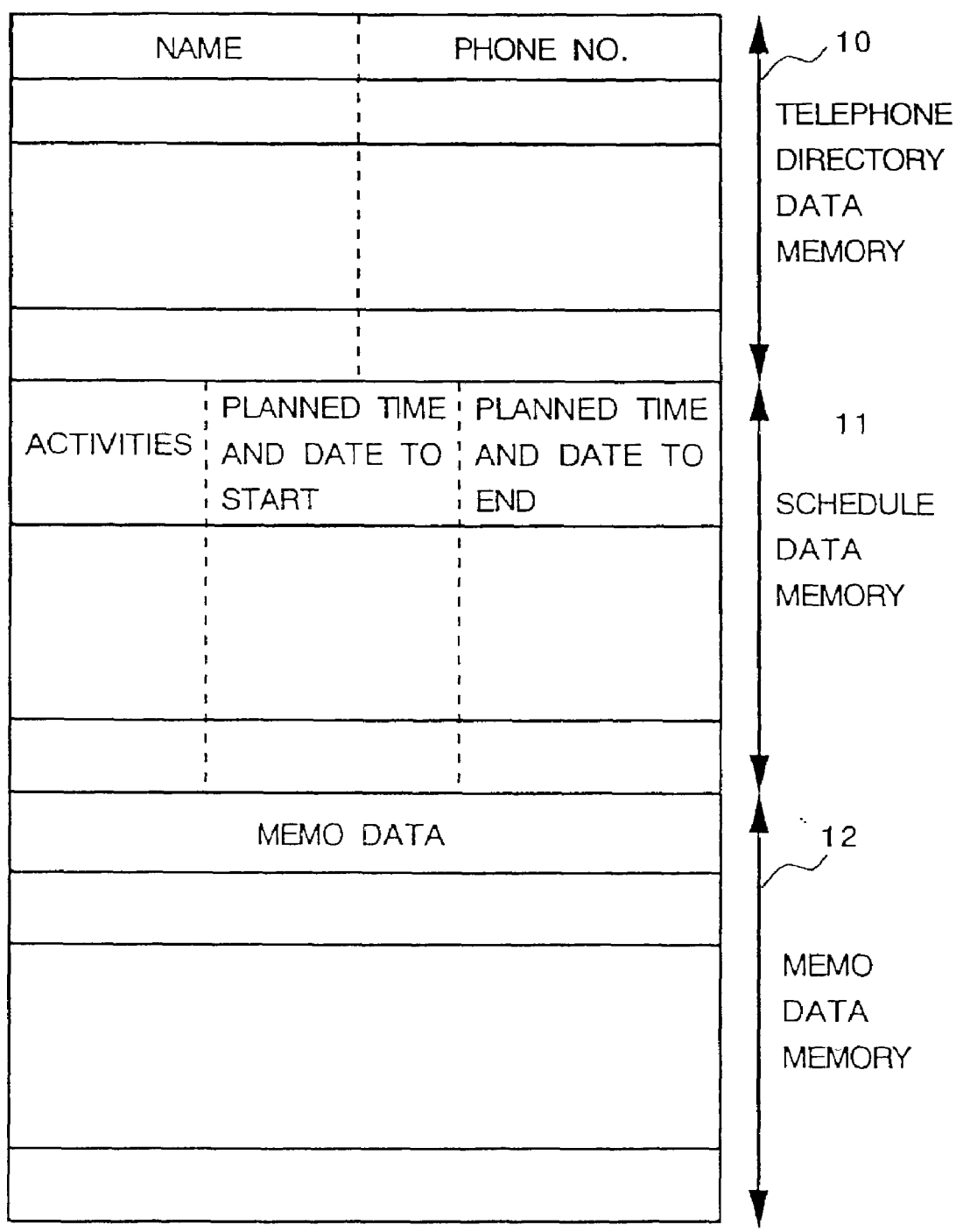
FIG. 60 shows the configuration of memory memorizing the electronic note data of the conventional mobile information terminal equipment.

FIG. 57 shows its cross section.

A slide support projection 317 is attached inside slide projection 305 contacting rail 304 of portable electronic apparatus body 301, and has an apt resistance against slide cover 302 during its opening/closing.

Convexes 318 on the surface of slide cover 302 is furnished in such a manner that fingers touch it when the portable electronic apparatus is held with hand and is excellent in designing.

In holding portable electronic apparatus body 301 with hand, slide cover 302 is opened/closed by feeling convexes 318 with fingers. Slide support projection 317 allows slide cover 302 to move smoothly without any backlash.

With convexes 318 of slide cover 302 and with slide support projection 317, slide cover can be easily and smoothly operated with fingers, with the improved operability of the portable electronic apparatus.

This Embodiment has described the mounting structure of the slide cover provided for the protection of the input display unit, aiming at the improvement of the operability of the portable electronic apparatus having a slide cover.

The portable electronic apparatus of this Embodiment has a rail on its main body. The slide cover covers the input display unit while it is closed and covers the switches when it is opened. The rail is arranged at the frame portion of the input display unit so that the main body does not get wider. The support projection is attached to the main body and its contact is mounted on the slide cover. A switch detecting the opening/closing mode of the slide cover is provided on part of the rail. By making a cut off or a transparent window on part of the slide cover, functions can be improved even when the slide cover is closed. The opening/closing support projections that support the opened/closed position of the slide cover are provided, and the projection for preventing the slide cover from falling off the body is also attached. Furthermore, the slide support projections are also added so that the sliding operates smoothly without any backlash.

The narrow width of the portable electronic apparatus of the present invention allows the user to handle the slide cover with one hand. In addition, it has such advantages that pressing the switches inadvertently is prevented. The slide cover is able to endure the eternal force applied to it. Furthermore, mode functions can be added because the opening/closing of the slide cover can be detected. Also, the slide cover moves smoothly without falling off, maintaining the opened/closed position.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and the equivalents thereto.

What is claimed is:

1. A mobile information terminal equipment comprising:

a body;

a display unit having a display area for displaying information on a part of a surface of the body;

a cover provided on the body in a manner to be able to be opened or closed to cover the display area by leaving a part of the display area uncovered when the cover is closed;

a position detector for detecting opening and closing of the cover;

a transition screen determiner for setting an application screen corresponding to a particular application which is operating with the cover opened as a transition screen when the cover has been opened from a state of a predetermined application operating with the cover closed, and setting an application screen corresponding to a particular application which is operating with the cover closed as a transition screen when the cover has been closed from a state of a predetermined application operating with the cover opened, based on a detecting result by the position detector; and a display switch for switching displays based on a detection result by the position detector, to display the application screen set as the transition screen by the transition screen determiner on an entire display area of the display unit when the cover has been opened and on a part of the display area of the display unit when the cover has been closed.

2. The mobile information terminal equipment of claim 1, wherein the display switch displays the transition screen set by the transition screen determiner by switching between a display on an entire display area and a display on a part of the display area in the display unit and by changing a displaying direction.

3. The mobile information terminal equipment of claim 1, wherein a state of operating with the cover closed is a telephone mode and a state of operating with the cover opened is an information terminal mode.

4. The mobile information terminal equipment of claim 3,
wherein the mobile information terminal equipment can switch to an information terminal mode during a talk in a telephone mode,
wherein the mobile information terminal equipment further comprises a call log information storing unit for storing call log information in the telephone mode, the call log information at least including a transition screen which has been changed to during the talk,
wherein the transition screen is set based on the call log information.

5. The mobile information terminal equipment of claim 1, further comprising a transition table where a transition condition and the transition screen are set, wherein the transition screen determiner determines the transition screen based on the transition table.

6. The mobile information terminal equipment of claim 1, further comprising a user information setter which can arbitrarily set a transition condition and the transition screen as user information, wherein the transition screen is set based on the user information set by the user information setter.

7. The mobile information terminal equipment of claim 1, further comprising a history information storing unit for storing history information regarding transition screen setting, wherein the transition screen is set based on the history information stored by the history information storing unit.

8. A mobile information terminal having a body, comprising:
a display unit having a touch screen;
a door having a display window on part of the display unit and at least one switch button;
a door opening/closing detector for detecting door opened/closed status;
a first software module for providing a user interface when using the mobile information terminal as a telephone set in the door closed status, wherein characters and pictographs are displayed on the display unit, being viewable through the display window, in the direction easier to see when the body is held vertically;
a second software module for providing a user interface when using the mobile information terminal as an information processor in the door opened status, wherein characters and pictographs are displayed on the display unit in the direction easier to see when the body is held horizontally, and wherein, during execution of an application using the mobile information terminal as said information processor, an input request from a remote party is displayed on the display unit to a user and a response from the user to the input request is inputted via the touch screen; and
a speaker for using the mobile information terminal as a telephone set, and wherein, during execution of said application using the mobile information terminal as said telephone set, an input request from the remote party is outputted to the user via the speaker and a response from the user to the input request is inputted via the user interface.

9. The mobile information terminal of claim 8, wherein the first and second software modules share information for a telephone operation.

10. The mobile information terminal of claim 8, further comprising a third software module for providing a function to access the shared data.

11. The mobile information terminal of claim 10, wherein the mobile information terminal can be used as a telephone set in the door closed status by the same operation as that for a mobile telephone with the switch button.

12. The mobile information terminal of claim 8, wherein the touch screen is located under the door and touched by pressing the at least one switch button of the door in the door closed status, and a touch input is mapped with each switch button of the door.

13. The mobile information terminal of claim 8, wherein the touch screen can be directly touched in the door opened status, and wherein a personal management information function, telephone, and data transmission are enabled by graphic user interface (GUI) using a display screen.

14. The mobile information terminal of claim 8, wherein a touch input is mapped with the graphic user interface in the door opened status.

15. The mobile information terminal of claim 8, further comprising a microphone,
wherein the input sensitivity to the microphone and the output level from the speaker are adjustable so that the user can use the body in hand-free condition with ear and mouth released from the body when the door is opened from the door closed status.

16. The mobile information terminal of claim 8, further comprising a microphone, a voice signal switch unit, a radio unit, and a modem, and a control unit for controlling the microphone, the voice signal switch unit, the radio unit, and the modem, and
wherein the control unit instructs the voice signal switch unit to temporarily shut a path from the microphone to the radio unit during talk to validate a path from the modem to the radio unit, so as to switch the line used for the telephone to the modem to allow the user to halt the talk being conducted with hand-free condition and to transmit the data including the information written using the personal management function, and then resume the talk upon completion of the data transmission.

17. A mobile information terminal, comprising:
a door opening/closing detector for detecting door opened/closed status;
a first software module for providing a user interface for using the mobile information terminal as a telephone set when a door closed status is detected; and
a second software module for providing a user interface for using the mobile information terminal as an information processor when a door opened status is detected;
wherein the input sensitivity to a microphone and the output level from a speaker are controlled so as to be increased when a transition from the door closed status to the door opened status is detected during talk, so that the user can continue to talk with ear and mouth released from a body of the mobile information terminal;

wherein, during execution of an application using the mobile information terminal as said information processor, an input request from a remote party is displayed on a display unit to a user and a response from the user to the input request is inputted via the user interface;

wherein, during execution of said application using the mobile information terminal as said telephone set, an input request from the remote party is outputted to the user via the speaker and a response from the user to the input request is inputted via the user interface.

18. A mobile information terminal comprising:

a door opening/closing detector for detecting door opened/closed status;

a software module for providing a user interface according to the detected door opened/closed status; and a control unit for controlling a microphone, a voice signal switch unit, a radio unit, and a modem, wherein, in response to a data transmission request during talk, the control unit instructs the voice signal switch unit to temporarily shut down a path from the microphone to the radio unit to validate a path from the modem to the radio unit, so as to switch line used for telephone operation to the modem to transmit the data, and then resume the talk upon completion of the data transmission;

wherein, during execution of an application using the mobile information terminal during said telephone operation, an input request from a remote party is displayed on a display unit to a user and a response from the user to the input request is inputted via the user interface;

wherein, during execution of said application using the mobile information terminal as said modem, an input request from the remote party is outputted to the user via a speaker and a response from the user to the input request is inputted via the user interface.

19. A mobile information terminal equipment comprising:

a cover for opening or closing part of a surface of the mobile information terminal equipment;

a display unit for displaying information on a display area in part of the surface of the mobile information terminal equipment;

a detector for detecting a position of the cover whether the cover is in a open position or a closed position; and a display switch for changing a size of the display area for displaying information according to the position of the cover detected by the detector;

wherein, during execution of an application using the mobile information terminal equipment as an information processor, an input request from a remote party is displayed on the display unit to a user and a response from the user to the input request is inputted via a touch screen;

wherein, during execution of said application using the mobile information terminal equipment as a telephone set, an input request from the remote party is outputted to the user via a speaker and a response from the user to the input request is inputted via a telephone keyboard.

20. A mobile information terminal equipment comprising:

a cover for opening or closing part of a surface of the mobile information terminal equipment;

a display unit for displaying information on a display area in part of the surface of the mobile information terminal equipment;

a detector for detecting a position of the cover whether the cover is in an open position or a closed position; and a display switch for changing a displaying direction of information according to the position of the cover detected by the detector;

wherein, during execution of an application using the mobile information terminal equipment as an information processor, an input request from a remote party is displayed on the display unit to a user and a response from the user to the input request is inputted via a touch screen;

wherein, during execution of said application using the mobile information terminal equipment as a telephone set, an input request from the remote party is outputted to the user via a speaker and a response from the user to the input request is inputted via a telephone keyboard.

* * * * *